(12) United States Patent
Campero et al.

(10) Patent No.: US 10,692,321 B2
(45) Date of Patent: Jun. 23, 2020

(54) ARCHITECTURE FOR ACCESS MANAGEMENT

(71) Applicant: TYCO INTEGRATED SECURITY, LLC, Boca Raton, FL (US)

(72) Inventors: Richard Campero, Gilroy, CA (US); Sean Davis, San Jose, CA (US); Graeme Jarvis, Marblehead, MA (US); Terezinha Rumble, Jensen Beach, FL (US)

(73) Assignee: Tyco Integrated Security LLC, Boca Raton, FL (US)

( * ) Notice: Subject to any disclaimer, the term of this patent is extended or adjusted under 35 U.S.C. 154(b) by 17 days.

(21) Appl. No.: 15/594,826

(22) Filed: May 15, 2017

(65) Prior Publication Data

US 2018/0075247 A1 Mar. 15, 2018

Related U.S. Application Data

(60) Provisional application No. 62/385,387, filed on Sep. 9, 2016.

(51) Int. Cl.
*G06F 21/00* (2013.01)
*G07F 7/08* (2006.01)
(Continued)

(52) U.S. Cl.
CPC ............ *G07F 7/0826* (2013.01); *G06F 9/451* (2018.02); *G06F 16/27* (2019.01); *G06F 17/142* (2013.01); *G06F 21/31* (2013.01); *G06F 21/6218* (2013.01); *G06Q 20/363* (2013.01); *G06Q 20/3674* (2013.01); *G06Q 20/389* (2013.01); *G07C 9/00* (2013.01);
*G07C 9/00182* (2013.01); *G07C 9/28* (2020.01); *G08B 13/19682* (2013.01); *H04L 9/06* (2013.01);
(Continued)

(58) Field of Classification Search
CPC ....... G07F 7/0826; G06F 9/451; G06F 17/142
USPC .......................................................... 726/2
See application file for complete search history.

(56) References Cited

U.S. PATENT DOCUMENTS 6,763,459 B1 7/2004 Corella
9,220,012 B1 * 12/2015 Inamdar ................ H04W 12/08
(Continued)

FOREIGN PATENT DOCUMENTS

EP 3 065 435 A1 9/2016

OTHER PUBLICATIONS

Office Action for U.S. Appl. No. 15/594,786, dated Jul. 31, 2018, 11 pages.
(Continued)

*Primary Examiner* — Anthony D Brown
(74) *Attorney, Agent, or Firm* — Foley & Lardner LLP

(57) ABSTRACT

Disclosed are techniques that use user devices and a server system to process employee generated requests to allow guest access registration. A server system receives a request for guest registration and the server system sends in response to the request a message to a guest user device with the message including a request for user credentials. The user credentials are supplied from a user's PII wallet carried by the user. The server system receives from an employee user device a verification of the guest registration, produces an access policy for the guest user device and causes the produced policy and guest credentials to be stored in a distributed ledger system.

18 Claims, 38 Drawing Sheets

(51) Int. Cl.

| | | |
|---|---|---|
| *G08B 13/196* | (2006.01) | |
| *H04L 29/06* | (2006.01) | |
| *H04W 12/08* | (2009.01) | |
| *G06F 16/27* | (2019.01) | |
| *G06F 9/451* | (2018.01) | |
| *G07C 9/00* | (2020.01) | |
| *G06Q 20/36* | (2012.01) | |
| *G07C 9/28* | (2020.01) | |
| *G06F 17/14* | (2006.01) | |
| *H04L 9/32* | (2006.01) | |
| *G06F 21/31* | (2013.01) | |
| *G06F 21/62* | (2013.01) | |
| *H04L 9/08* | (2006.01) | |
| *H04W 12/06* | (2009.01) | |
| *H04L 9/30* | (2006.01) | |
| *H04L 9/06* | (2006.01) | |
| *G06Q 20/38* | (2012.01) | |
| *H04L 12/58* | (2006.01) | |
| *H04W 4/021* | (2018.01) | |
| *G06F 21/45* | (2013.01) | |
| *G06F 21/34* | (2013.01) | |

(52) U.S. Cl.
CPC .............. *H04L 9/0825* (2013.01); *H04L 9/30* (2013.01); *H04L 9/3213* (2013.01); *H04L 9/3242* (2013.01); *H04L 63/0428* (2013.01); *H04L 63/083* (2013.01); *H04L 63/0823* (2013.01); *H04L 63/0853* (2013.01); *H04L 63/0861* (2013.01); *H04L 63/101* (2013.01); *H04L 63/102* (2013.01); *H04L 63/18* (2013.01); *H04L 63/20* (2013.01); *H04W 12/06* (2013.01); *H04W 12/08* (2013.01); *G06F 21/34* (2013.01); *G06F 21/45* (2013.01); *G06F 21/6263* (2013.01); *G06Q 2220/00* (2013.01); *H04L 9/08* (2013.01); *H04L 9/32* (2013.01); *H04L 51/38* (2013.01); *H04L 63/107* (2013.01); *H04W 4/021* (2013.01)

(56) References Cited

U.S. PATENT DOCUMENTS

| | | | |
|---|---|---|---|
| 9,392,021 | B1 | 7/2016 | Labana et al. |
| 9,413,735 | B1 | 8/2016 | Hird |
| 9,858,781 | B1 | 1/2018 | Campero et al. |
| 10,475,273 | B2 | 11/2019 | Campero et al. |
| 2005/0043997 | A1 | 2/2005 | Sahota et al. |
| 2007/0025302 | A1 | 2/2007 | Zhang et al. |
| 2008/0010458 | A1 | 1/2008 | Holtzman et al. |
| 2011/0148576 | A1 | 6/2011 | Gupta |
| 2012/0142403 | A1 | 6/2012 | Prather et al. |
| 2012/0313754 | A1 | 12/2012 | Bona |
| 2013/0238556 | A1* | 9/2013 | Mielenhausen ..... G06F 16/2343 707/624 |
| 2014/0237250 | A1 | 8/2014 | Menezes et al. |
| 2014/0340195 | A1 | 11/2014 | Polak et al. |
| 2015/0019443 | A1* | 1/2015 | Sheets ................. G06Q 20/3278 705/71 |
| 2015/0100503 | A1 | 4/2015 | Lobo et al. |
| 2015/0116077 | A1 | 4/2015 | Belknap et al. |
| 2015/0244690 | A1 | 8/2015 | Mossbarger |
| 2015/0294210 | A1 | 10/2015 | Martinez De Velasco Cortina et al. |
| 2015/0324789 | A1 | 11/2015 | Dvorak et al. |
| 2016/0005248 | A1 | 1/2016 | Aase |
| 2016/0036788 | A1 | 2/2016 | Conrad et al. |
| 2016/0086175 | A1 | 3/2016 | Finlow-Bates |
| 2016/0116510 | A1* | 4/2016 | Kalous ............... G07C 9/00571 340/636.1 |
| 2016/0162897 | A1 | 6/2016 | Feeney |
| 2016/0164884 | A1 | 6/2016 | Sriram et al. |
| 2016/0205102 | A1 | 7/2016 | Perretta et al. |
| 2016/0253651 | A1 | 9/2016 | Park et al. |
| 2016/0261411 | A1 | 9/2016 | Yau et al. |
| 2016/0261685 | A1 | 9/2016 | Chen et al. |
| 2016/0292672 | A1 | 10/2016 | Fay |
| 2016/0300223 | A1 | 10/2016 | Grey et al. |
| 2017/0011460 | A1 | 1/2017 | Molinari |
| 2017/0046651 | A1 | 2/2017 | Lin |
| 2017/0048235 | A1 | 2/2017 | Lohe et al. |
| 2017/0061396 | A1 | 3/2017 | Melika et al. |
| 2017/0075938 | A1 | 3/2017 | Black |
| 2017/0076522 | A1 | 3/2017 | Ives-Halperin |
| 2017/0124534 | A1 | 5/2017 | Savolainen |
| 2017/0124535 | A1 | 5/2017 | Juels |
| 2017/0147808 | A1 | 5/2017 | Kravitz |
| 2017/0177855 | A1 | 6/2017 | Costa Faidella |
| 2017/0178125 | A1 | 6/2017 | Jimenez et al. |
| 2017/0180128 | A1 | 6/2017 | Lu |
| 2017/0195336 | A1 | 7/2017 | Ouellette |
| 2017/0221288 | A1 | 8/2017 | Johnson |
| 2017/0244722 | A1* | 8/2017 | Zehler .................. H04L 63/107 |
| 2017/0295180 | A1 | 10/2017 | Day et al. |
| 2017/0300627 | A1 | 10/2017 | Giordano et al. |
| 2017/0300898 | A1 | 10/2017 | Campero et al. |
| 2017/0300978 | A1 | 10/2017 | Narasimhan et al. |
| 2018/0060596 | A1 | 3/2018 | Hamel et al. |
| 2018/0075247 | A1 | 3/2018 | Campero et al. |
| 2018/0075677 | A1 | 3/2018 | Campero et al. |
| 2018/0075686 | A1 | 3/2018 | Campero et al. |
| 2018/0076962 | A1 | 3/2018 | Campero et al. |
| 2018/0077151 | A1 | 3/2018 | Campero et al. |

OTHER PUBLICATIONS

Co-pending U.S. Appl. No. 15/097,513, filed Apr. 13, 2016.
Co-pending U.S. Appl. No. 15/594,750, filed May 15, 2017.
Co-pending U.S. Appl. No. 15/594,786, filed May 15, 2017.
Co-pending U.S. Appl. No. 15/594,861, filed May 15, 2017.
Co-pending U.S. Appl. No. 15/595,818, filed May 15, 2017.
Co-pending U.S. Appl. No. 15/596,028, filed May 16, 2017.
https://en.wikipedia.org/wiki/Bitcoin, Bitcoin—Wikipedia, the free encyclopedia, 36 pgs., page last modified on Feb. 8, 2016.
https://en.bitcoin.it/wiki/Block_chain, Block chain—Bitcoin Wiki, 2 pgs., last modified Oct. 21, 2015.
https://www.usv.com/blog/bitcoin-as-protocol, Bitcoin as Protocol, Union Square Ventures, 5 pgs., Oct. 31, 2013.
https://www.gov.uk/government/news/distributed-ledger-technology-be . . . , Distributed ledger technology: beyond block chain—Press releases—gov.uk, 2 pgs., first published Jan 19, 2016.
http://www.beehiveid.com/blog/identity-and-the-blockchain, Identity and the Blockchain, 6 pgs., Aug. 16, 2015 Alex Kilpatrick.
http://www.beehiveid.com/blog/identity-and-the-blockchain, Identity and the Blockchain, key questions, 14 pgs., Dec. 3, 2014 Richard Gendal Brown.
International Search Report and Written Opinion, PCT/US17/49006.
International Search Report and Written Opinion on PCT/US2017/48604, dated Nov. 13, 2017, 17 pages.
International Search Report and Written Opinion on PCT/US2017/48998, dated, Nov. 16, 2017, 6 pages.
International Search Report and Written Opinion on PCT/US2017/49277, dated, Nov. 16, 2017, 14 pages.
International Search Report and Written Opinion on PCT/US2017/049006, dated Nov. 6, 2017, 14 pages.
International Search Report and Written Opinion on PCT/US2017/049274, dated Sep. 18, 2017, 10 pages.
International Search Report and Written Opinion on PCT/US2017/48798, dated Sep. 18, 2017, 8 pages.

* cited by examiner

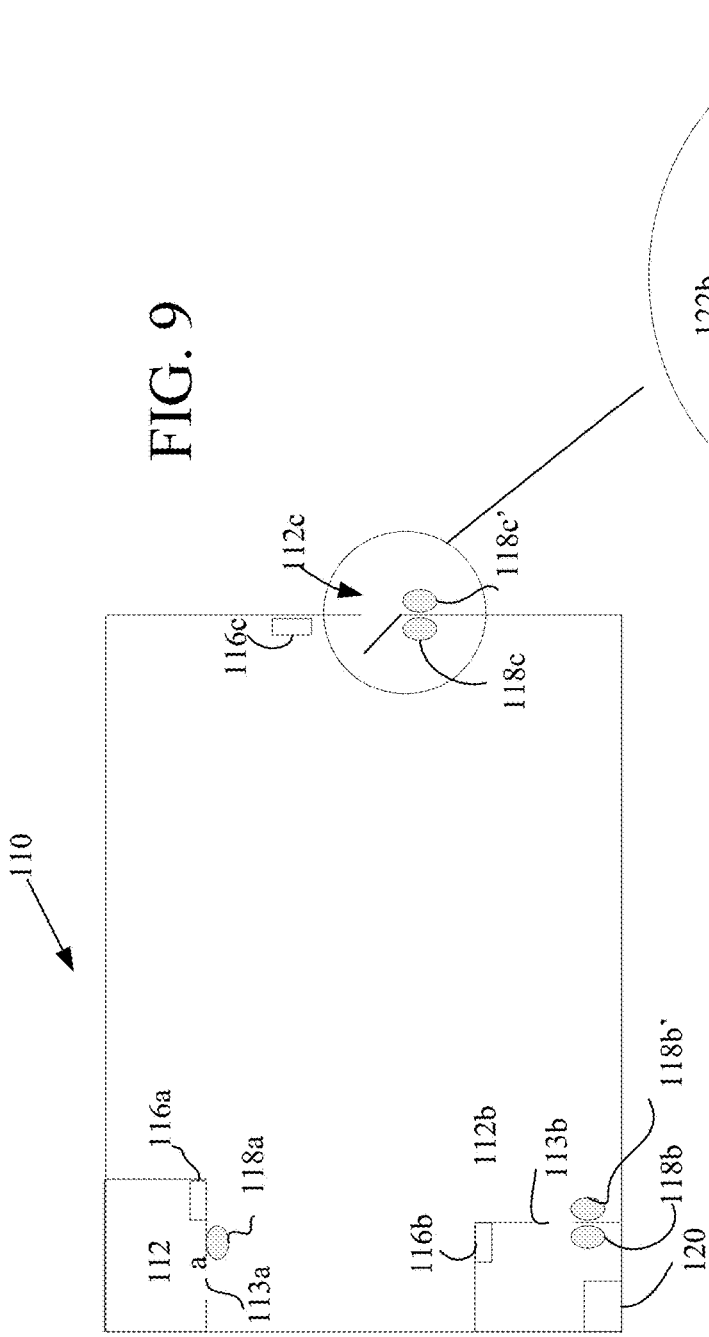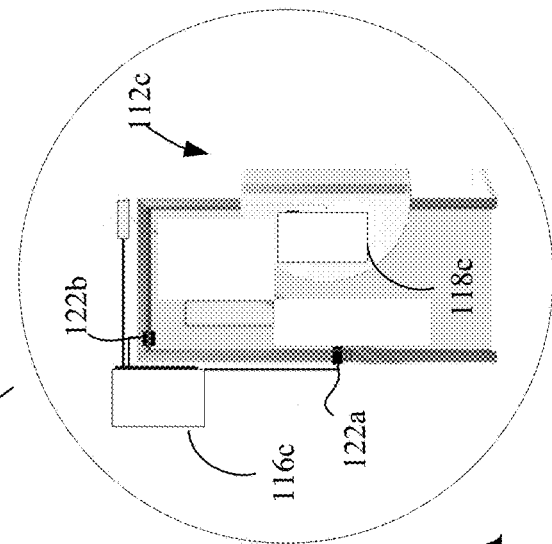

ARCHITECTURE FOR ACCESS MANAGEMENT

CLAIM OF PRIORITY

This application claims priority under 35 U.S.C. § 119(e) to provisional U.S. Patent Application 62/385,387, filed on Sep. 9, 2016, entitled: "Architecture for Access Management," the entire contents of which are hereby incorporated by reference.

BACKGROUND

This description relates to operation of networks for dissemination of information.

Access control systems commonly employ access cards that include corresponding embedded electronic credentials that are read by a corresponding card reader. For a given access card, a read credential is typically compared to an access control list that is stored in an access control system. If the credential matches to an approved entry in the access control list, a cardholder in possession of the access card is allowed certain privileges such as, for example, access to a locked door. Such systems are widely deployed in commercial businesses.

It is common for computer systems to gather information, such as proprietary data on individuals other entities such as businesses etc., as well on operational data from other systems. One type of information is proprietary data such as "personally identifiable information" commonly referred to as "PII." PII is information of a sensitive, personal nature that is generally associated with individuals and is often protected by privacy laws in many jurisdictions. PII is information that can identify or contact or locate a single person or to identify an individual in context. Examples of PII include name, social security number, date and place of birth, mother's maiden name, biometric records and information that is linkable to an individual, such as medical, educational, financial, and employment information, as well as a user's device IP address used in a communication service broker.

Another type of information is proprietary data such as Machine Identifiable Information or "MII," such as in the context of the "Internet of Things." That is, other information that is collected includes operational information such as information used to control access control systems, intrusion detection systems and integrated security/alarm systems. For different reasons each of these types of information may have a sensitive nature that should limit the ubiquitous retention of such information in disparate systems.

Considering PII, modern information technology and the Internet have made it easier to collect PII and MII through various mechanisms leading to various problems such as aiding of criminal acts, identity theft, etc. For example, there have been numerous reports of security breaches of commercial, governmental and private systems having databases storing the PII information of many thousands or millions of individuals.

SUMMARY

The credential distribution and reader system described above has been inexistence for a very long time. One drawback of such systems is the difficulty of authenticating the person holding the access card as being the person that was actually assigned that card. The techniques described herein provide a higher level of identity validation that will be required as access system architectures are expanded to encompass a greater range of functionality. The described architecture provides validation of the person who is in possession of an identity card as opposed to merely validating an access card itself.

The new architecture employs Blockchain technology (or other distributed ledger technologies) that allows an access reader to validate information (a token) presented via the identity "card", which token is relevant to the identity of the card holder. Because the information is stored in a distributed ledger format (i.e., copies of the information to be validated are stored in numerous locations), the access system has a higher level of security since it would be extremely difficult to hack every instance of that information. Moreover, if a hack of the system was attempted, and the attempt to hack was unsuccessful with respect to even one instance of the validation information, the validation would fail and the person's identity would not be validated, thus maintaining secure access control.

Additionally, the architecture allows a user to determine the extent to which their personal information will be shared with the access system for validation purposes. For example, if a user does not want to provide a particular piece of information, e.g., their social security number, for particular types of identity validations, the user can set up its identifying device, e.g., an access identity card or an electronic wallet or another type of wearable, a dongle, etc.) such that the particular piece of information will not be provided to the access system, even if the access system requests the information.

According to an aspect, a method executed by a server system includes receiving by the server system from a first user device a request to allow guest access, sending by the server system to a second user device a message requesting user credentials, receiving by the server system from the first user device a verification of the guest registration, producing by the server system an access policy for the second user device, and causing by the server system the produced policy and guest credentials to be stored in a distributed ledger system.

Aspects also include systems and methods. Additional features of the computer program product, systems and methods include other features disclosed herein.

One or more of the above aspects may provide one or more of the following advantages.

These aspects enable user devices to transmit PII (and other confidential information) without that information being hosted by third party (requesting systems) that would otherwise manage and store such PII (and other confidential information). Such third party requester system are today ubiquitous, making such information vulnerable to improper access and disclosure by employing various types of hacking attacks on any of the ubiquitous numbers of third party requester systems.

The disclosed techniques including a security application that in conjunction with the distributed ledgers can send to user devices containing a wallet a verified access or access error depending on the outcome of processing. All exchanges are logged in the distributed ledger for audit tracking, etc. and verification of information can be used with information in the distributed ledger. Records are added to the distributed ledger as transactions and include a hashed record of the transaction, what was exchanged, the signatures of the parties, and may include additional detailed information depending on the type of distributed ledger used.

The details of one or more embodiments of the invention are set forth in the accompanying drawings and the description below. Other features, objects, and advantages of the invention is apparent from the description and drawings, and from the claims.

DESCRIPTION OF DRAWINGS

FIG. 9 is a block diagram of a facility with access control.

FIG. 9A is a blown up view of a portion of FIG. 9.

DETAILED DESCRIPTION

Described herein is a set of techniques that provide a solution using a private service broker for dissemination between two or more electronic devices of information such as PII (as well as other confidential information), which dissemination occurs in a controlled, secure and confidential manner. Also described is a mechanism that allows for the verification of information including PII (as well as other confidential information), without the actual disclosure of the PII (as well as other confidential information). The system described uses a combination of an identity wallet that executes on a user device, a distributed ledger that manages proxies for PII (as well as other confidential information), along with a service broker system that securely manages data transmissions and verifications of the data without actually having the wallet directly access the distributed ledger.

Figure 1:
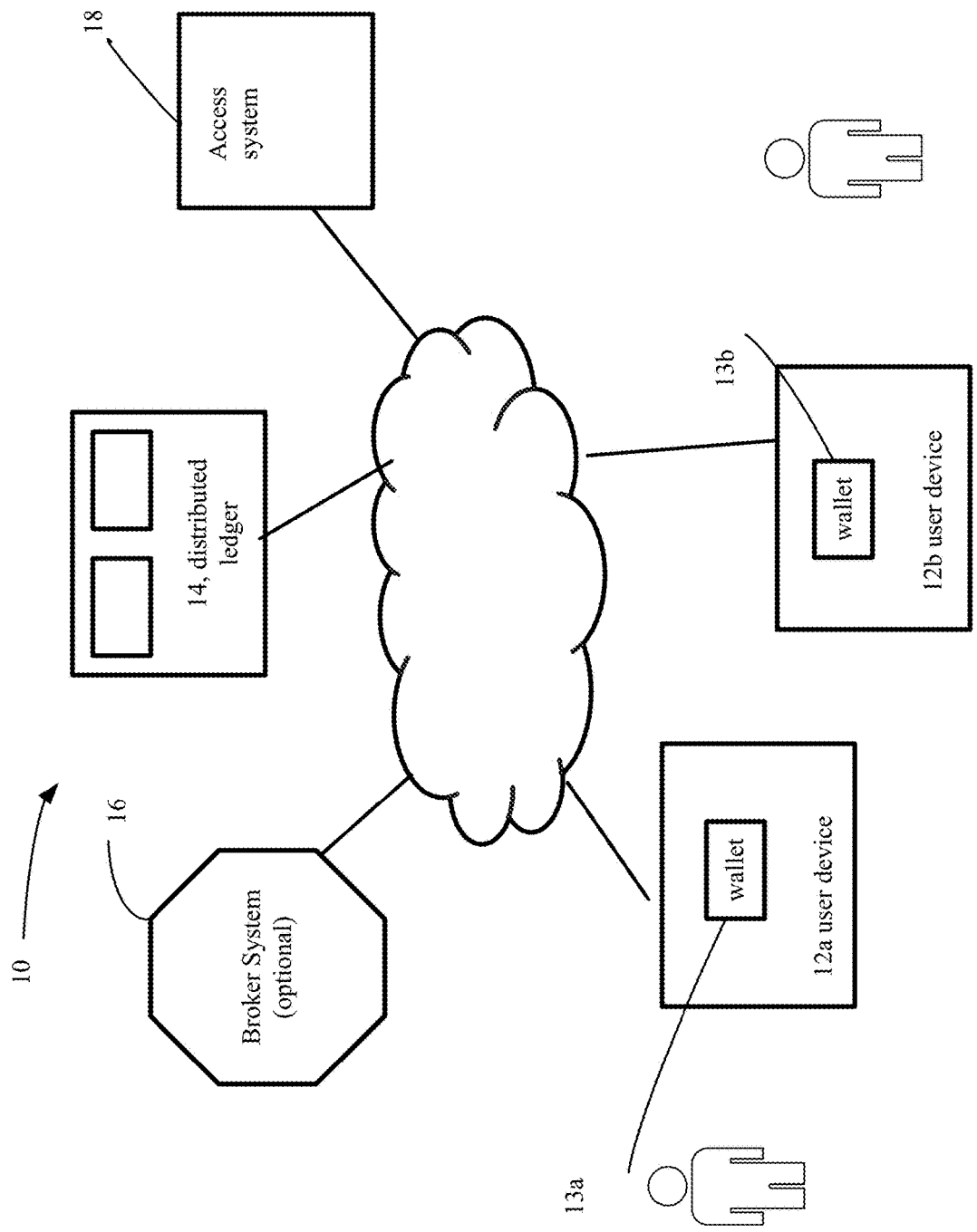
FIG. 1 is a schematic diagram of an exemplary system for securing PII information.

Referring now to FIG. 1, an exemplary distributed network system 10 for access control is shown. In the system 10, several approaches are feasible as disclosed in the incorporated by reference provisional application. Approaches as discussed in detail in FIGS. 12-24G use an Identity Wallet 13a, 13b with a distributed ledger 14 back-end that replaces the typical centralized database (not shown). The ID Wallet/distributed ledger approach provides enhanced user experience, security, compliance and so forth, as discussed below. The ID Wallet can replace and/or complement the physical security badge.

The system 10 includes user devices, here wireless enabled user mobile devices, such as smartphones 12a, 12b that house respective identity wallets 13a, 13b. The smartphones 12a, 12b house the identity wallets (also referred to herein simply as wallets) 13a, 13b, respectively and thus carry user credentials and by use of the wallet and a processor on the smartphone, interacts with portions of the access control system 10.

The term "smartphone" is used to describe a mobile phone device that executes an advanced mobile operating system. The smartphone has hardware and a mobile operating system with features of personal computer hardware and operating systems along with features required for mobile or handheld operation, such as those functions needed for use of the smartphone as a cell phone and includes GPS (global position system) navigation. The smartphone executes applications (apps) such as a media player, as well as browsers, and other apps. Smartphones typically can access the Internet and have a touchscreen user interface. Other types of user devices could be used including personal computers, tablet computers, as well as, systems that are involved with exchange of sensitive data, such as access control systems and intrusion detection systems.

Other form factors can be used to house the identity wallet 13a, such as wearables and biometrics. The smartcard may also have various physical forms. For illustrative purposes, the discussion will focus on the user devices 12a, 12b as being smartphones. The identity wallets 13a, 13b are housed in the smartphones. As used herein an identity wallet includes an application that executes on an electronic device, such as the user devices 12a, 12b, and which allows a user of the device to store identity information, encrypt such identity information and communicate with external systems via communication functions/circuitry on the smartphone.

Identity Wallets 13a, 13b are also used to authenticate credentials of the holder of the particular wallet, as well as other wallets and other systems/devices, as will be discussed below. The term "wallet" encompasses a complication of three major systems, an electronic infrastructure, an application that operates with the system and the device (e.g., smartphone) that holds the wallet. In the discussion below, the holder's proprietary data is associated with the wallet. For example, many pieces of identifying information can be stored in the wallet. Such information can be diverse and wide-ranging, such as, bank account information, as well as the holder's information such as driver's license, health records, health care, loyalty card(s) and other ID documents stored on the phone, social security no., etc. All of this information can be stored in some manner and/or linked to the wallet.

In the discussion below, in particular, the wallet holds a user's credentials that are needed for access to a facility using system 10. Also, in the discussion below, the focus will be on user device 12*a* and wallet 13*a*.

The system 10 also includes a distributed ledger system 14. The distributed ledger system 14 is a sequential transaction database. An example of a sequential transaction database is the so-called "Blockchain" that operates with cryptocurrencies, such as "bitcoin"® (bitcoin project.org). The distributed ledger 14 rather than being dedicated to managing cryptocurrencies, manages PII transactional records and serves as the backend for a distributed access system. The distributed ledger system 14 interacts with the user's wallet as well as third party systems to register user's and allow access to users to otherwise locked facilities. While sharing some similarities to the Blockchain as well as other known types of sequential transaction databases, the distributed ledger 14 has some significant differences.

Accordingly, the distributed ledger 14 has a structure as set out in FIG. 2, as will be discussed below. In some implementations of the distributed ledger 14, the system 10 also includes a service broker system 16 that is a third party service system that interfaces between the wallet 13*a* and the distributed ledger 14. In other implementations, the service broker system 16 is not needed.

From the distributed ledger 14 encrypted PII data upon request is transmitted to third party systems, as well as sending to third party systems listings of verifying systems, upon receiving access requests from the third party system. The service broker includes a hardware platform. For example, with a self-contained enterprise example, the Service Broker would include a hardware platform (e.g., a server computer system), a server operating system and a "calculator/attester algorithm" (discussed below). The "calculator/attester algorithm" would broker between the source and target peer-to-peer entities such that a minimal amount of information required to legitimize and execute an information exchange between the source and target is determined, exchanged, and validated so that a "transaction" can occur. The record of the transaction is written into the distributed ledger 14 with the minimum amount of PII or MII information, if any, including any metadata regarding the transaction or the information.

The system 10 also includes a third party system 18. The third party system 18 can be any electronic system (or device) and is the system/device that seeks some aspect of the PII or other confidential information of a user or held by the user device 12*a*, associated with the user. In the examples discussed in conjunction with FIGS. 12-24G, the third party systems are or are aspects of access systems, both physical access as well as logical access. By physical access is meant access to physical locations, e.g., facilities, whereas logical access relates to access to logical structures such as electronic devices or applications/data accessible via electronic devices. The examples discussed below are in relation to physical access control systems. In the processes discussed below, some or all of the aforementioned user device 12*a*, wallet 13*a*, distributed ledger 14, optionally service broker 16 and third party access system 18 are used.

Figure 2:
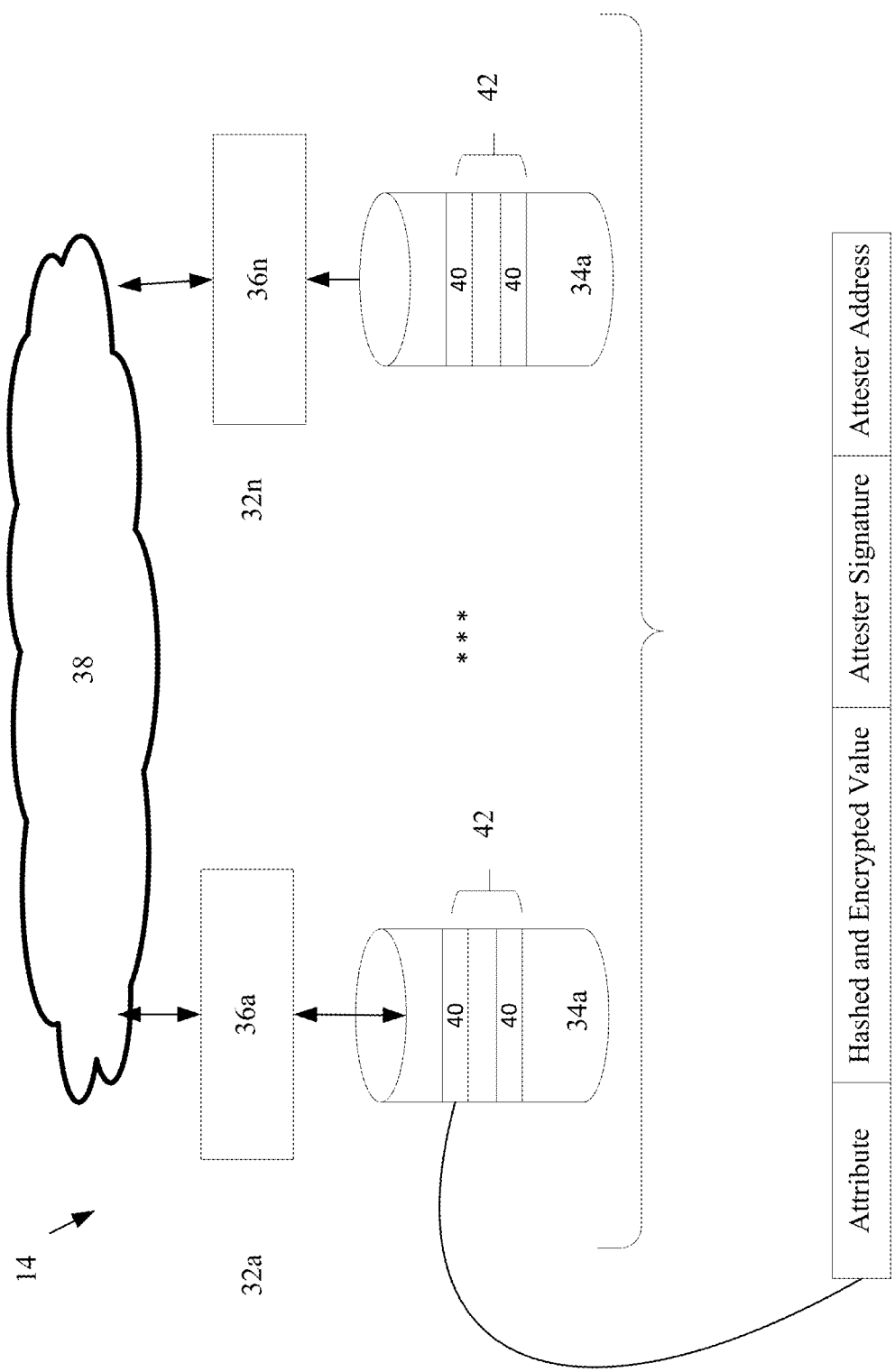
FIG. 2 is a block diagram of a distributed ledger.

Referring now to FIG. 2, the distributed ledger system 14 is shown. As mentioned, the distributed ledger system 14 is a sequential transaction database. The distributed ledger system 14 thus includes distributed databases 32*a*-32*n* that are typically existing in the "Cloud." The distributed database comprise storage devices 34*a*-34*n* that are attached to different interconnected computers 36*a*-36*n*. The distributed databases are controlled by a distributed database management system that controls storage of data over a network 38 of the interconnected computers and execute corresponding replication and duplication processes. Replication software (not shown) detects changes in the distributed database contents and once the changes have been detected, replicates the changes to have all the databases the same. Duplication software (not shown) identifies one database (not shown) as a master and then duplicates that database across other databases. Replication and duplication keep the data current in all distributed storage locations.

Each of the distributed databases 32*a*-32*n* that form the distributed ledger system 14 store encrypted information records. An exemplary record 40 is shown below. The record 40 is stored in each of the distributed databases 32*a*-32*n* that form the distributed ledger system 14, which stores the record 40 in an encrypted form in the distributed ledger system 14. Record 40 has a structure that includes an attribute type, a hashed and encrypted value of the attribute, an attester's digital signature of the hashed and encrypted value and the attester's address. An exemplary record format is set out in table below.

| User Attribute | Hashed and Encrypted Value | Attester Signature | Attester Address |
| --- | --- | --- | --- |
| Attribute | encrypt(attribute) | Signature of encrypt(value) | Address |

An exemplary set of records is set out in table below. A set 42 of such records 40 can correspond to a user's profile. This set 42 (or profile) is added to with new records as new attributes of the user are added to the distributed ledger system 14.

| User Attribute | Hashed and Encrypted Value | Attester Signature | Attester Address |
| --- | --- | --- | --- |
| Citizenship | encrypt(USA) | Signature of encrypt(USA) | attst@cadmv.com |
| Current Age | encrypt(age) | Signature of encrypt(age) | attst@cadmv.com |
| Home Address | encrypt(address) | Signature of encrypt(address) | attst@cadmv.com |
| Height | encrypt(height) | Signature of encrypt(height) | attst@cadmv.com |
| Access credentials | encrypt(credentials) | Signature of encrypt(credentials) | secure@serv.com |
| * | * | * | * |
| * | * | * | * |
| * | * | * | * |

One can readily observe that what is stored in the distributed ledger system 14 is information about a user's attribute, a hash of that attribute, information about an attester to the attribute, which information is attester signature system, and attester address. The attester when contacted can attest to the requested information being valid. For example, given a user's birth certificate that is issued by a state governmental agency that state governmental agency converts the birth certificate to a digital file of the document, and that digitized file of the document is hashed to provide a hash of the digitized birth certificate document. Rather than the document itself being stored (or the digitized document being stored, what is stored is the hash of the digitized birth certificate document, that is stored in a user's profile in the distributed ledger 14.

When a third party system 18 seeks the birth certificate of the user, the user system/device 12a sends the requesting system 18 the actual birth certificate. The receiving party generates the hash of the birth certificate and validates that the hash of that birth certificate exists in the distributed ledger 14. As, the requesting system 18 generates the hash of that document, e.g., the birth certificate, and accesses the hash from the distributed ledger 14, and while the system can send that hash back to the government system to verify that the hash is of the user's birth certificate, with the present embodiment, the requesting system 18 need not go back to the government system to verify. Rather, the requesting system 18 needed only retrieve from the distributed ledger system 14, the signature for the entity that signed that hash. The distributed ledger system 14 stores the "Attester Signature and the "Attester Address." The requesting system determines whether the stored "Attester Signature and the "Attester Address" can be trusted. If the requesting system determines that the Attester is trusted, the requesting system can verify the document was signed by the Attester, and is assured that hash of the document received by the requesting system from the wallet is authentic, as the same document attested to by the Attester.

Within a domain, distributed ledgers exchange information to maintain identical ledgers, with any suitable so called sequential transaction database technology of which "Blockchain" technology is but one example. However, unlike some electronic currency based technologies, e.g., bitcoin, where the Blockchain is designed so that no entity controls the Blockchain in some examples disclosed herein using the techniques disclosed herein the transaction database technology actually exchanges information within a domain and because such domains could be private transaction databases, each entity or industry could structure the transaction database as different private transaction databases.

Figure 3:
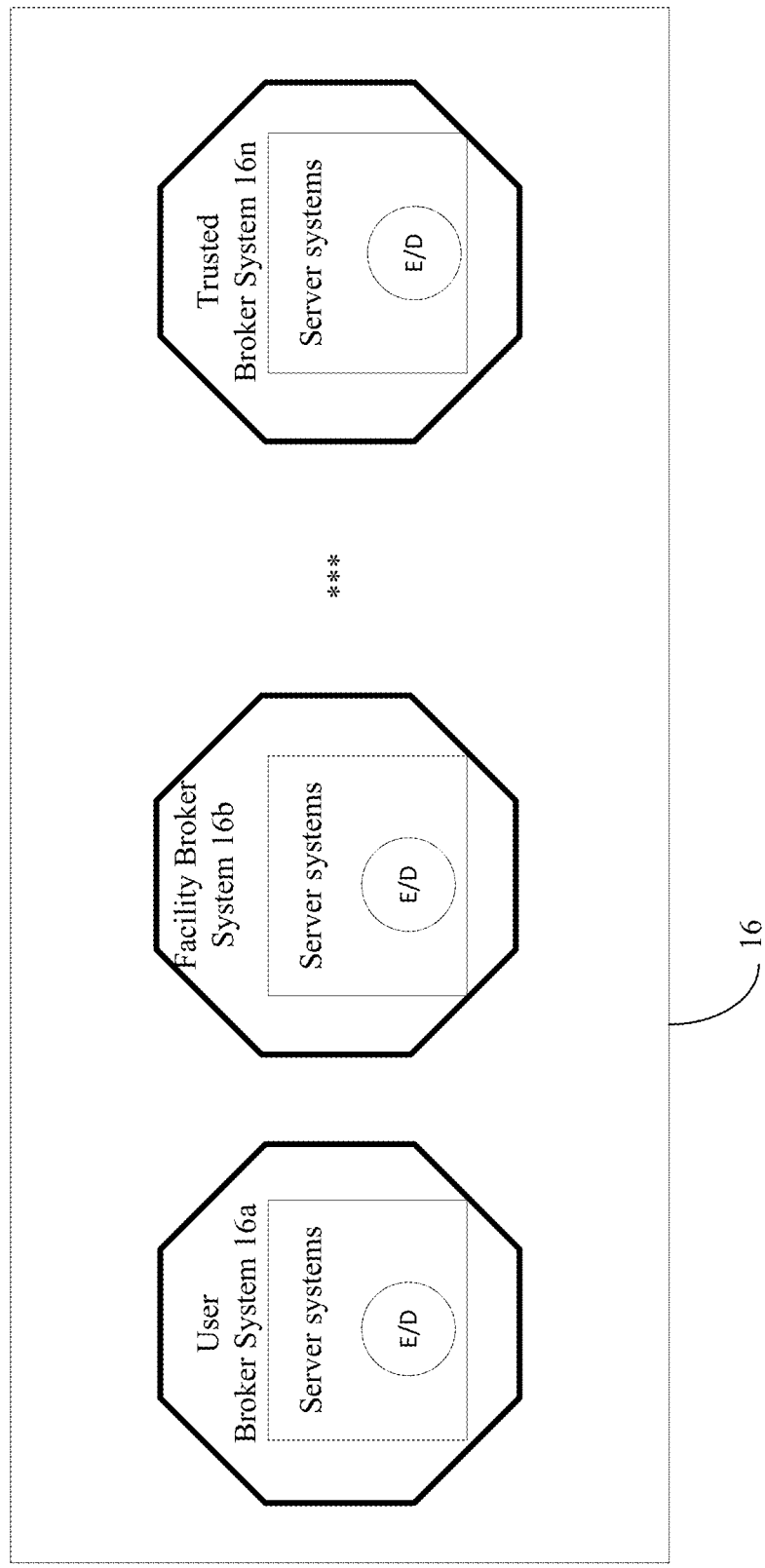
FIG. 3 is a block diagram of a broker system.

Referring now to FIG. 3, the broker system 16 is shown. The broker system 16 includes a computer system and executes software that handshakes between the user system 12 and the vetting agent or attester. Rather, than the user device 12a accessing the distributed ledger 14, all requests for transactions between the user device and the requesting device occur through the broker system 16. For some transactions, the broker system 16 accesses the distributed ledger system 16, whereas in other transactions the requesting system 18 accesses the distributed ledger system 16. As shown in FIG. 3, the broker system 16 can be a compilation of many such broker systems 16a-16n. Each of the broker systems 16a-16n can comprise computer systems and associated distributed databases. The broker systems 16a-16n are distributed over a network of servers that act together to manage the distributed ledger 14. All attribute hashed values, attester information, etc. are stored in the distributed ledger 14 and as the flow diagram below will show the broker systems 16a-n are configured to access the distributed ledger 14 to obtain and validate such information. Also shown in FIG. 3, are the encryption and decryption (E/D) of data flows that take place between the broker systems 16a-n and wallets 13a.

Note that in the context of a private distributed ledger environment, for an enterprise, it may be desirable to not have a query sent to the attester database for each transaction. Rather, a business rule could be established that once a validation event has occurred, then it is good for a period of time, until the attester database is updated etc., so as to reduce latency.

Figure 4:
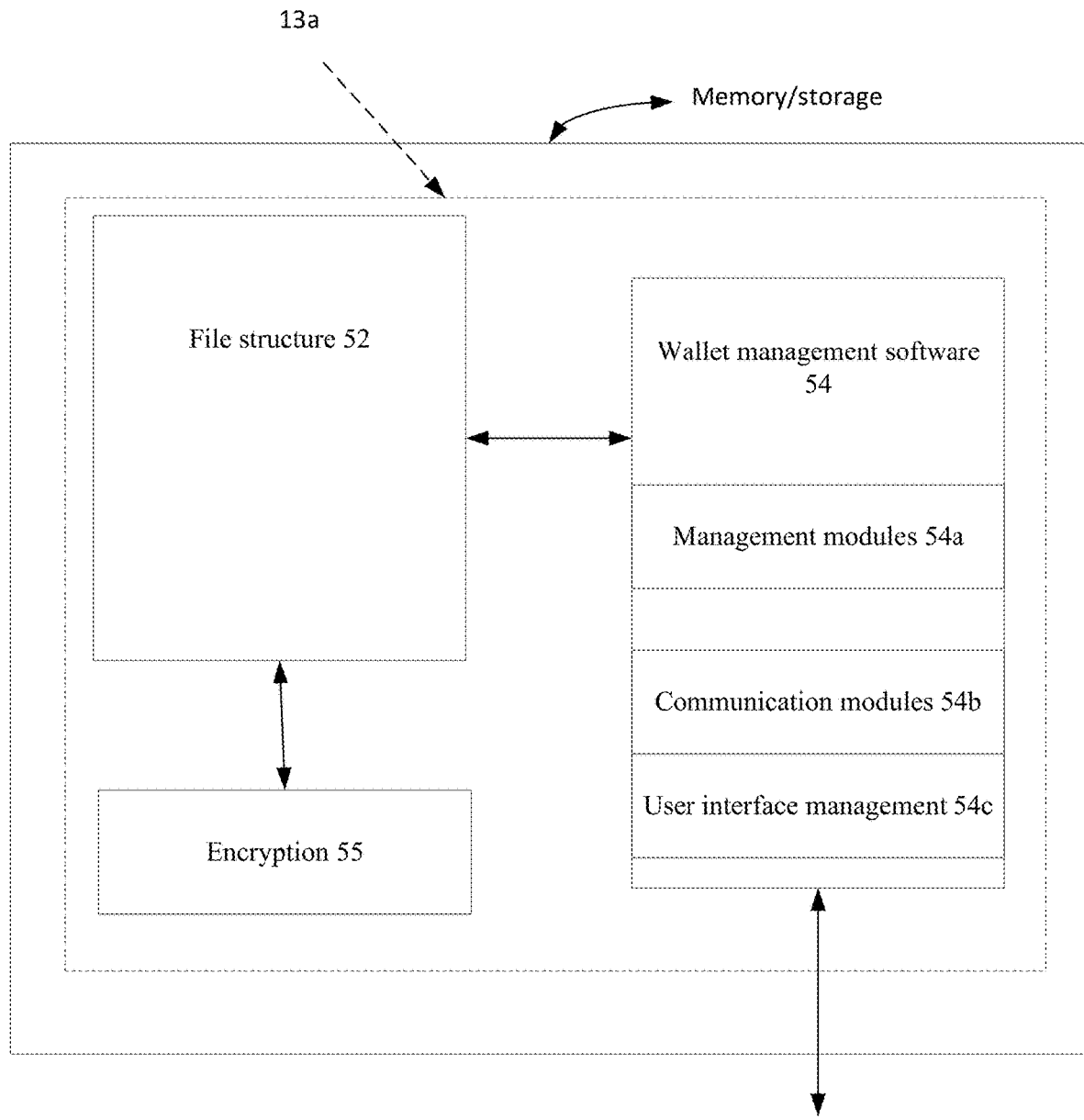
FIG. 4 is a block diagram of an identity wallet.

Referring now to FIG. 4, the wallet 13a is shown. The wallet 13a includes a file 52 structure and wallet management software 54 that are stored on a user device 12a (FIG. 1). In addition to the software comprising management modules 54a that handle request and access to the file structure, as well as receiving user authorizations, etc., the software also includes communication modules 54b that exchange information between the wallet and requestor systems, and between the wallet and the broker system 16 (when used) and that receives requests for information that result in messages being displayed on the user device 12a.

The wallet 13a stores information for handling a third party request for data directly from a user that transmits that information directly from the wallet 13a to the third party system 18 in a secure manner. The wallet 13a may take several form factors—a physical ID Wallet such as a credit card, smart wearable etc. or it may only need to be the software payload that a system pushes out to a commercially acceptable mobile device such as a smartphone. In some implementations, the wallet needs to be in communication with a device that can perform calculations/determinations, as will be discussed below.

The wallet 13a has the management module 54a that handles third party requests for information and/or attributes and the communication module 54b that interfaces with the broker system 16. The wallet 13a includes a module 54c that allows a user to view the request and either approve, all or part of none of the request. Upon approval (partial or all) of the request, the wallet 13a encrypts via encryption module 55 the requested information using a public key infrastructure (PKI) where a public key of the third party is used along with one the private keys associated with the wallet 13a to encrypt the data. The encrypted data can either be sent to the user's broker system 16 or the wallet 13a can look up the direct address of the third party system 18 and send the encrypted data directly to the third party system 18, depending on the implementation of the system 10.

As known, a public key infrastructure (PKI) is a set of hardware, software, people, policies, and procedures needed to create, manage, distribute, use, store, and revoke digital certificates and manage public-key encryption. The purpose of a PKI is to facilitate the secure electronic transfer of information for a range of network activities such as e-commerce, internet banking and confidential email. PKI is required for activities where simple passwords are an inadequate authentication method. In cryptography, PKI binds public keys with respective user identities by means of a certificate authority (CA) within a CA domain. The user identity is unique within each CA domain.

Figure 5:
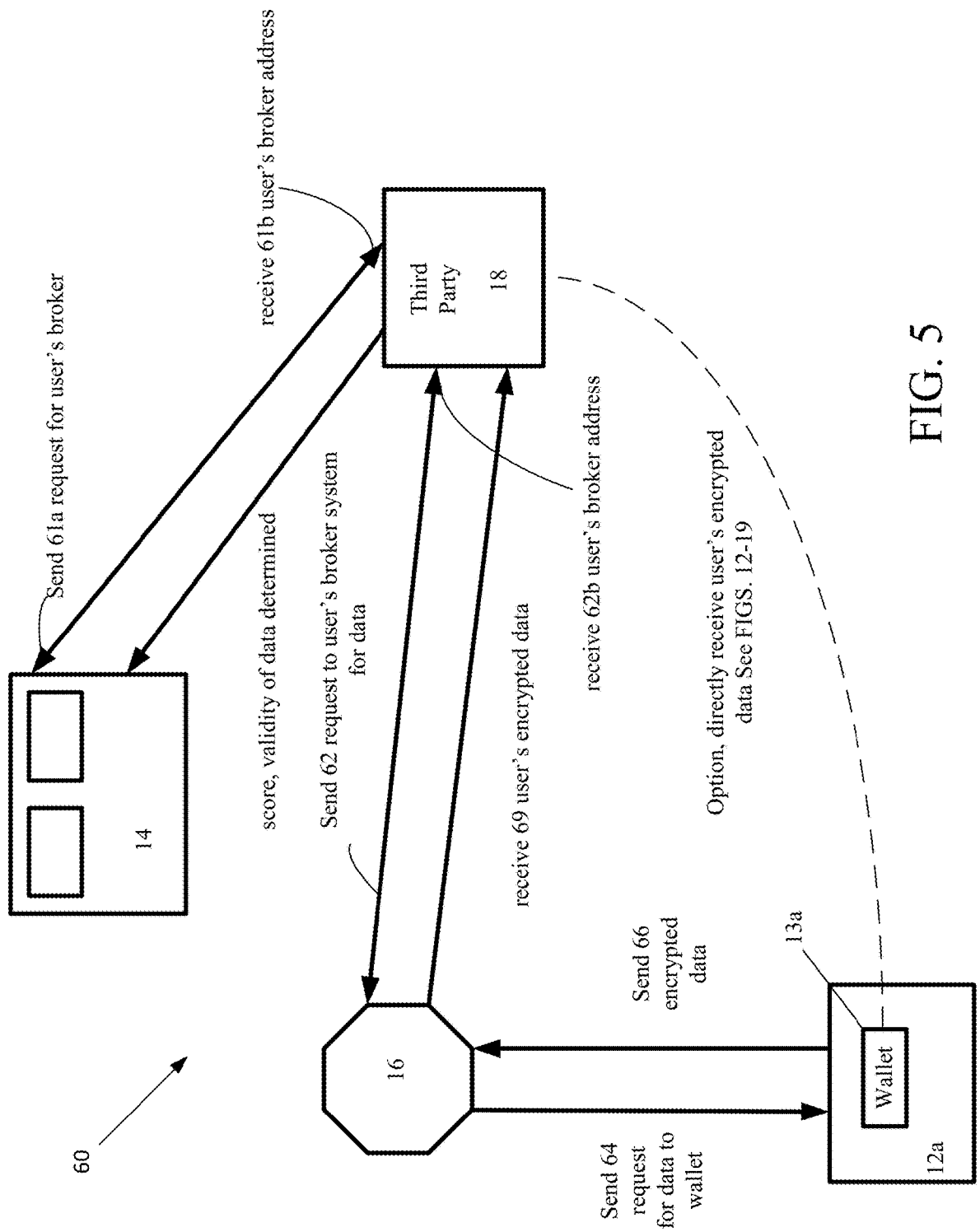
FIG. 5 is a block diagram for a first process.

Referring now to FIG. 5, a diagram of a process 60 and flow for the process 60 where the third party system 18 requests information from the user system 12a is shown. In this case, the broker system 16 provides an asynchronous transfer between the user device 12a and the third party device 18. The third party device 18 sends a message request 61a to the distributed ledger 14 for the user's broker system. In general, there can be many such broker systems associated with many users. The third party device 18 receives 61b a message that includes an address of the user's determined broker, as received from the distributed ledger. (In the following figures, as needed, double arrowed lines and reference characters on tips of such arrows are used to denote paired messages, such as sending and receiving messages.) In other implementations, the address lookup can also go through the exchange network.

In an implementation that uses a broker, the third party device 18 (security system discussed below) sends 62 a message to the user's determined broker 16, which message includes a request to access data on the user's wallet 13*a*. The request for data is sent 64 from the broker system 16. A "score" is calculated for determining the validity of the data (rather than being a measure of the secure transmission of the data). A scoring algorithm can be based on the number and types of attesters, etc., to the user's wallet 13*a* on device 12*a*. Various algorithms can be used such as one that weights types of attesters and number of attesters and normalized these to a standard. Thus, a score generated with a large number of highly trusted attesters would be higher than a score generated with a large number of attesters having a low level of trust. An alternative to this type of score is an attester score based on the type of attester and how trustworthy the attester is and has been. For example, see the following table.

| Score | Number of attesters of high trust | Number of attesters of moderate trust | Number of attesters of low trust |
|---|---|---|---|
| 0-10 | 0 | 0 | No more than X |
| 11-20 | 0 | 0 | Greater than X less than Y |
| 21-40 | 0 | At least M | * |
| * | * | * | * |
| * | * | * | * |
| * | * | * | * |
| 91-100 | At least Z | | |

One algorithm, as in the table above, is a mapping scheme that maps a score range (or values) to various slots based on empirically determined number of attesters (M, X, Y, Z) and empirically determined trust levels (high, moderate, low). This could be an example of a score for an item. Thus, with an item could be stored the number of and types of attesters of various categories (three of which, low, moderate and high trust levels being shown) or the score range or value.

Other scoring algorithms such as weighted algorithms could be used, such as one of the form:

$$\text{Score} = ((H*W_h + M*W_m + L*W_h)/\text{total})/\text{Normalized}$$

Where H is the total of high trusted attesters
M is the total of moderately trusted attesters
L is the total of low trusted attesters
$W_h$; $W_m$; $W_h$ are empirically determined weights, and
Normalized is an optional normalization function or value.

The user's wallet 13*a* (or other application or user via a physical action using a user input device) either answers (yes or no) or simply ignores the message. When the answer is yes, the user's wallet 13*a* (or other application) encrypts the data using an asymmetric encryption algorithm that uses the requestor's public key. The encrypted data is sent 66 from the user's wallet 13*a* to the broker system 16 so that only the two endpoints (user's wallet 13*a* and the third party system 18) can read the actual data. At the broker 16 system, upon reception of the encrypted data from the user's wallet 18*a*, the broker system 16 sends the data to the third party system 18.

In another implementation, the data would be sent directly to the requestor's wallet without the broker system 16. This implementation can be especially used with the processes discussed in FIGS. 12 to 24G, below. In the processes below, this direct approach is used in the explanations of those processes.

Figure 6:
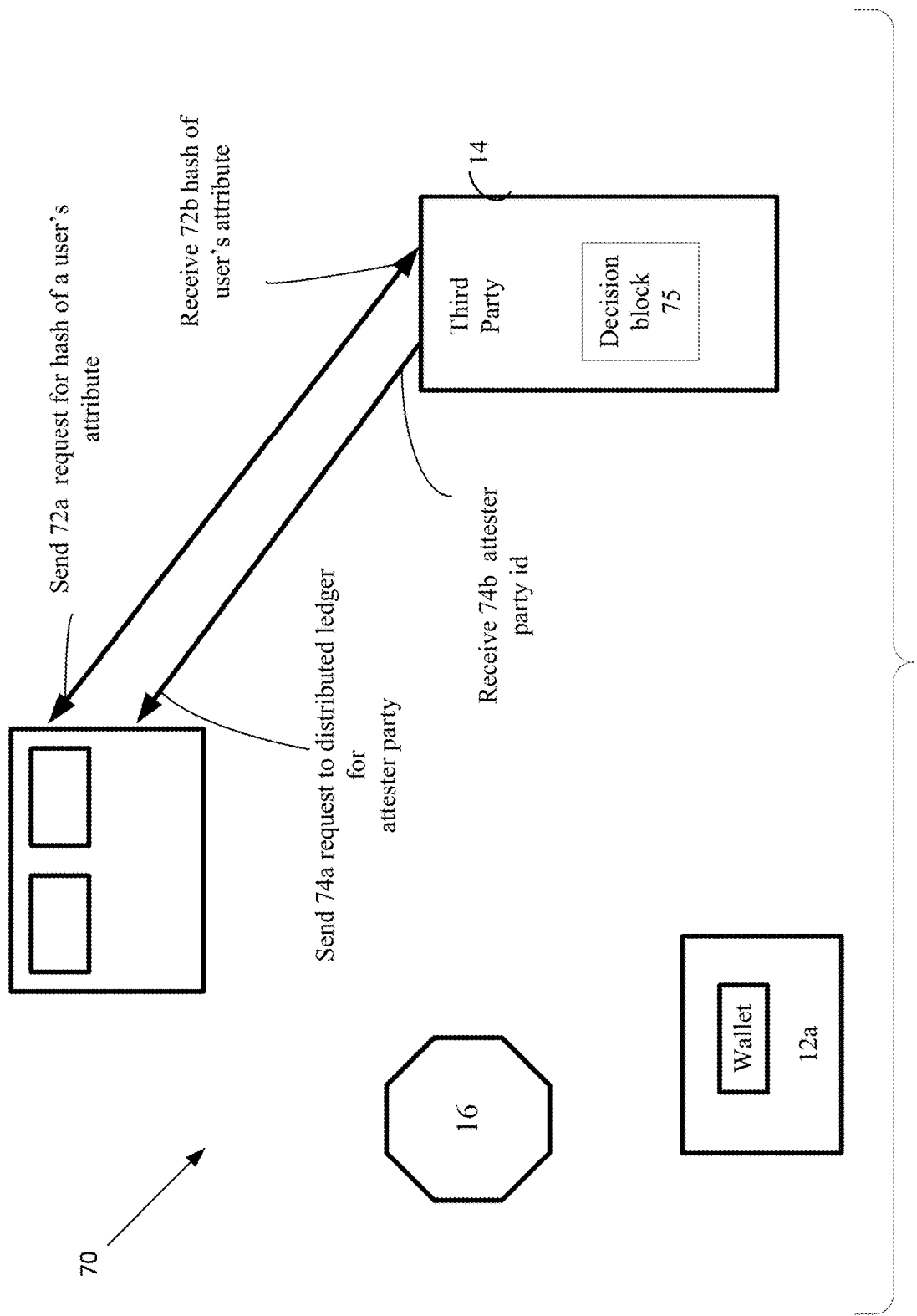
FIG. 6 is a block diagram for another process.

Referring now to FIG. 6, another process 70 is shown in which there is a required validation of PII data (or other data) through a distributed public ledger 14*a*. The distributed ledgers can be public, meaning that anyone can place and/or access data in the ledger or private, meaning that only authorized individuals and entities can place and/or access the private type of ledger. Thus, generically, such distributed ledgers 14 can be public or private depending on various considerations. In either instance, the ledger 14 contains the information needed to validate the brokered information. The third party system 18 sends 72 a lookup request to the distributed ledger 14*a* for a particular user's attribute.

In FIG. 6, the broker 16 and wallet 13*a* and user device 12*a* are not directly involved, but are shown. The lookup request is actually for a hash of the desired user's attribute. The distributed public ledger 14*a* receives the request and accesses the hash of the particular user's attribute and returns 72*b* that hash to the third party system 18. The third party system 18 sends 74*a* a look up message request for the system that has attested to the hash of the particular user's attribute stored in the distributed public ledger 14*a*. The third party system 18 receives 74*b* the identity of the system that performed the attestation to the hash of the particular user's attribute, and makes an independent decision 75 on the validity of the hash of the particular user's attribute. For cases where privacy of the data is a concern this case assumes that the third party system has the user's public key, as the attribute data is encrypted. For other types of data where privacy of the data is not a concern, the attribute need not be encrypted.

Note, in addition to returning the attester information, the system could return the attester score of that attester having the highest score. The score could be calculated by the distributed ledger 14, but may be more appropriately calculated by the broker system.

Figure 7:
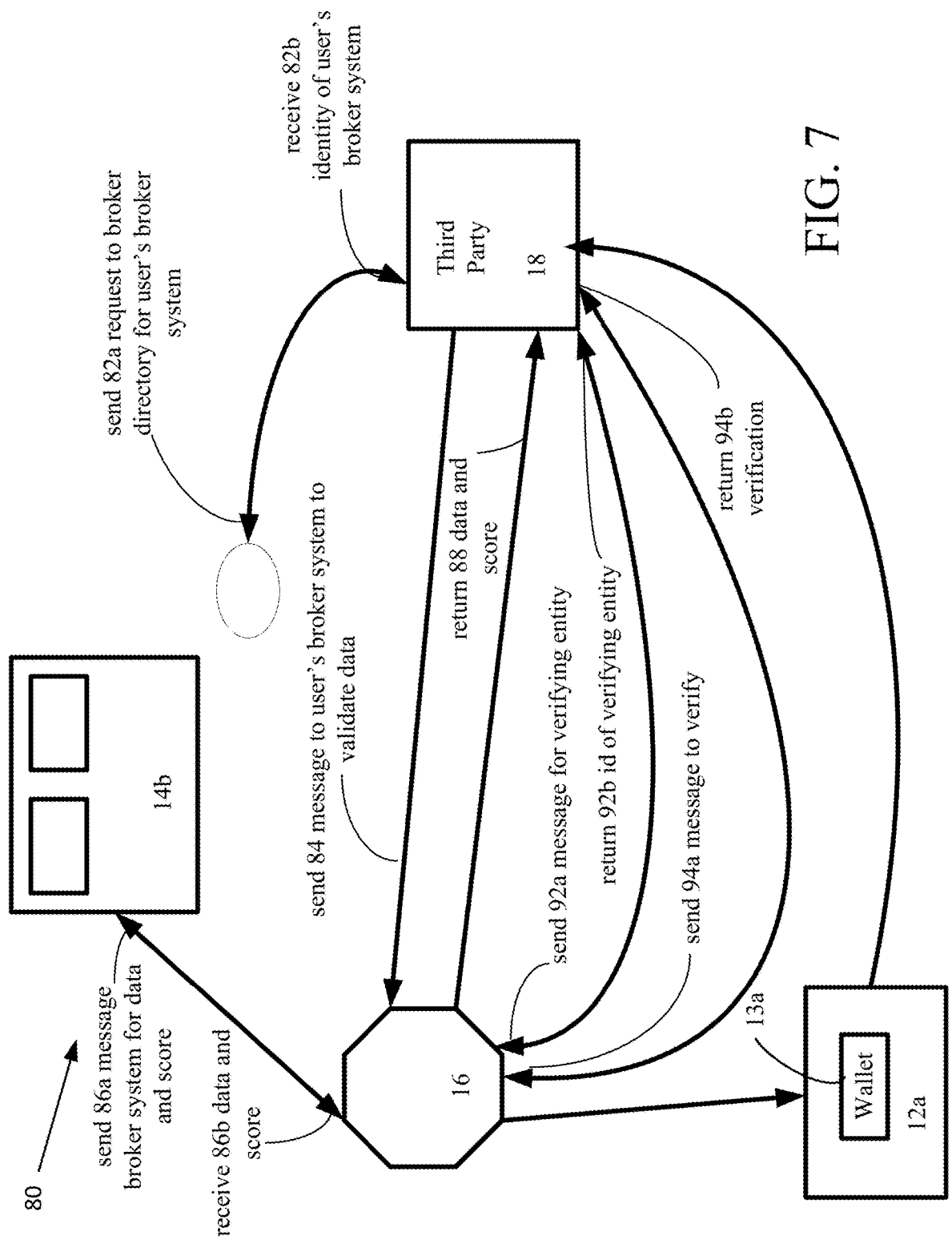
FIG. 7 a block diagram for still another process.

Referring now to FIG. 7, another process 80 is shown in which there is required validation of data through a private distributed ledger 14*b*. The third party system 18 sends 82*a* a message to a broker directory system 15 to locate the user's broker system. The broker directory system 17 determines the user's broker system and sends 82*b* a message to the third party system 18, which includes the identity of the user's broker system. The third party system 18 sends 84 a message to the determined user's broker system 16, which is a request to the user's broker system 16 to validate data and return score data. There are many algorithms that could be used for scoring. For example, a simple algorithm may assign a score to an attester as high, when the attester is a governmental agency and may score an attester as lower when the attester is a personal contact. The user's broker system 16 validates data by sending 86*a* a message to the distributed ledger 14*b* for the data and the score (of the data or the attester). The broker receives 86*b* from the distributed ledger 14*b* a message including the data and the score(s). The user's broker system 16 returns 88 the score(s) and status back to the third party system 18.

One approach for a private enterprise would be for an enterprise to define business rules that govern source attester scores. The rules could be absolutes. Alternatively, over time the system that determines the score builds "a transactional footprint" for transactions, which is based on physical access points, logical access points, time of day, duration of use, etc. used with a transaction record. Initial algorithms are determined at the initial deployment, and then are refined based upon a regression pattern(s) that emerges.

Optionally, the third party system 18 requests 92*a* a lookup of the broker/owner for the party that verified the data. The third party receives 92*b* the address of the broker/owner that verifies the data. The broker/owner system that verifies the data signs the data with its digital signature. The broker/owner system sends 94a a message to the verifying broker/owner to verify a signature of the signed data. Upon receiving 94b a verification from the verifying broker/owner system, the third party system has verification of the data without actually having accessed the data. Optionally, the user can share 96 the data to be validated with the third party directly from the user's wallet.

Figure 8:
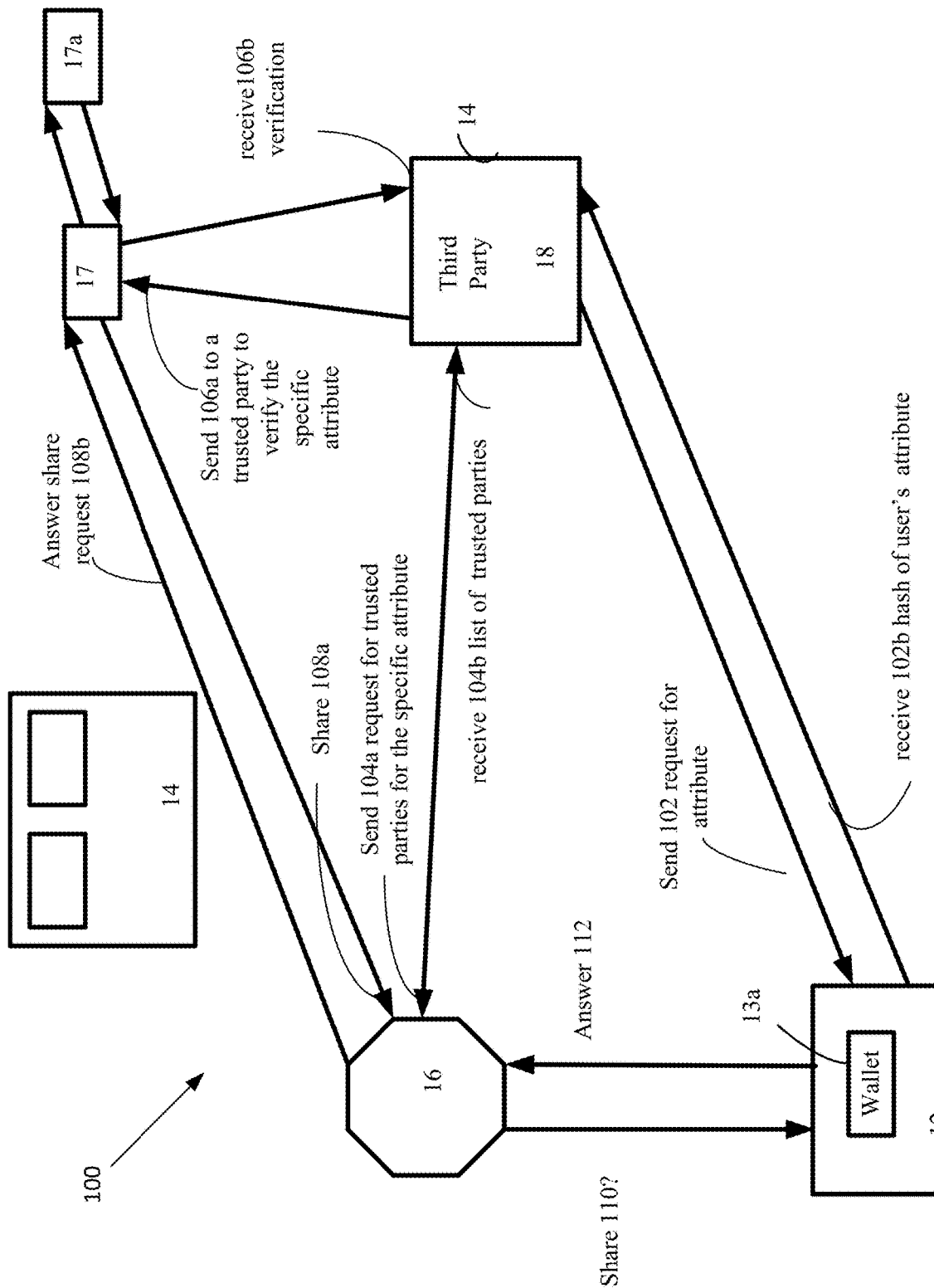
FIG. 8 is a block diagram for still another process.

Referring now to FIG. 8, another process 100 in which a third party requests validation of an attribute without actually disclosing the attribute is shown. This process 100 can be used, for example, to show that a person is at least of a particular age without actually disclosing the age. For instance, the case 100 can be used to verify that an individual is over the age of 21 without disclosing the actual age of the individual to the third party system 18. The third party system 18 sends 102 a request for a desired attribute to be verified, in this example age, to the wallet 13a.

In this process the wallet 13a does not send the hash of the age, it does allow the 3rd party to request age from the exchange but it does not send any hash or information. Ideally the rule is submitted to the exchange of the user (i.e. the request would be to validate if age is over 21). The user would authorize the exchange for this rule to be processed. The DMV would verify that the rule was authorized by the user through the exchange before processing actually occurs.

For example, for the attribute user's age, the trusted party that attested to the user's age could be the user's Department of Motor Vehicle (DMV) registry, which registry has systems that store users' ages of various users. The third party system receives 104b a list of one or more trusted parties, determines which of the trusted parties it wants to use to verify the user's attribute, and sends the requested rule, i.e., is age over 21. The DMV could verify that this rule was authorized by the information owner and if answering the rule was authorized, the DMV broker processes the rule and sends the response. That broker system 17 will, in turn, access a database 17a get obtain the hash of the user's age. The broker system 17 will send a message that asks 108a the broker system 16 if the user's info can be shared with the third party 18. The broker system will send 110 a message to the user's wallet asking if the DMV should notify the third party of the user's age. If an answer is received 112 by the broker indicating that validation is authorized, this message will be passed from the broker 16 back to the broker 17 and the broker 17 will have validated whether or not the user's age is as requested by the third party.

Referring now to FIGS. 9, 9A, an alternative implementation is shown in the context of an access control system. A facility 110 with access control is shown. In this illustrative example, the facility 110 includes two secured rooms 112a and 112b and a single external entryway 112c. Room 112a has a doorway 113a and has associated therein an access controller 116a and an ingress card reader 118a. Room 112b has a doorway 113b and has associated therein an access controller 116b and two card readers, an ingress card reader 118b and an egress card reader 118b'. The external entryway 12c has associated therewith an access controller 116c and two card readers, an ingress card reader 118c and an egress card reader 118c'. A detailed view of the external doorway is shown in FIG. 9A with exemplary door locks 122a, 122b controlled by the access controller 116c.

Figure 10:
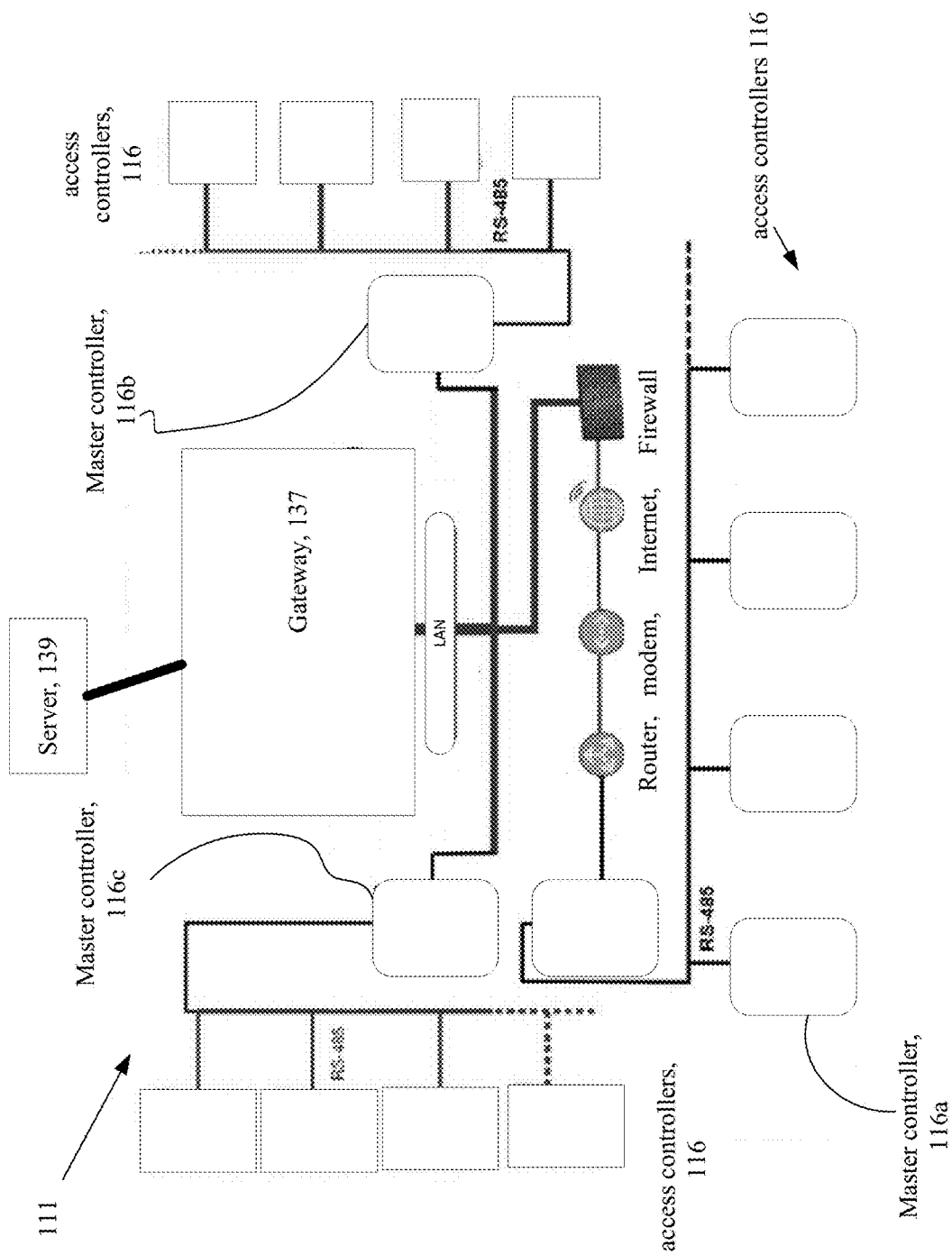
FIG. 10 is a block diagram of an example of an access control system.

Referring now to FIG. 10, access control system 111 for a typically facility 110 includes a plurality of access controllers generally 116. Each of the access controllers 116 can have designated master controllers (not shown). Conventional techniques to set up and associate these controllers with a security system can be used. During installation of an access control system, the access control system is configured by a technician according to operational requirements of the facility 110. The system also includes a gateway 137 that is coupled to the access controllers, e.g., via master controllers 116a-16c and a LAN, router, modem, to access the Internet and a firewall, as illustrated, and a server 139 that is coupled to the gateway 137. This is but an illustrative example.

The techniques disclosed herein converge physical security, logical security, and cyber security. A user desires access to a facility and to access a network. Every time a user requests access whether it is to open a physical door or log on to a network the system 10 is used manage and control dissemination of PII information and avoid the replication and duplication of such PII information. By use of the wallet as "an identity wallet," that could take on various physical forms such as a card, ring on a finger, a user device, the identity wallet contains attribute data associated with the user. In a private enterprise environment that is a self-contained enterprise a private distributed ledger 14 will be provided within that environment to allow the user to unlock and lock doors log onto networks etc. by either the distributed ledger and/or the broker exchanging messages with the wallet, as discussed above.

Figure 11:
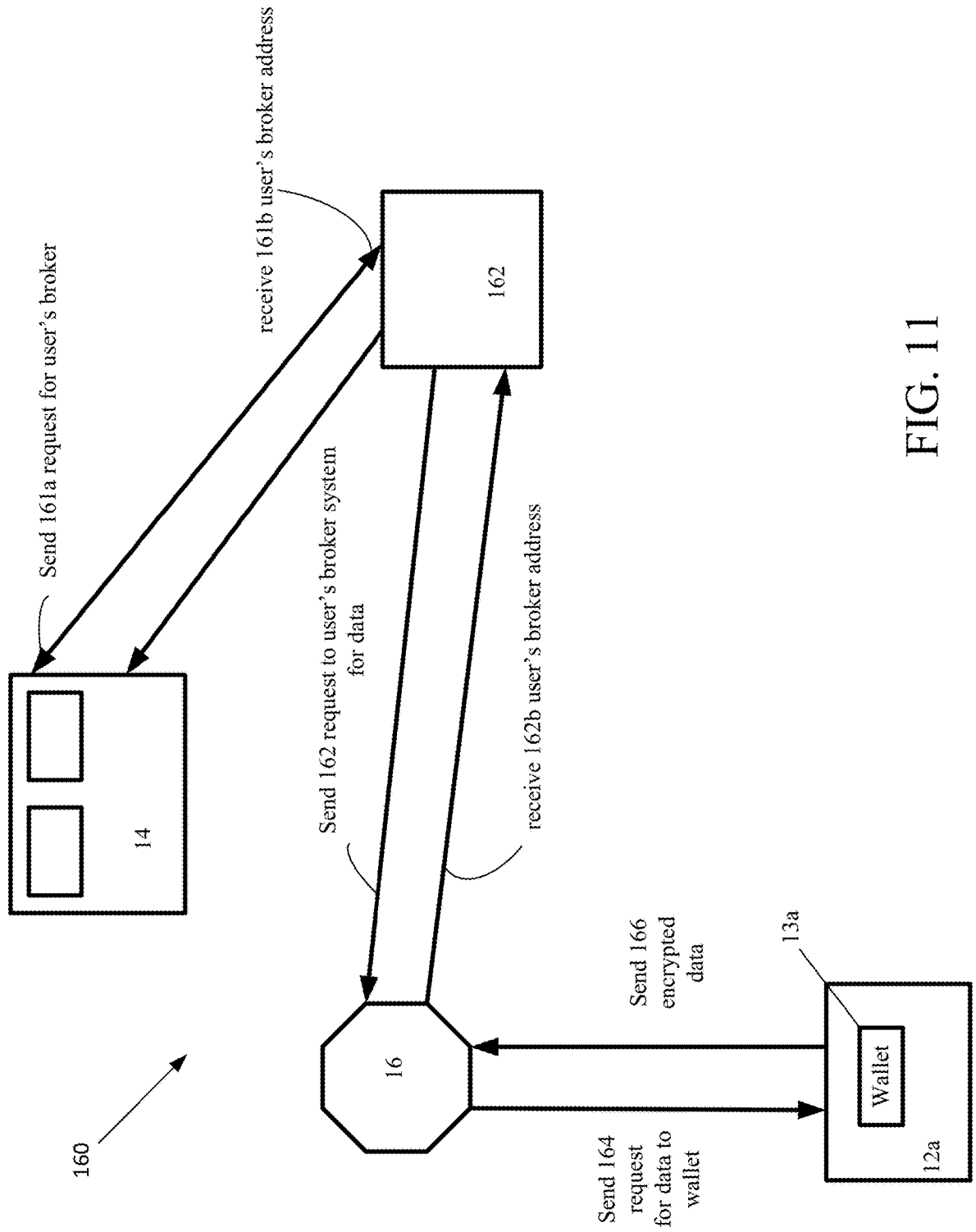
FIG. 11 is a flow diagram of an example of an access process with a wallet with an access control system.

Referring now to FIG. 11, a diagram of a process 160 and flow for the process 160 where a third party system 162 is an access control system and requests information from the user device 12a (via a card reader or equivalent) that is part of a third party system 162. In this case, the broker system 16 can provide an asynchronous transfer between the user device 12a and the third party device 162 of access and privilege credentials (that will control various aspects of what a user can access and use on premises 110.

The third party system 162 sends a message request 161a to the distributed ledger 14 for the user's broker system and receives 161b a message that includes the address of the user's determined broker. The third party device 162 sends 163 a message to the user's determined broker 16, which message includes a request to access data on the user's wallet 13a. The request for data is sent 165 from the broker system 14 to the user's wallet 13a. The user's wallet 13a (or other application or user via a physical action using a user input device) either answers (yes or no) or simply ignores the message. The wallet can also be configured to automatically accept as a frequent guest. When the answer is yes, the user's wallet 13a (or other application) encrypts the data using an asymmetric encryption algorithm that uses the requestor's public key. The encrypted data is sent 167 from the user's wallet 13a to the broker system 16 so that only the two endpoints (user's wallet 13a and the third party system 162) can read the actual data. At the broker system 16, upon reception of the encrypted data from the user's wallet 18a, the broker system 16 sends the data to the third party system 162. The third party system takes such action as needed by sending a signal to unlock a door, as in FIG. 9. Another data flow is the case where the facility actually produces a list of authorized users in the distributed ledger. The ledger 14 is then checked to see if the user is one of the authorized users.

Credential-Based Registration System

Described below are aspects of a mobile credential that is fully integrated into an access control system and configured to make permission decisions, provisioning privileges, etc. The mobile credential is stored in a user's wallet 13a and is identified as authentic by use of the distributed ledger 14. The distributed ledger 14 is used to supply secure credentials to the user's wallet 13a all of which have been validated by the distributed ledger 14. The mobile credential is used to produce an access token that has a very short lifespan. With the processes described below, the reader system can verify the access token as authentic and being from the user, and the user's wallet 13a can verify the facility as the facility to which the user should exchange credentials.

Figure 12:
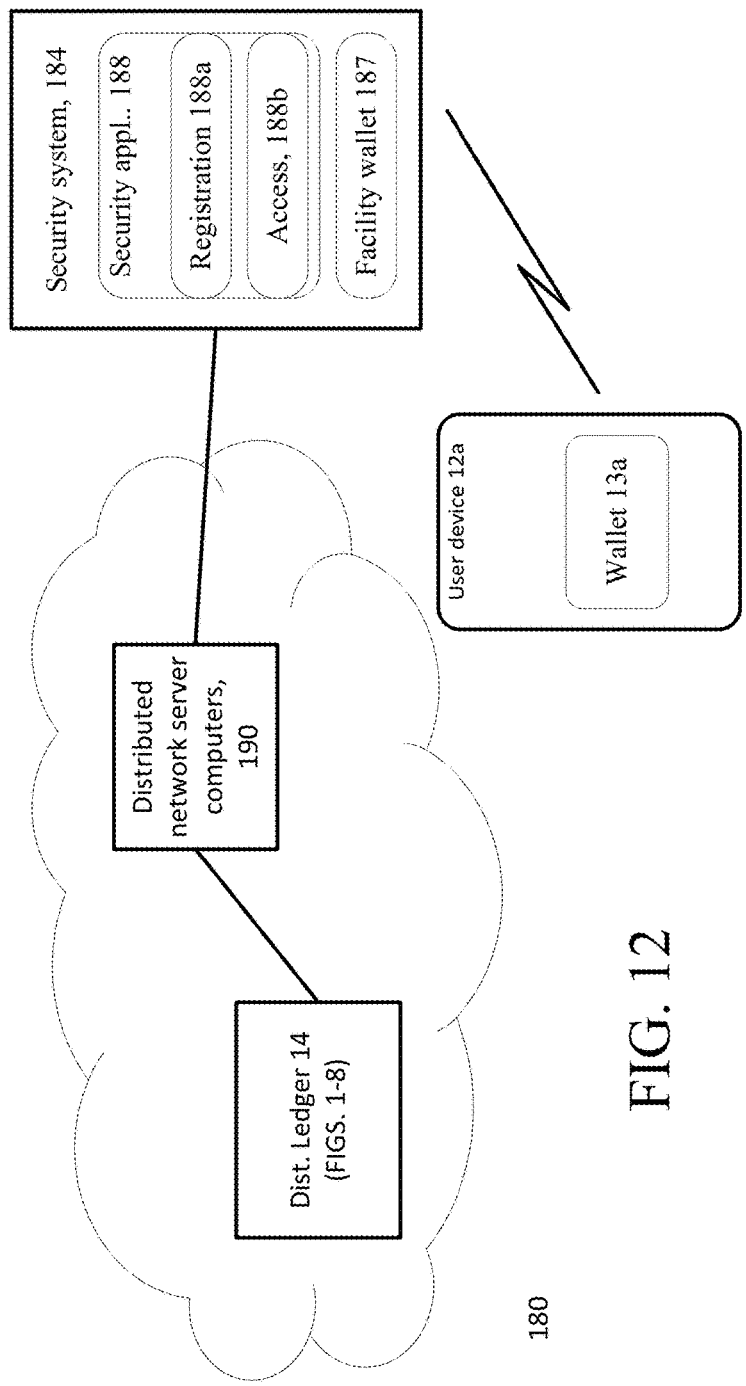
FIG. 12 is a block diagram of a registration and access system.

Referring now to FIG. 12, a credential-based registration/access system 180 that is a specialization of the system of FIG. 1, without the use of a broker system, is shown. The credential-based registration/access system 180 (registration/access system 180) is used for registration of a mobile credential with an access control system (such as FIGS. 9-10) using registration process 188a, the details of which will be discussed below in conjunction with FIGS. 13-15. The registration/access system 180 is also used with an access control system (such as FIGS. 9-10) for access to a facility or logical structure via the mobile credential using access process 188b, the details of which will be discussed below in conjunction with FIGS. 15-18A.

The registration/access system 180 includes the user device 12a having the wallet 13a. It is understood that a practical implementation would in general involve many such user devices/wallets of many users. The user device 12a and wallet 13a will be registered with the access control system and verified for use with the access control system. The registration allows a specific facility as well as any facility of the same entity to be registered by the mobile credential (if so desired by the facility owner). Additionally, the registration allows a specific facility as well as any facility of the same entity to be verified by user device prior to the user device exchanging any mobile credentials with the facility.

The credential-based registration/access system 180 (system 180) also includes a facility security system 184 including a facility security wallet 187 and a facility security application 188 that together with the user device 12a registers and verifies users, e.g., employees of an entity controlling the physical premises or logical structures, by use of the distributed ledger 14 and the distributed network server computers 190. The user device and the security system can be any type of computing system, computing station, computer server, tablet device, etc., that includes Bluetooth® or other near field communication capabilities that can send out a beacon signal, as discussed below. The security application 188 causes the security system 184 to continually or periodically issue the beacon that is readable by the user device 12a to initiate a transaction with the security system 184.

Figure 13:
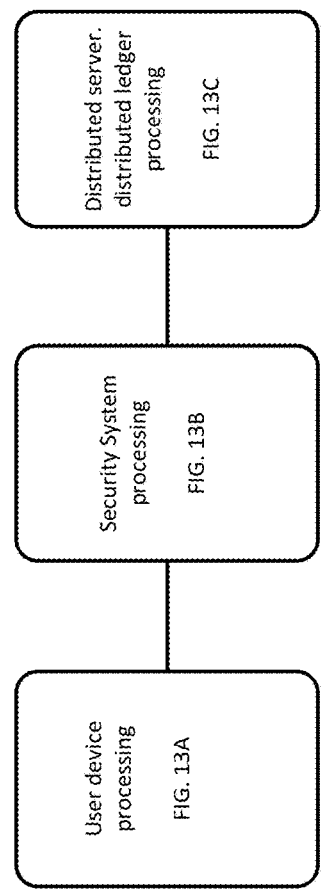
FIG. 13 is a flow diagram of a registration process.

Referring now to FIG. 13, a credential-based registration process flow 200 for registration of a mobile credential stored on the user device 12a (more specifically in the wallet 13a) with an access control system is shown. Shown in FIG. 13, are user device processing (FIG. 13A), security system processing (FIG. 13B) and distributed system/distributed ledger processing (13C). This credential-based registration process flow 200 (registration process 200) is shown for the user device 12a/wallet 13a, security system 184/security application 188, and the distributed servers 190 that interact with the distributed ledgers 14. The registration process 200 allows a user to verify a facility and allows any facility of the same entity to be registered by the mobile credential. The registration process flow 200 also allows the access control system to verify the identity of the user possessing the mobile credential for permitting registration for access to the facility (or facilities). The described registration process 200 uses the security application 188 to register and verify users, e.g., employees of an entity controlling the physical premises or logical structures.

Figure 13A:
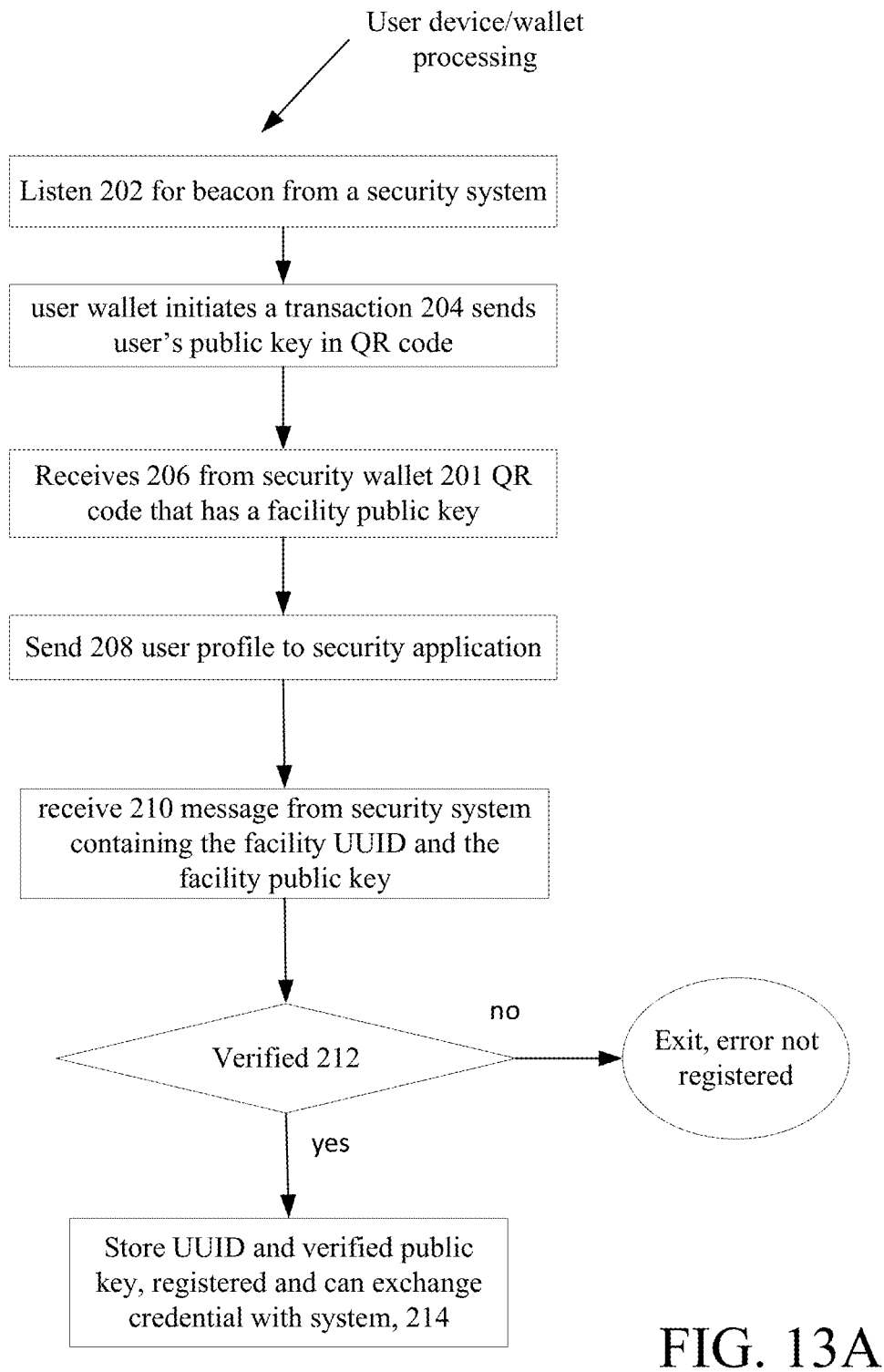
FIGS. 13A-13C are flow diagrams depicting details of the processing of FIG. 13.

Referring now to FIG. 13A, the user device 12a portion credential-based registration process flow 200 is shown. The user device 12a listens 202 for a beacon from the security system. The beacon includes a message to cause the user's device to initiate 204 a transaction with the security server to send the user's public key stored in the user's wallet 13a. The user's public key can be embedded in a code, such as a "QR"™ code (type of matrix barcode) that is stored in the user's wallet 13a. Other approaches could be used.

The user's wallet 13a requests 206 from a security wallet 201 of the security system 184, e.g., security application 188, an access QR code has embedded therein a facility public key. In some implementations, the facility public key as well as a facility UUID (discussed below) are specific to a single physical facility. However, in other implementations, the facility public key as well as the facility UUID are specific to a plurality of facilities of a single or related set of entities. From the wallet 13a, a user profile corresponding the user associated with the device 12a is sent 208 to the security application 188. As used herein a UUID is an identifier, e.g., such as a Universally Unique Identifier (UUID) per the UUID identifier standard that uses a 128-bit value.

Figure 13B:
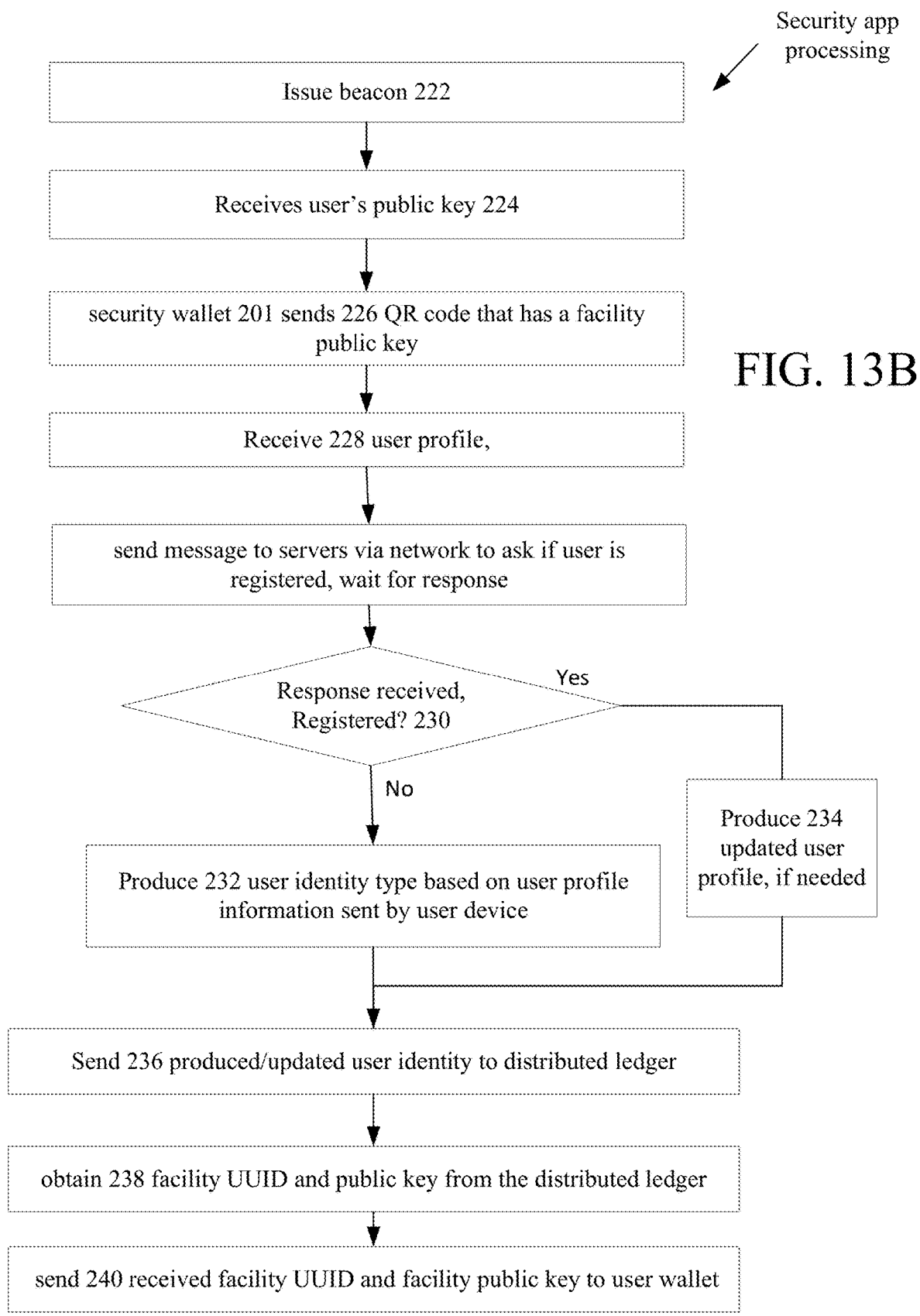

Referring now also to FIG. 13B, the security application 188 causes the security system to continually or periodically issue 222, a beacon, e.g., an electronic signal that is readable by the user device 12a. The security application receives 224 the user's public key. A security wallet 201 of the security application sends 226 a QR code that has a facility public key. The security application receives 228 the user's profile corresponding the user associated with the device 12a. Upon receiving the user profile, the security application 188 sends 228 a message to distributed networked servers to search for the user via the distributed ledger 14. Upon receipt 230 of a search result, if the user does not exist in the distributed ledger system 14, then the system will produce 232 an identity in the distributed ledger system 14 based on the user's received profile information. If the user profile does exist it may be updated 234, if needed, based on the received profile information. Thus, whether the security application 188 produces a new record for a new, unregistered user or adds updates attributes to a profile record of a registered user, the security application 188 sends the received profile over a network to verify 236 the profile and selects an identity type, e.g., employee or guest. The security system sends 236 produced/updated user identity to the distributed ledger 14, along with the received public key and user type (e.g., employee, guest) over a distributed network to the distributed ledger system 14 where the profile, public key of the user and the user type are stored.

At this juncture, the user has been verified. Thus, upon verification of the user, the facility can be assured that it can exchange credentials with the user device 12a and wallet 13a. The security system via the security application 188 sends 238 a message to the distributed network servers to obtain the facility UUID and the facility public key from the distributed ledger 14 and upon receiving the facility UUID and facility public key, sends 220 the facility UUID and the facility public key to the wallet 13a for verification and storage.

Referring now back to FIG. 13A, the wallet 13a receives 210 a message from the security system, which contains the facility UUID and the facility public key. The wallet 13a verifies 212 the facility public key using similar processes as discussed above. If verified the user device 12a and wallet 13a can be assured that this is a facility for which the user device 12a and wallet 13a can furnish a mobile credential. When verified the wallet stores 214 the UUID and facility public key.

Figure 13C:
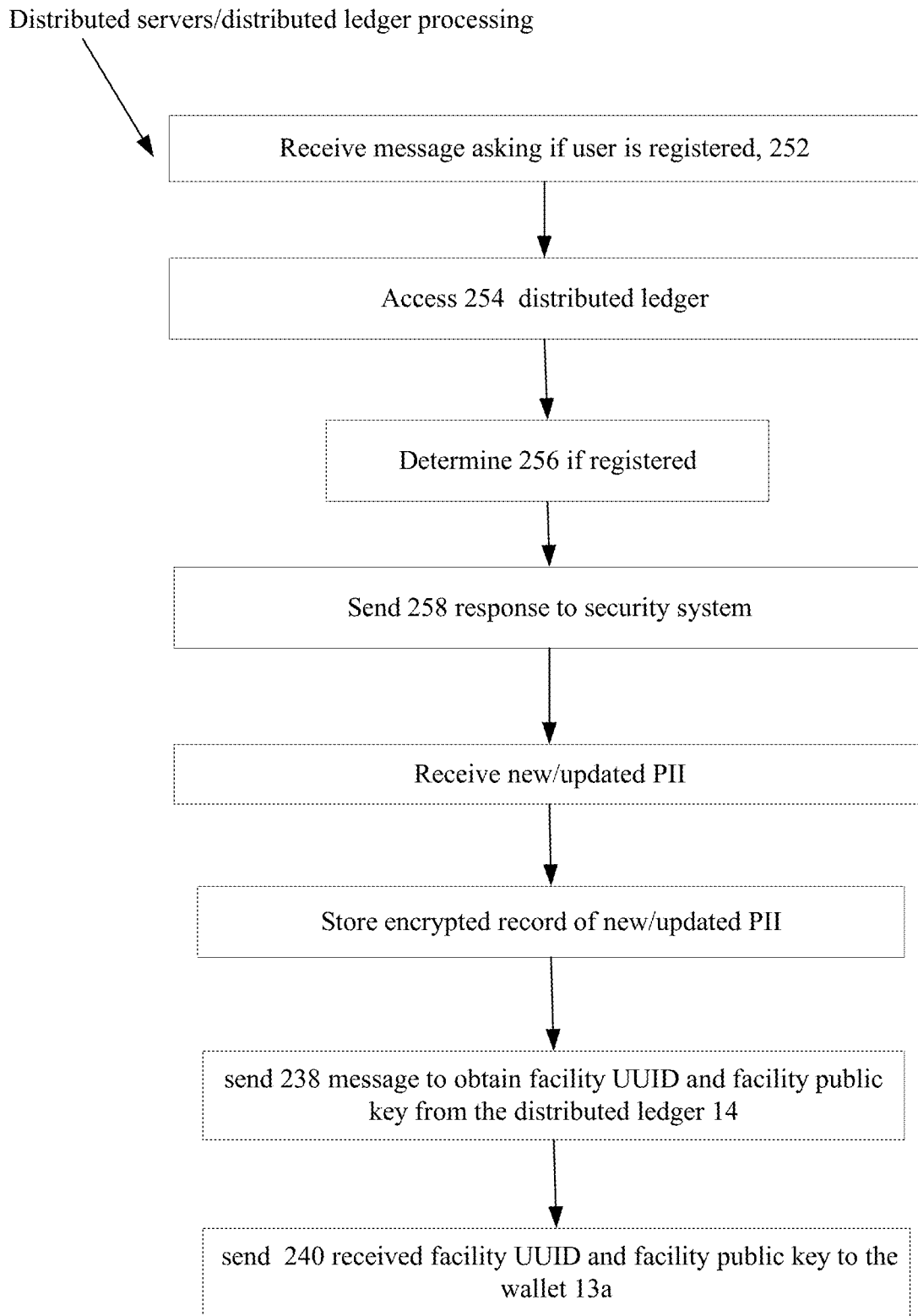

Referring now to FIG. 13C, the distributed servers receive 252 a message from the security system to conduct a search for a profile of the user. The distributed servers access 254 the distributed ledger 14. The distributed servers determine 256 if a profile exists by searching the distributed ledger system 14 for a profile of the user. The distributed servers send 258 a result of the search, e.g., registered, not registered, expired registration, etc. to the security system 18.

Each of the distributed databases 32a-32n of the distributed ledger system 14 will eventually receive 260 and store 262 an encrypted information record corresponding to the user's profile or PII. An exemplary profile record is shown below. The record is stored in each of the distributed databases 32a-32n that form the distributed ledger system 14 using the replication and duplication processes mentioned above. The distributed database 14 stores the record in an encrypted form in the distributed ledger system 14. The record has a structure that includes an attribute type, a hashed and encrypted value of the attribute, an attester's digital signature of the hashed and encrypted value and the attester's address.

An exemplary record format for the user associated with the user device 12a and wallet 13a is set out in the table below.

| Attribute type | Hashed and Encrypted Value of attribute type | Attester Signature | Attester Address |
|---|---|---|---|
| Attribute | encrypt(attribute) | Signature of encrypt(value) | Address |

An exemplary set of records is set out in the table below. Any attributes can be include in the set of records. A set of such records can correspond to the user's profile. This set (or profile) is added to the distributed ledger 14 as a new record or as new attributes are obtained these new attributes of the user are added to an existing record in the distributed ledger system 14.

| User Attribute | Hashed and Encrypted Value | Attester Signature | Attester Address |
|---|---|---|---|
| Citizenship | encrypt(USA) | Signature of encrypt(USA) | attst@cadmv.com |
| Current Age | encrypt(age) | Signature of encrypt(age) | attst@cadmv.com |
| Home Address | encrypt(address) | Signature of encrypt(address) | attst@cadmv.com |
| Height | encrypt(height) | Signature of encrypt(height) | attst@cadmv.com |
| Access credentials | encrypt(credentials) | Signature of encrypt(credentials) | secure@serv.com |
| * | * | * | * |
| * | * | * | * |
| * | * | * | * |

Figure 14:
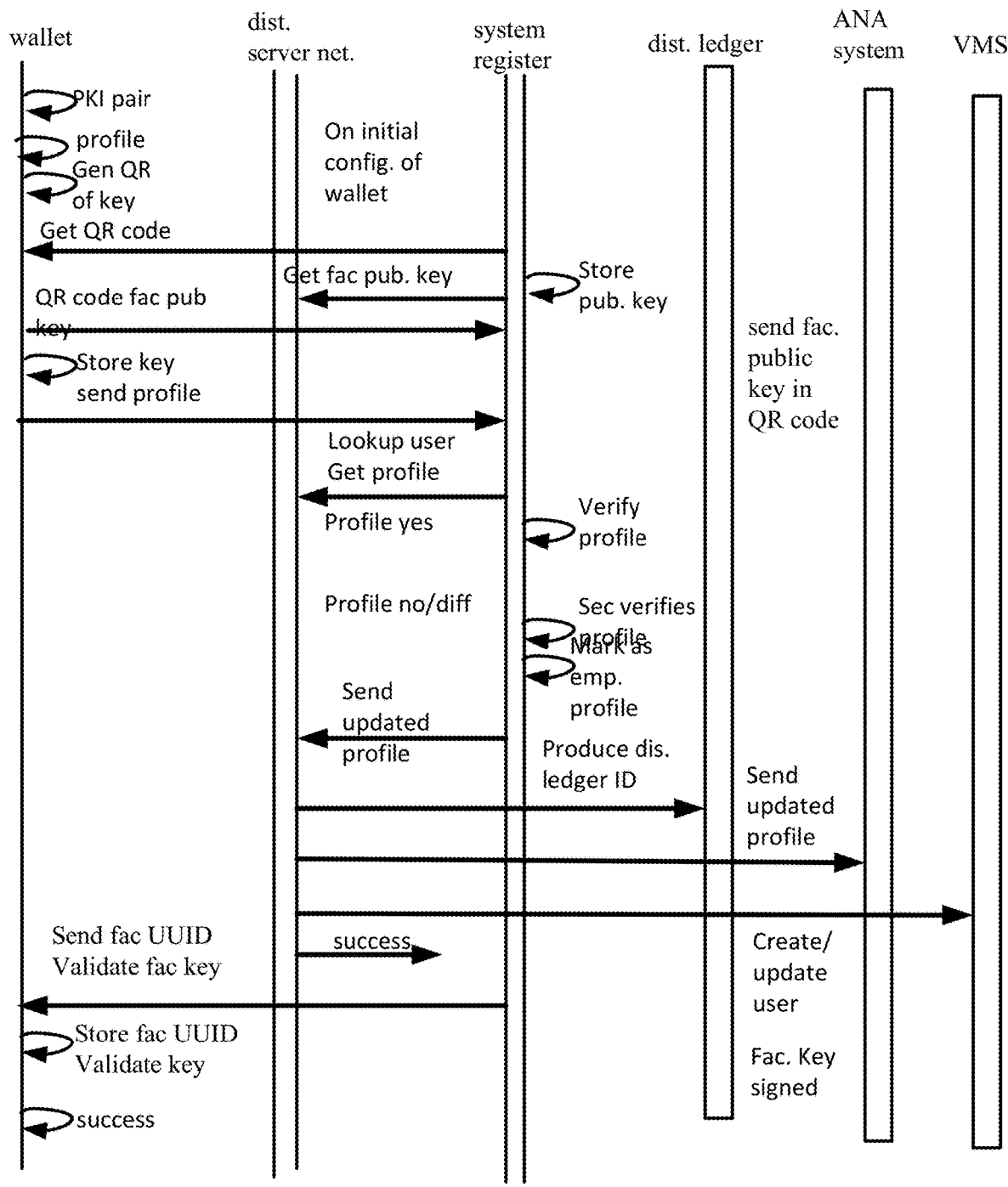
FIG. 14 is a time line flow for the registration process of FIG. 13.

Referring now to FIG. 14, a time line of the credential process flow for registration with the access control system from a mobile credential as discussed in FIGS. 13-13C is shown. The process time line flow shows messaging/functions that occur on with the wallet 13a, over the distributed network, a system register, and the distributed ledger system 14, with an a ANA system "Authenticated Network Architecture" where each individual user on a network has specific access privileges. Part of the authentication process is to verify the network entitlements for the user prior to granting access to a secure location or confidential information. A VMS system is a Visitor Management System that is infrastructure to handle registering and authentication calls for outside guests/visitors to a facility.

Credential-Based Access System

Figure 15:
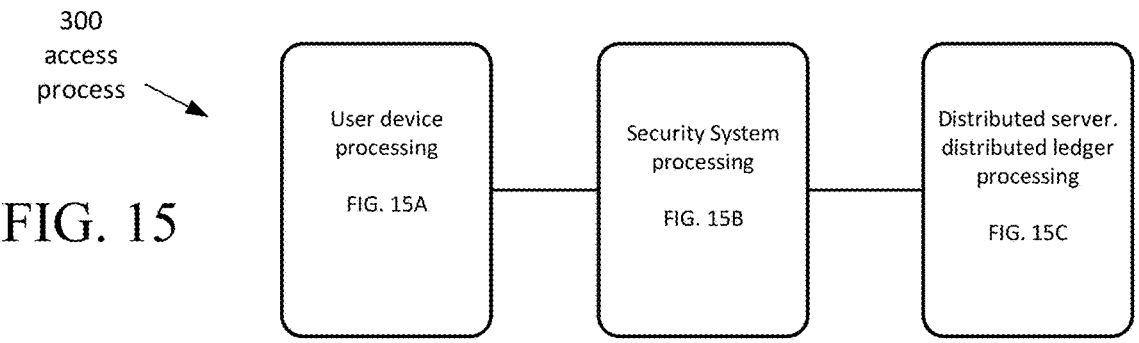
FIGS. 15, 17 and 18 are flow diagrams of respectively an access process for employee access and processes for wearable credential registration and access, respectively.

Referring now to FIG. 15, a credential-based access process flow 300 for permitting access to a registered mobile credential stored on the user device 12a (more specifically in the wallet 13a) to an access control system is shown. Shown in FIG. 15, are user device processing (FIG. 15A), security system processing (FIG. 15B) and distributed system/distributed ledger processing (15C). This credential-based access process 300 (access process 300) is shown for the user device 12a/wallet 13a, security system 184/security application 188, and the distributed servers 190 that interact with the distributed ledgers 14. The access process 300 allows a user to verify a facility and vice-versa. The credential process 300 can be configured such that access with a particular set of credentials is limited to a single physical facility or the credential process 300 can be configured such that the same set of credentials can be used for access to any number of facilities of the same entity to which the user would be normally granted access, depending on how the entity configures the access control process 300 and associated systems. The access process 300 also allows the access control system to verify the identity of the user possessing the mobile credential for permitting access to the facility (or facilities) or logical structures. In this example, the credential process 300 uses the access control 188b of the registration/access system depicted in FIG. 12.

The credential process 300 uses a credential exchange mechanism that allows a user's wallet 13a to verify each facility under control of an entity that issues its own credentials that can be traced by the facility, obviating need for a central, certificate issuing authority, by each facility having a unique certificate similar to those commonly found today in website certificates. However, in this instance, the company is the issuer of the certificate. This gives the ability to have the credential carrier roles and permissions, conveyed by the reader application exchanging the roles and permissions of a user, without having to go back to a central service. This allows local control (exchange process of certificates). The mobile wallet 13a can access permissions from central facility (one time load) without the local control having to go back to central facility each time access is attempted.

Digital certificates are issued by a certificate authority or certification authority (CA), i.e., an entity that issues and certifies digital certificates, which certification is used to verify the ownership of a public key by the named entity associated with the certificate. The certification enables others that rely upon signatures or assertions made about the private key as corresponding to the certified public key. In this model of trust relationships, a CA could be a third party or in some implementations could be the entity itself rather than a trusted third party—trusted both by the owner of the certificate and by parties that would be relying on the certificate. Public-key infrastructure (PKI) schemes feature certifying authorities.

Described is a facility security application 188 to access and verify users, e.g., employees.

Figure 15A:
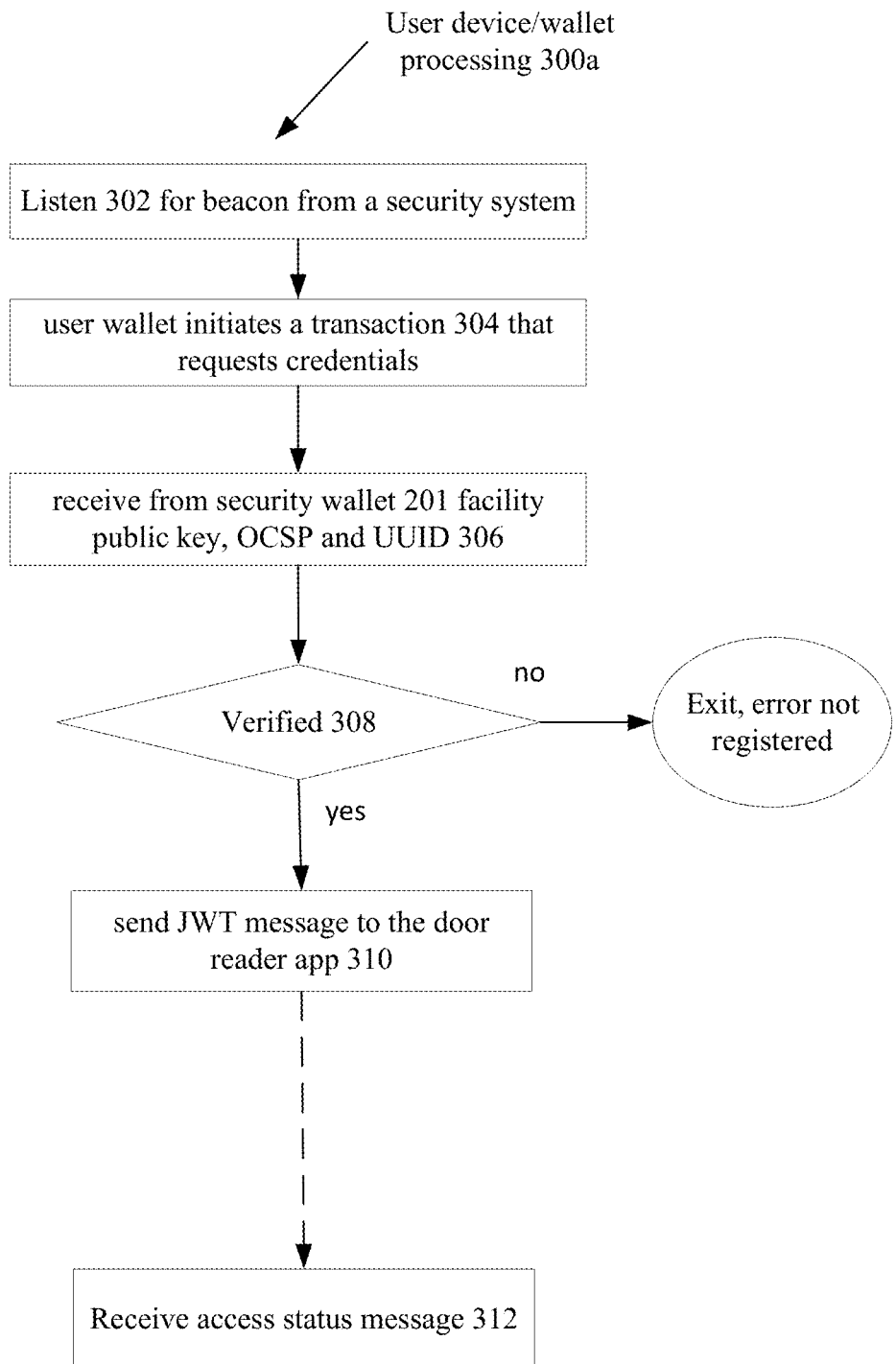
FIGS. 15A-15C are flow diagrams depicting details of the processing of FIG. 15.

Referring now to FIG. 15A, the user device 12a portion 300a of the credential-based access process 300 is shown. The user device 12a listens 302 for a beacon from the security system, via a card access reader (reader). The reader broadcasts a beacon (ID) that the smartphone receives and, which the mobile wallet detects. The user device 12a connects to the server, and the wallet 13a via the device 12a requests that the reader provide its credentials to the user device 12a. The beacon includes a message to cause the user's device 12a to initiate 304 a transaction with the reader to connect with the security server/security application. The user's wallet 13a requests 306 from the security wallet 201 of the security system 184, e.g., security application 188, a facility certificate, OCSP and facility UUID (discussed below). (OCSP) or "Online Certificate Status Protocol" is an Internet protocol used for obtaining revocation status of an X.509 digital certificate.

The user's device 12a verifies 308 the credentials sent to the wallet 13a from the security wallet 201 of the security system 184, e.g., the facility certificate, the OCSP and the facility UUID. If the reader is valid, then the reader will provide its facility UUID, the facility certificate (public key for the facility) as well as the company UUID and company certificate (public key of the company). The wallet 13a verifies if, the wallet 13a, is paired with the company.

Other approaches include the beacon ID being that of the company UUID and if the wallet 13a is paired with that company, the wallet 13a (via the device 12a) then connects to the reader and requests details. The wallet 12a via the user device, either connects and determines if the beacon is from a valid system or the beacon ID itself is formatted such that beacon from a valid system informs the wallet 12a that the beacon is from a reader and the wallet verifies the specifics by connecting to the reader.

The user's wallet connects to a reader application once a beacon is detected. The reader application has the facility certificate, the facility UUID, and a revocation status, e.g., such as via the "Online Certificate Status Protocol" (OCSP. Other approaches could use certificate revocation lists (CRL). The (OCSP) is now commonly used with public key infrastructure (PKI).

The OCSP and "OCSP stapling" that is a mechanism that obviates significant costs for certificate authorities (CA) having the certificate holder query an OCSP server at regular intervals to obtain a signed and time-stamped OCSP response that is attached or "stapled" with a response, obviating the need to of the CA to provide responses to every client of a given certificate. The OCSP and OCSP stapling can be used instead of CRL lists to determine if a certificate is valid or not. In the case of the mobile credential, the mobile wallet 13a has a trust relationship with the company so that the wallet 13a can verify those facilities that belong to the company. This trust is established because the company having a PKI pair (public and private key) and the mobile wallet and the company having securely told each other their respective public keys.

Since the mobile wallet knows the company's public key, the mobile wallet can trust that any packets signed by the company are valid and can be trusted. When the mobile wallet 13a accesses a facility, the facility provides its facility specific public key to the mobile device 12a (wallet 13a). The mobile wallet 13a does not know if this facility is authentic and part of the company that the wallet 13a holds a mobile credential for, and thus before the wallet 13a exchanges its credentials, the wallet 13a needs to verify for certain that the facility is authentic.

Authenticity of the facility is determined by the wallet 13a through verification of the facility's certificate. The verification process has the wallet 13a determine whether the facility certificate was signed by the company. If the certificate was signed by the company, then the wallet 13a verifies that the facility certificate and the signature match because the wallet has the company's public key and the wallet can verify the signature. If the signature is valid, then the wallet 13a knows that the facility certificate is authentic.

Although the certificate is authentic the wallet needs to verify that the certificate has not been revoked. The wallet can do this verification a number of ways. One way to verify that the certificate has not been revoked, has the wallet contact the company certificate authority directly through an OCSP request. The company certificate authority will provide an OCSP response that contains the status of the certificate (i.e. valid, revoked, etc.) and the response will be signed by the company. The wallet 13a can now verify the response is from the company and knows the status of the facility certificate. If the certificate is valid then the authentication process can continue. This process requires that the mobile wallet 13a has access to the company certificate authority which could be an issue with limited network connectivity and the latencies for the verification could be long, which considerations are not ideal.

Another way to verify that the certificate has not been revoked is that the facility contacts the company certificate authority on a periodic basis and receives the OCSP response, as discussed above. When the wallet 13a requests the facility key, the facility can include this OCSP response with its facility certificate (i.e. OCSP stapling). The wallet 13a then has the facility certificate that the wallet validates, as previously described, and it now has the OCSP response that the wallet can also validate using the same process as if the wallet obtained the OCSP directly from the company certificate authority.

The OCSP response has a time period where it is valid. This allows the facility to retrieve an OCSP response on a periodic basis (i.e. every hour) and it will always have a valid OCSP response available to send to the wallet 13a. This minimizes network connectivity issues and latency times since all exchanges between the wallet 13a and the facility are local.

Upon, the user's wallet 13a verifying the facility credentials, e.g., facility certificate, a revocation status and facility UUID, the user's wallet sends 310 a JWT message to the door reader app. The JWT message follows the so called JSON Web Token (JWT) format that is a JSON-based open standard (RFC 7519) for producing tokens that assert some number of "claims." The generated tokens, as above, are signed by the token producer's private key, so that door reader app in possession of the producer's public key is able to verify that the token is legitimate. The claims are used to pass identity of authenticated users between an identity provider and a service provider. The tokens can be authenticated and encrypted. Upon verification of the JWT message by the servers, the servers cause the reader to send an access status message that is received 312 by the wallet 13a, allowing or denying access to the facility.

An exemplary JWT message is set out below:

JWT Format

| Claims | |
|---|---|
| iss | Issuer. The UUID of the Mobile Wallet |
| aud | The UUID of the Reader being accessed |
| exp | Expiration time of the token. Set to 30 seconds |

| Claims | |
|---|---|
| jti | Unique token id. Server will track IDs over the expiration time period to ensure not duplicate JWT calls are made |
| iat | Time the token was issued/created |

Figure 15B:
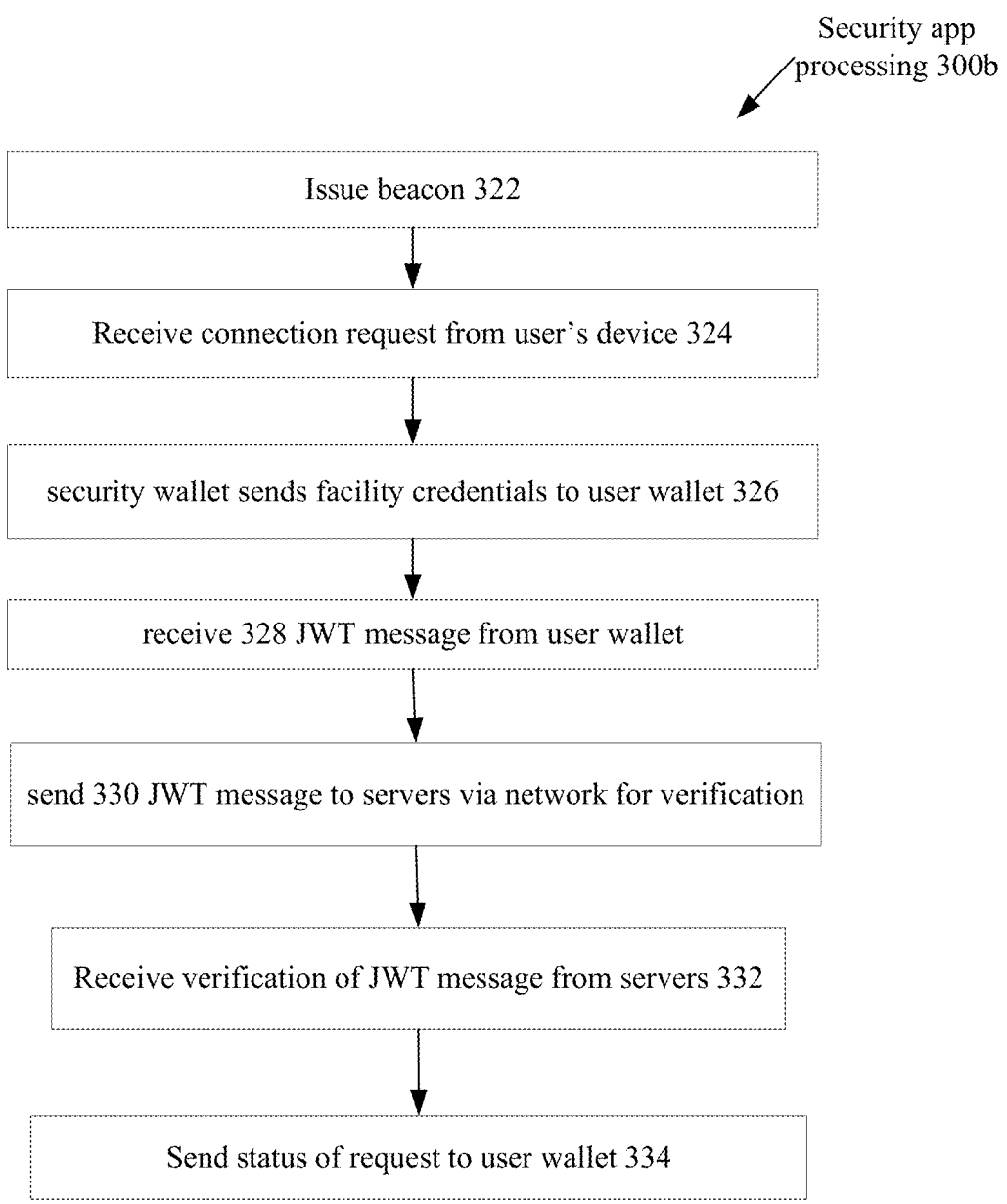

Referring now also to FIG. 15B, the security application 188 causes the security system to continually or periodically issue 322, the beacon that is readable by the user device 12*a* and which causes the user device to request 324 a connection to the reader. As mentioned above, the user device 12*a* upon connecting to the reader has the reader provide 326 its credentials to the user device 12*a* (wallet 13*a*). If the verification by the wallet was successful, the wallet sends the JWT message as discussed above, and upon receipt 328 of the JWT message by the reader, the JWT is sent 330 to the distributed network to a server that is used to verify the JWT token. Upon verification of the JWT message by the servers, the servers send the reader an access status message that is received 332 and is sent 334 to the wallet 13*a* allowing or denying access to the facility.

Figure 15C:
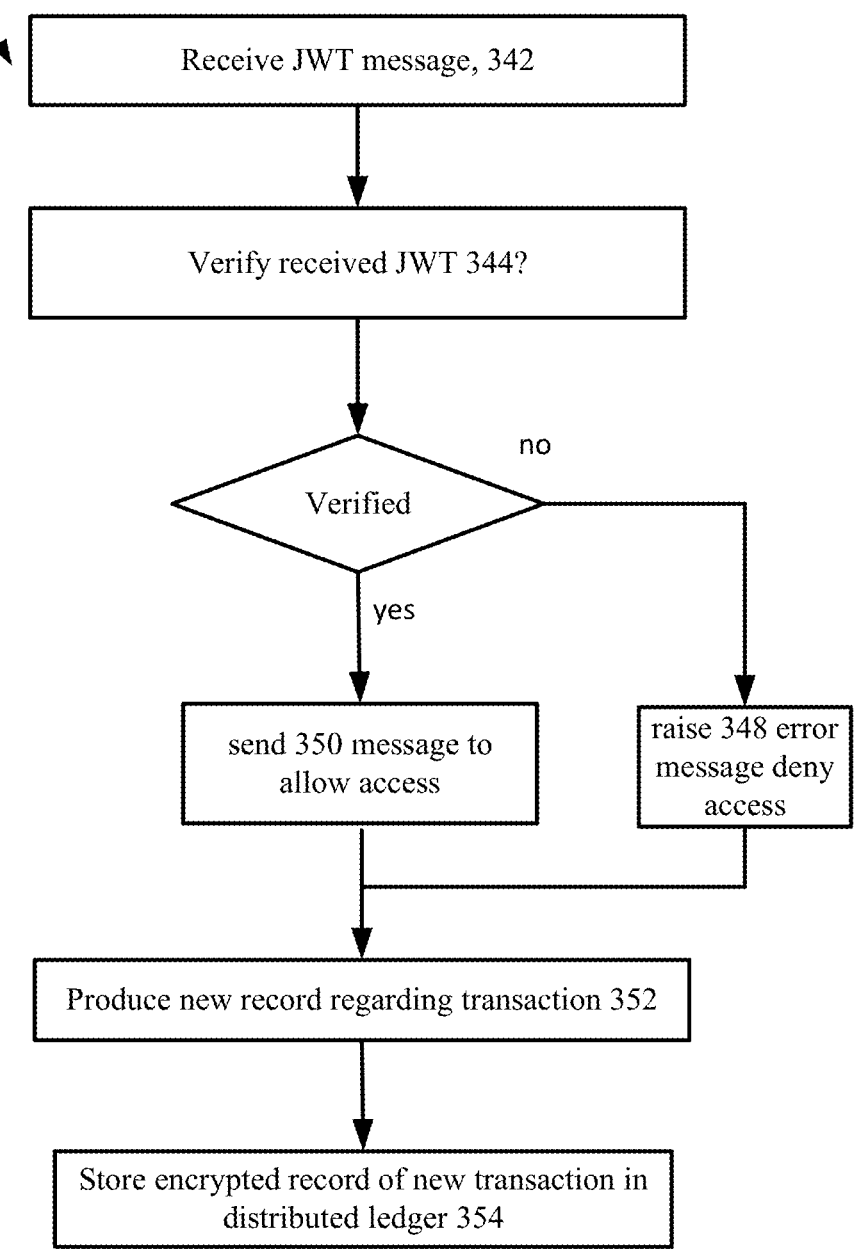

Referring now also to FIG. 15C, the JWT is received 342 and is verified 344. If the JWT is not verified, an error is raised 348 (see below). If the JWT is verified, 350 user is granted access, and an access control system grants the access and sends signal to unlock a door, etc. In addition, whether the JWT is verified or not verified, a corresponding entry record of either an access entry or an access denied entry is produced 352 as an access log that is stored 354 and maintained in the distributed ledger system.

There are a number of ways the system verifies the JWT. The verification process relies on the JWT being signed by the user's wallet 13*a* using its private key. In order for the reader (or other system upstream of the reader) to verify the JWT signature, the reader needs to know the public key of the mobile wallet. The reader or other system thus stores the wallet's public key. The reader accesses or retrieves from its storage, the public key for the wallet 13*a*.

The JWT contains the "iss" attribute which is a unique ID for the wallet. This unique ID is used by the reader or other system to obtain the stored public key and the JWT can be verified. If the token is not valid then an error response is sent to the wallet and access is not provided.

The JWT has an "aud" attribute that identifies the destination of the token (i.e., the reader UUID). The JWT also includes an "exp" attribute that sets the expiration time of the token, and a "jti" attributed, i.e., and ID that can be used by the Reader or which can be used by an upstream system to ensure that the token can be used only once during the validity time (i.e., replays would be prevented). The "iat" attribute indicates the time that the JWT was issued.

Thus, the security application 188 can send to the user device containing the wallet 13*a* a verified access or access error depending on the outcome of the process. All exchanges are logged in the distributed ledger for audit tracking, etc. Records are added to the distributed ledger as transactions and include a hashed record of the transaction, what was exchanged, the signatures of the parties, and may include additional detailed information depending on the type of distributed ledger used. The information stored for audit can include the date and time that the mobile wallet sent a JWT, the JWT parameters, and the access status or error conditions.

The JWT can also contain access policies that the reader can implement locally. For example, the JWT could contain roles that the wallet belongs to and those roles can be used by the reader to determine if the access should be provided or not with all decisions being made by the reader unit. This provides reduced latency in comparison with a centralized system approach where decisions based on roles, etc. are centrally made. The roles and access policies would be part of a JWT payload. A requirement would thus be that those roles and policies would need to be signed by the company and preferable would have an expiration date.

The reader will trust those policies if they meet the validation criteria which is composed of the follow types of checks:

The policies contain the wallet ID
The policies are signed by the Company
The policies are not expired The specifics of the encoding of the JWT payload have not been provided. However, the payload could be a binary payload inside of the JWT, an encoded attribute, or could be a second JWT produced by the company that the mobile wallet provides in addition to its own JWT, i.e., the company provided JWT for access. This second JWT produced by the company would contains the access policies, wallet id, and expiration time, would be signed by the company and the "iss" of the company.

Figure 16:
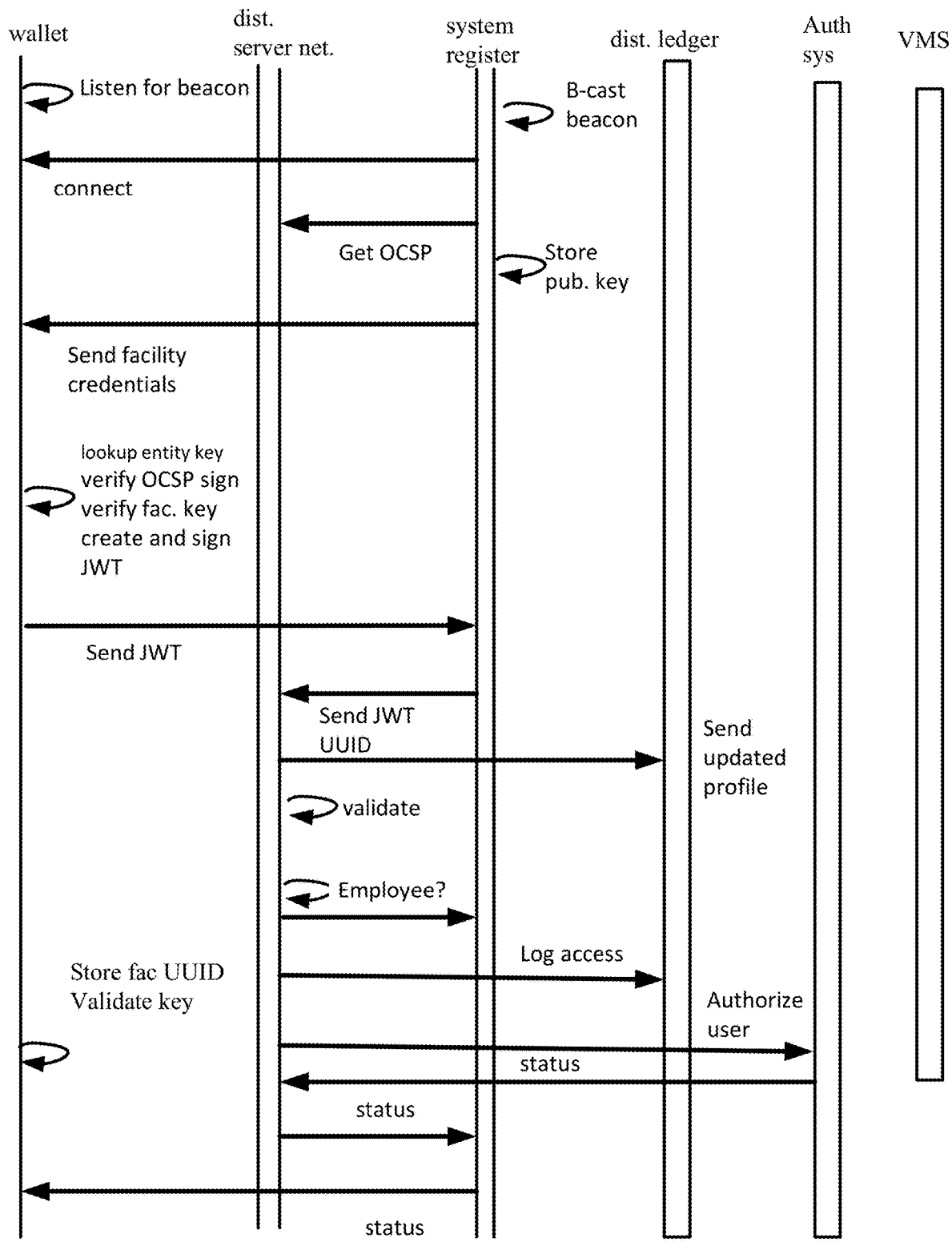
FIG. 16 is a time line flow for the access process of FIG. 15.

Referring now to FIG. 16, a time line of the credential process flow for access by the access control system from a mobile credential of a registered employee as discussed in FIG. 15, is shown. The process time line flow shows messaging/functions that occur among the wallet, the distributed network servers, a system register (security application) and the distributed ledger system, as well as the ANA system and the VMS system.

The system 180 of FIG. 12 uses a distributed ledger system managed identity. The user can have a "seal" or can be a first time visitor that has a seal produced. As used herein, a "seal" is a token that is registered on a user' wallet 13*s* to verify that the user has gone through an initial authentication process. This "seal" would contain a signature from the security server 184 that validated the user's wallet under specified conditions (time interval, security level, etc.).

Figure 17:
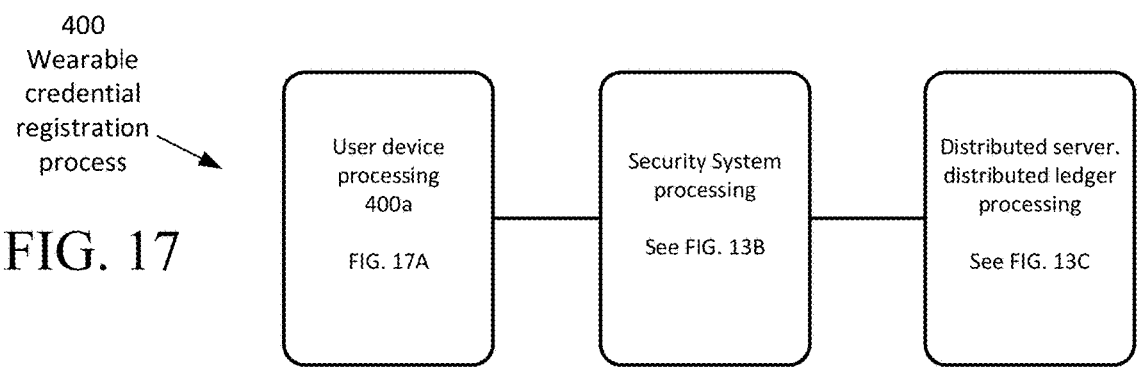

Referring now to FIG. 17, a wearable credential-based registration process flow 400 for registration of a mobile credential stored on the user wearable via a tablet computer or the like with an access control system is shown. Shown in FIG. 17, are user device processing (FIG. 17A), security system processing (FIG. 13B) and distributed system/distributed ledger processing (13C). The process flow 400 for registration with an access control system from a mobile, wearable credential in a near field communication enabled device (wearable credential device) is similar to that shown for the process as discussed in conjunction with FIGS. 13A-13C. The processing of FIG. 13A is somewhat modified, as shown in FIG. 17A.

Figure 17A:
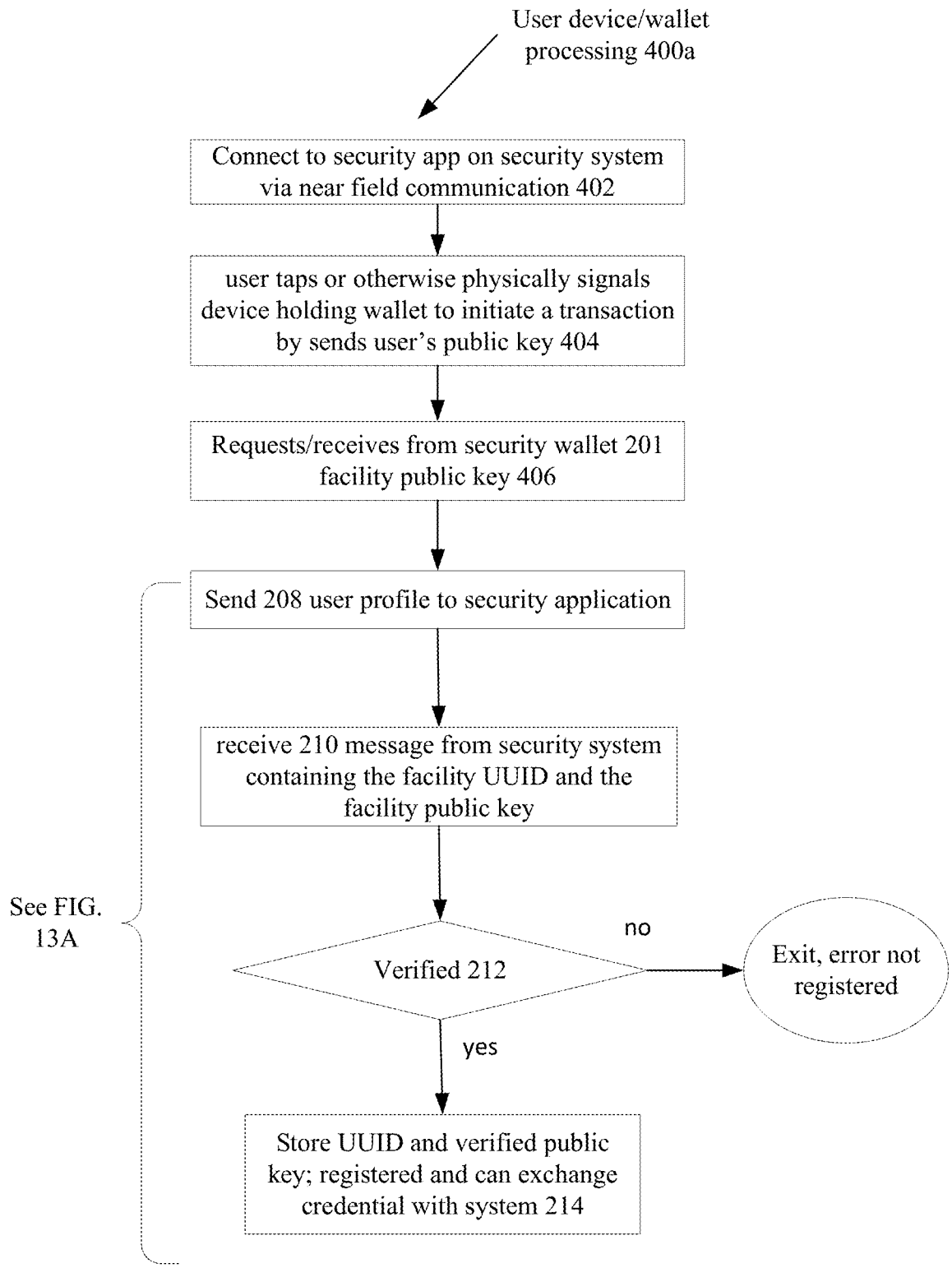
FIG. 17A is a flow diagram showing details of a portion of the processing of FIG. 17.

Referring now to FIG. 17A, in order to establish a connection between the wearable device and the security system, the process 400 uses an application such as an App that runs on a mobile computing device, e.g., a tablet computing device or the like. From wearable credential device, a near field communication systems, e.g., Bluetooth, NFC and the like, connects 402 to the user's wallet (e.g., on a smartphone or the like). The user via the wallet sends 404 the user's public key to the security application, e.g., by a physical signaling mechanism such as double tapping on the device holding the wearable wallet. The wallet also sends a request to obtain the facilities public key and receives the facility public key 406. In some implementations, the facility public key as well as the facility UUID are specific to a single physical facility. However, in other implementations, the facility public key as well as the facility UUID are specific to a plurality of facilities of a single or related set of entities.

The remaining processing is similar to that discussed in FIG. 13A and need not be repeated here. Similarly, the processing by the security system and distributed network and distributed ledger for FIG. 17 are similar to the processing of FIGS. 13B and 13C and are not repeated here.

In summary, as above in FIGS. 13, 13A-13C, from the wallet the user's profile is also sent to the security application. The security application 188 sends a message to a distributed network to search for the user. If a user does not exist in the distributed ledger system then the system will produce an identity in the distributed ledger system based on the profile information. The security application 188 sends the received profile over a network to verify the profile and select an identity type. The security application 188 sends/updates the received profile, public key and user type over a distributed network for transfer to and storage in the distributed ledger system, where the profile, public key of the user and the user type are stored. The security application 188 sends the facility UUID and the facility public key to the wallet where the facility UUID is stored and the facility public key is verified. The wallet sends a confirmation or an error for display on a display of the table device, executing the security application.

The process 400 allows a user to verify a facility and allows any facility of the same entity to be accessed with the wearable credential device, while the system can verify the identity of the user by possessing a credential in the wearable credential device. The described facility security application 188 registers and verify users, e.g., employees. The wearable credential device can be of various types such as a ring, bracelet/armband, a heartbeat monitor strap or pin, an ankle bracelet, a pin on a shoe to monitor walking pattern, anything which can store a user's credential(s).

As used throughout this application "credentials" refer to pieces of information that are used in cryptography to establish a user's identity to a recipient device. Examples or credentials includes machine-readable cryptographic keys and/or passwords. Credentials as used herein are issued by a trusted third party and include an unambiguous association of the credential with a specific, real individual or other entity (facility). Credentials are often configured to expire after a certain period, although this is not mandatory. Credentials take several forms, such as the UUID and certificates mentioned herein as well as user credentials. In some instances, credentials can be based on personal "signatures." These "signatures" can capture personal characteristics, such as voice patterns, retina scans, heart beat rhythms, etc., but at some level would still include information in the form of keys/passwords, etc.

Figure 18:
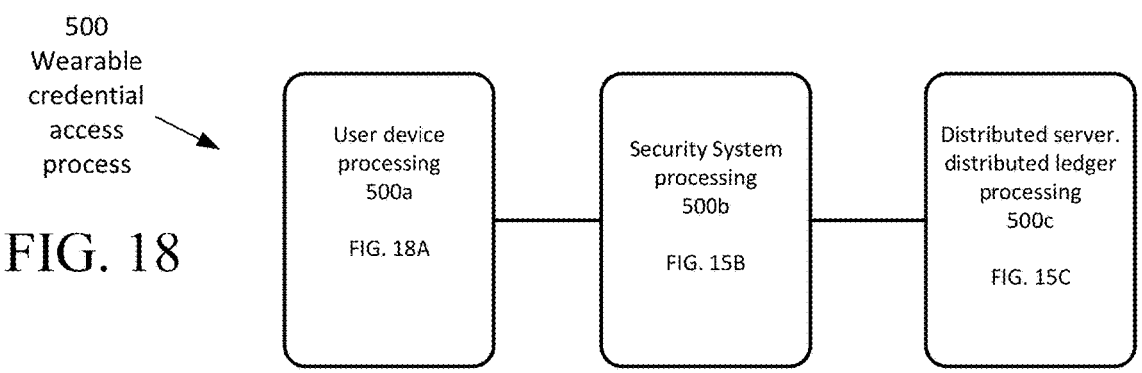

Referring now to FIG. 18, a wearable credential-based access process flow 500 for allowing access to an access control system, by a user having a mobile credential stored on the user wearable via a tablet computer or the like is shown. Shown in FIG. 18, are user device processing 500a (FIG. 18A), security system processing 500b (similar to processing in FIG. 15B) and distributed system/distributed ledger processing 500c (similar to processing in FIG. 15C). The process flow 500 for access to an access control system from a mobile, wearable credential in a near field communication enabled device (wearable credential device) is similar to that shown for the process as discussed in conjunction with FIGS. 15A-15C. The processing of FIG. 15A is somewhat modified, as shown in FIG. 18A.

Figure 18A:
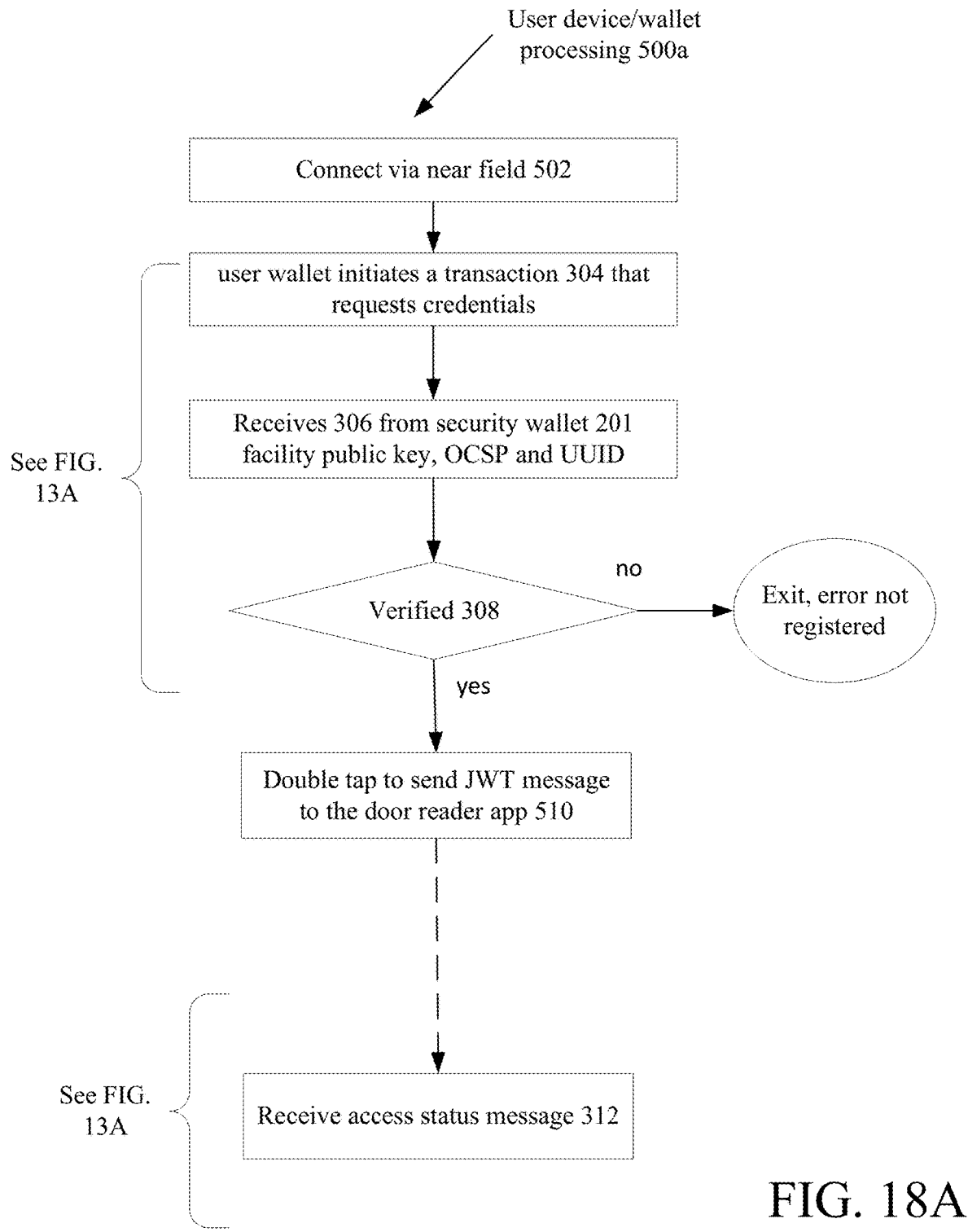
FIG. 18A is a flow diagram showing details of a portion of the processing of FIG. 18.

Referring now to FIG. 18A, in order to establish a connection between the wearable device and the security system, process 500a uses an application such as an "App" that runs on a mobile computing device, e.g., a tablet computing device or the like. From a wearable credential device, a near field communication systems, e.g., Bluetooth, NFC and the like, connects 502 to the user's wallet (e.g., on a smartphone or the like). The processing is generally similar to that of FIG. 15A, except that a physical action on the user's tablet computer may be used to send the JWT message 510 to the security application.

The processing not discussed in FIG. 18A is similar to that discussed in FIG. 15A and need not be repeated here. Similarly, the security system processing 500b and distributed network and distributed ledger processing 500c are similar to the processing of FIGS. 15B and 15C, respectively, and are not repeated here.

In summary, as above in FIGS. 15, 15A-15C, the credential process 500 allows a verified user to access a facility and allows either a single physical facility or any facility of the same entity to be accessed, depending on how the entity configures the system, while the system verifies identity for permitting access. The process 500 uses an access application, such as an App that runs on the mobile computing device, e.g., the tablet computing device or the like discussed above. From the access application the device holding the wallet either connects via near field or listens for a beacon, as discussed above. The user's wallet on the device connects to a reader application on the tablet device once a beacon is detected is detected and verified as discussed above. The reader application has the facility certificate, the facility UUID, and a revocation status, e.g., such as via the "Online Certificate Status Protocol" (OCSP) discussed above. Other approaches could use certificate revocation lists (CRL), as mentioned above.

The user's wallet connects with the wearable credential device that verifies the facility credentials, e.g., facility certificate, revocation status and facility UUID, and upon verification sends notification to the wallet device. The device sends a JWT message to the door reader app. The JWT message follows the so called JSON Web Token (JWT) format discussed above. The generated tokens, as above, are signed by the token producer's private key, so that door reader app in possession of the producer's public key is able to verify that the token is legitimate. The claims are used to pass identity of authenticated users between an identity provider and a service provider. The tokens can be authenticated and encrypted. The exemplary JWT message set out above can also be used here.

From the access application, the JWT message is sent to the distributed network to a server that is used to verify the JWT token. If the JWT is not verified an access error (access denied) is logged, as discussed above. If the JWT is verified, user is granted access, and an access control system grants the access and sends signal to unlock a door, etc. In addition, if the JWT is verified, in addition to the access control system granting access an access entry is produced in an access log that is stored and maintained in the distributed ledger system.

As above, the security application 188 can send to the user device containing the wallet a verified access or access error depending on the outcome of the process. All exchanges are logged in the distributed ledger for audit tracking, etc., using the processes discussed above. The information stored for audit can include the date and time that the mobile wallet sent a JWT, the JWT parameters, and the access status or error conditions.

Credential-Based Guest Access System

In the context of a guest, guest registration discussed below can give a visitor user access to a front door if the visitor user has a seal (discussed above) and is scheduled for a meeting in the facility. The system using the ANA system (discussed above) provisions the wallet 13a to automatically sign-in the visitor via a visitor pad (badge printed, etc.), and notifies a host system. With the seal, the visitor guest with the wallet 13a is allowed to access a door during scheduled visit time.

The Registration of the Guest, and Employee and Manager approval process follows the process above, with the following additions. After approvals, the Guest is registered into the VMS system and when the Guest shows up at the facility, the guest will scan the outside reader to gain access to a designated location, e.g., a building lobby). The scan verifies whether the visitor is supposed to be at that location. The system will tell the VMS that the guest has signed in, the VMS notifies the Employee, and the employee, after meeting the visitor, can accept the sign-in which will activate the Guests access to the building door readers for the time period of their visit. Details of these processes are discussed below.

Figure 19:
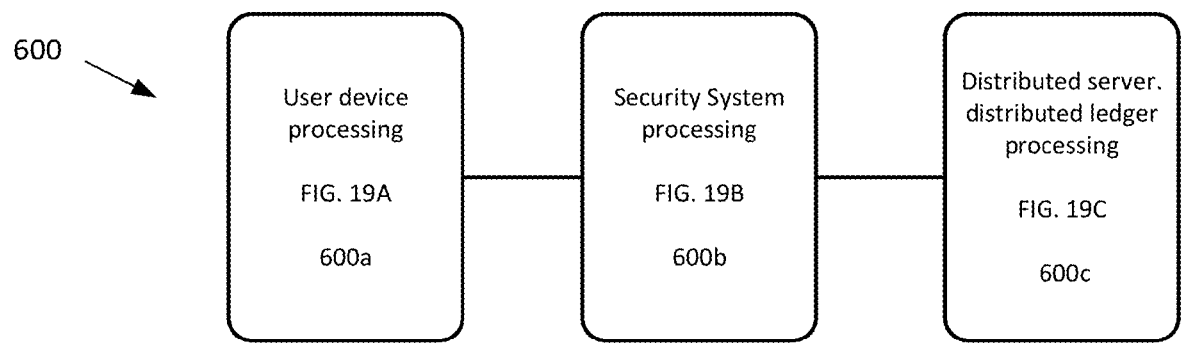
FIGS. 19 and 21 are flow diagrams depicting guest access processing.

Referring now to FIG. 19, a credential-based access process flow 600 for permitting access to a registered mobile credential stored on a guest's device 12a (more specifically in the wallet 13a) to an access control system is shown. Shown in FIG. 19 are guest device processing 600a (FIG. 19A), security system processing 600b (FIG. 19B) and distributed system/distributed ledger processing 600c (19C). This credential-based access process 600 (access process 600) is shown for the guest device 12a/wallet 13a, security system 184/security application 188, and the distributed servers 190 that interact with the distributed ledgers 14.

The access process 600 allows a guest, e.g., a visitor to verify a facility and vice-versa. The guest has a mobile, wearable credential in a near field communication enabled device (wearable credential device) as shown and a guest wallet in a guest device. This process is used with a guest, meaning a person not normally expected at a facility but who has been registered at the facility by an entity having privileges to register guests that may seek legitimate access to the facility over defined days/periods of time/specified purposes. The mobile device carries the guest wallet 13a and listens for a beacon, as above. The process 13a uses an access application, such as an App that runs on a lobby placed kiosk or kiosk.

The process 600 uses a credential exchange mechanism that allows a guest's wallet 13a to verify the facility under control of an entity that issues its own credentials that can be traced by the facility, obviating need for a central, certificate issuing authority, by the facility having a unique certificate similar to those commonly found today in website certificates. However, in this instance, the company is the issuer of the certificate. This gives the ability to have the credential carrier roles and permissions, conveyed by the kiosk application exchanging the roles and permissions of a guest, without having to go back to a central service. This allows local control (exchange process of certificates). The mobile wallet 13a can access permissions from central facility (one time load) without the local control having to go back to central facility each time access is attempted.

Digital certificates are issued by a certificate authority or certification authority (CA), i.e., an entity that issues and certifies digital certificates, which certification is used to verify the ownership of a public key by the named entity associated with the certificate. The certification enables others that rely upon signatures or assertions made about the private key as corresponding to the certified public key. In this model of trust relationships, a CA could be a third party or in some implementations could be the entity itself rather than a trusted third party—trusted both by the owner of the certificate and by parties that would be relying on the certificate. Public-key infrastructure (PKI) schemes feature certifying authorities.

Described is a facility security application 188 to access and verify guests, e.g., employees.

Figure 19A:
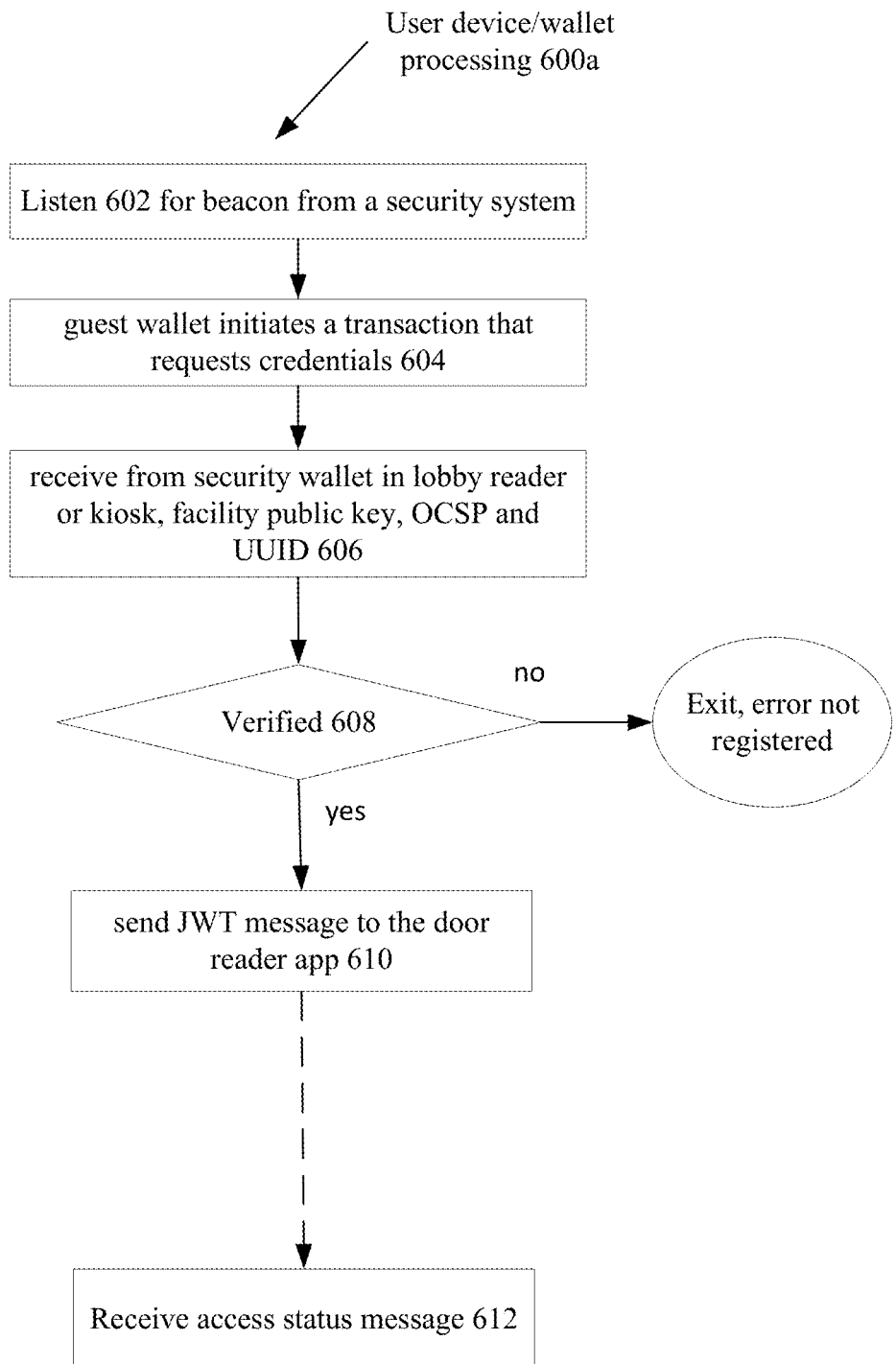
FIGS. 19A-19C are flow diagram showing details of the processing of FIG. 19.

Referring now to FIG. 19A, the guest device 12a portion 600a of the credential-based access process 600 is shown. The guest device 12a listens 602 for a beacon from the security system, via a card access kiosk (kiosk). The lobby kiosk (or station) broadcasts a beacon (ID) that the smartphone receives and, which the mobile wallet detects. The guest device 12a connects to the kiosk, and the wallet 13a via the device 12a requests that the kiosk provide its credentials to the visitor's device 12a. The beacon includes a message to cause the visitor's device 12a to initiate 604 a transaction with the kiosk to connect with the security server/security application on the kiosk. The guest's wallet 13a requests 606 from a security wallet 601 in the kiosk, e.g., security application 188, a facility certificate, OCSP and facility UUID (discussed below).

The guest's device 12a verifies 608 the credentials sent to the wallet 13a from the security wallet 201 of the security system 184, e.g., the facility certificate, the OCSP and the facility UUID. If the kiosk is valid, then the kiosk will provide its facility UUID, the facility certificate (public key for the facility) as well as the company UUID and company certificate (public key of the company). The wallet 13a verifies if, the wallet 13a, is paired with the company.

Other approaches include the beacon ID being that of the company UUID and if the wallet 13a is paired with that company, the wallet 13a (via the device 12a) then connects to the kiosk and requests details. The wallet 12a via the visitor's device 12a, either connects and determines if the beacon is from a valid system or the beacon ID itself is formatted such that beacon from a valid system informs the wallet 12a that the beacon is from a kiosk and the wallet verifies the specifics by connecting to the kiosk.

The visitor's wallet connects to the application once the beacon is detected. The application has the facility certificate, the facility UUID, and a revocation status, e.g., such as via the "Online Certificate Status Protocol" (OCSP) with or without OCSP stapling, as discussed above. Also other approaches could use certificate revocation lists (CRL), as discussed above.

Since the mobile wallet knows the company's public key, the mobile wallet can trust that any packets signed by the company are valid and can be trusted. When the mobile wallet 13a accesses a facility, the facility provides its facility specific public key to the mobile device 12a (wallet 13a). The mobile wallet 13a does not know if this facility is authentic and part of the company that the wallet 13a holds a mobile credential for, and thus before the wallet 13a exchanges its credentials, the wallet 13a needs to verify for certain that the facility is authentic.

Authenticity of the facility is determined by the wallet 13a through verification 608 of the facility's certificate. The verification process has the wallet 13a determine whether the facility certificate was signed by the company. If the certificate was signed by the company, then the wallet 13a verifies that the facility certificate and the signature match because the wallet has the company's public key and the wallet can verify the signature. If the signature is valid, then the wallet 13a knows that the facility certificate is authentic.

Although the certificate is authentic the wallet needs to verify that the certificate has not been revoked. The wallet can do this verification a number of ways, as discussed above.

Upon, the guest's wallet 13a verifying the facility credentials, e.g., facility certificate, a revocation status and facility UUID, the guest's wallet sends 610 a JWT message to the door kiosk app. The JWT message follows the so called JSON Web Token (JWT) format that is a JSON-based open standard (RFC 7519) for producing tokens that assert some number of "claims." The generated tokens, as above, are signed by the token producer's private key, so that door kiosk app in possession of the producer's public key is able to verify that the token is legitimate. The claims are used to pass identity of authenticated guests between an identity provider and a service provider. The tokens can be authenticated and encrypted. Upon verification of the JWT message by the servers, the servers cause the kiosk to send an access status message that is received 612 by the wallet 13a, allowing or denying access to the facility, typically to a lobby door.

An exemplary JWT message is as set out above.

Figure 19B:
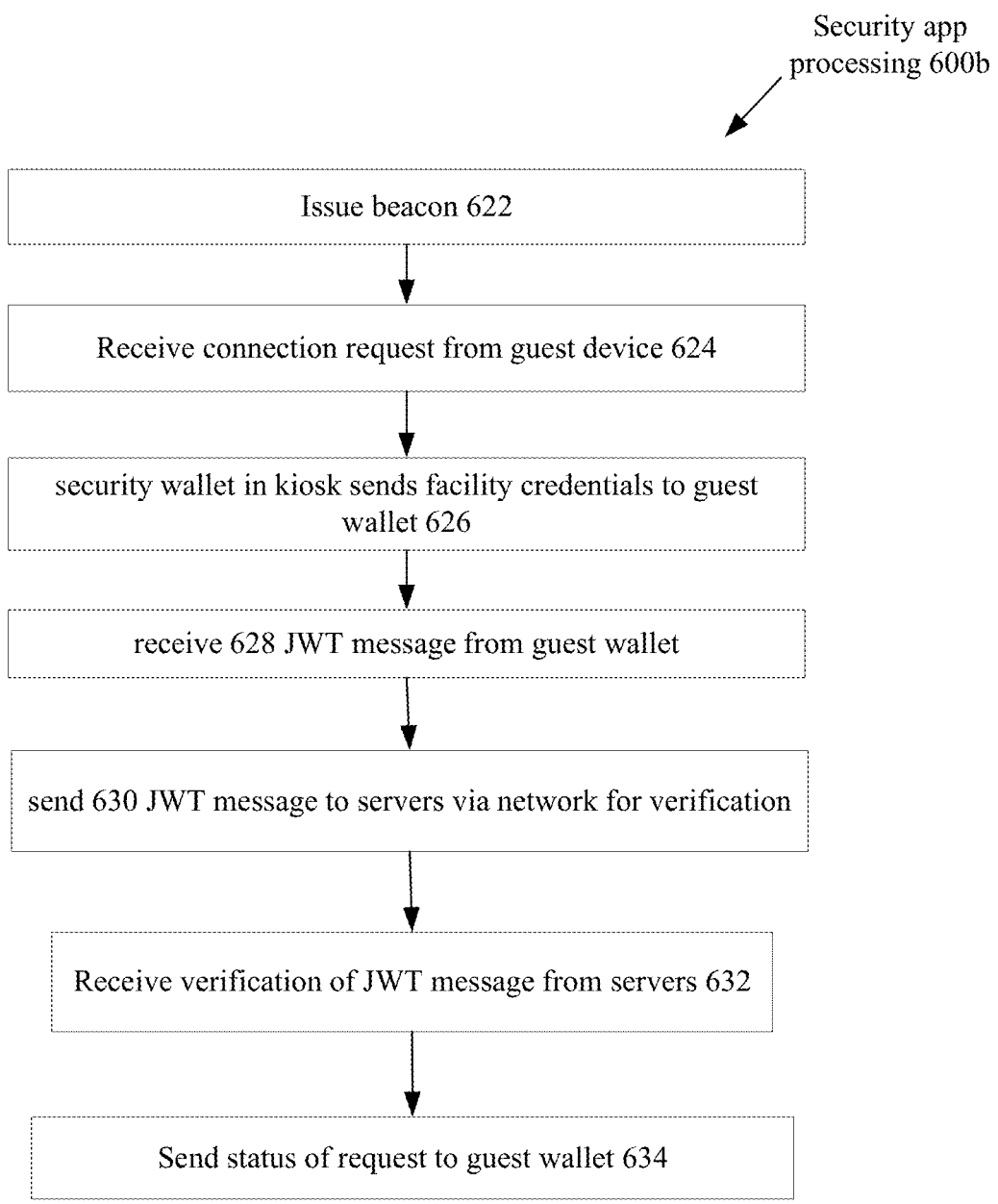

Referring now also to FIG. 19B, the security application 188 causes the security system to continually or periodically issue 622, the beacon that is readable by the guest device 12a and which causes the guest device to request 624 a connection to the kiosk. As mentioned above, the guest device 12a upon connecting to the kiosk has the kiosk provide 626 its credentials to the visitor's device 12a (wallet 13a). If the verification by the wallet was successful, the wallet sends the JWT message, and upon receipt 628 of the JWT message by the kiosk, the JWT is sent 630 to the distributed network to a server that is used to verify the JWT token. Upon verification of the JWT message by the servers, the servers send the kiosk an access status message that is received 632 and is sent 634 to the wallet 13a allowing or denying access to the facility.

Figure 19C:
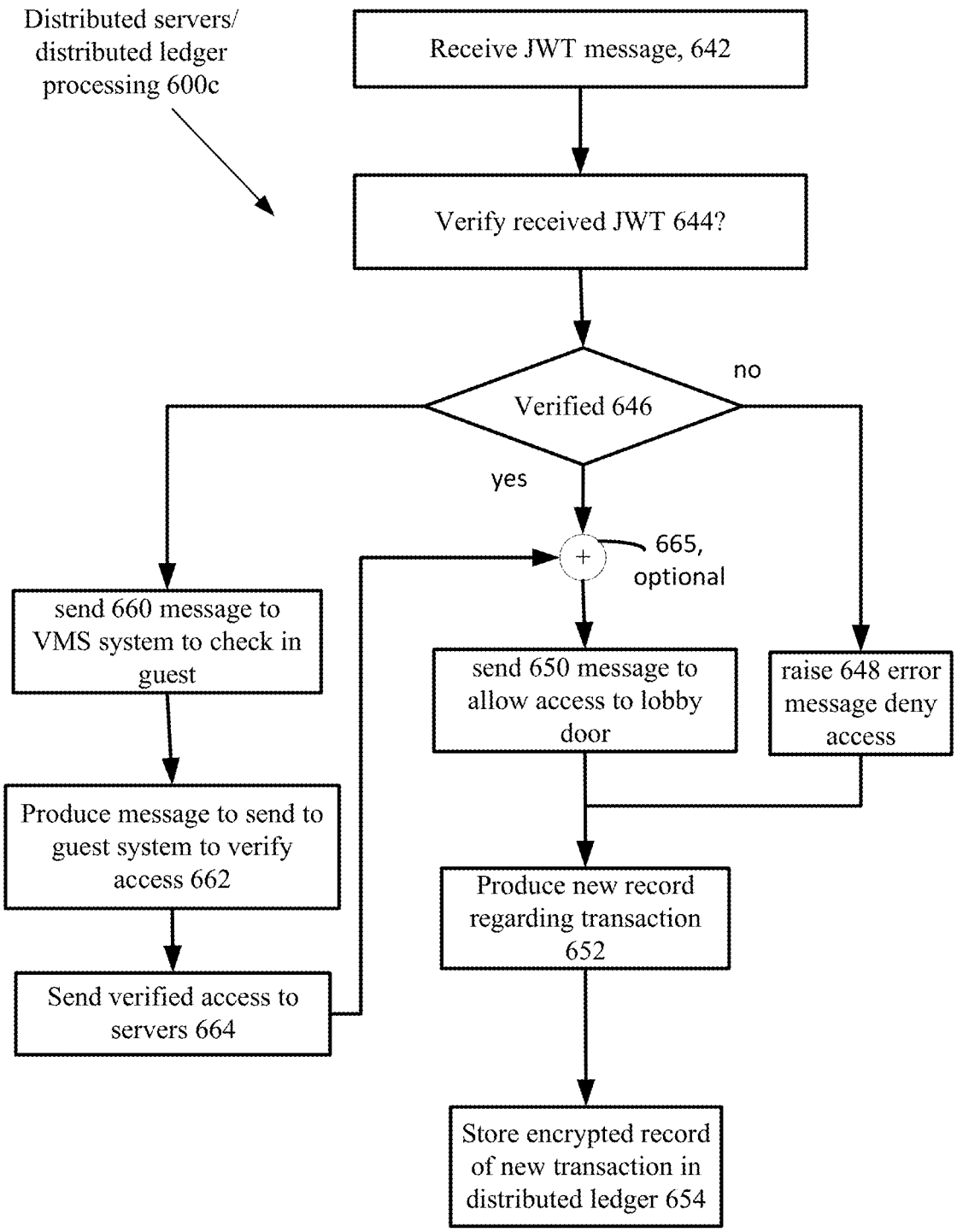

Referring now also to FIG. 19C, the JWT is received 642 and is verified 644. If the JWT is not verified, an error is raised 648 (see below). If the JWT is verified, 646 the guest is granted access 650, and an access control system grants the access and sends signal to unlock a door, etc. In addition, whether the JWT is verified or not verified, a corresponding entry record of either an access entry or an access denied entry is produced 652 as an access log that is stored 654 and maintained in the distributed ledger system.

The security application 188 sends a check-in guest message to the VMS system, to verify that the guest has a scheduled visit. The VMS system notifies C-Cure when the guest has a verified meeting by pushing a notification via the distributed network to the C-Cure. If the JWT is verified, user is granted access, and an access control system grants the access and sends signal to unlock a door, etc., as generally discussed above. In some implementations when granting access the system also checks current time/date and if guest has been activated and time/date is within a window for which access would be permitted, e.g., a meeting window The distributed servers send 660, via a guest system, to the guest's host device containing a wallet (not referenced), a verified access notification. In some implementations, this message when received by the guest's host's wallet will produce 662 guest notification that causes 664 a guest activation message to be produced, which together 665 with the access message 650 are used by the servers to grant access, e.g., a message is sent to a system such as C-Cure that sends an unlock message to unlock a lobby door.

All exchanges are logged in the distributed ledger for audit tracking, etc. Records are added to the distributed ledger as transactions and include a hashed record of the transaction, what was exchanged, the signatures of the parties, and may include additional detailed information depending on the type of distributed ledger used. The information stored for audit can include the date and time that the mobile wallet sent a JWT, the JWT parameters, and the access status or error conditions. Any of the ways discussed above to verify the JWT can be used.

Figure 20:
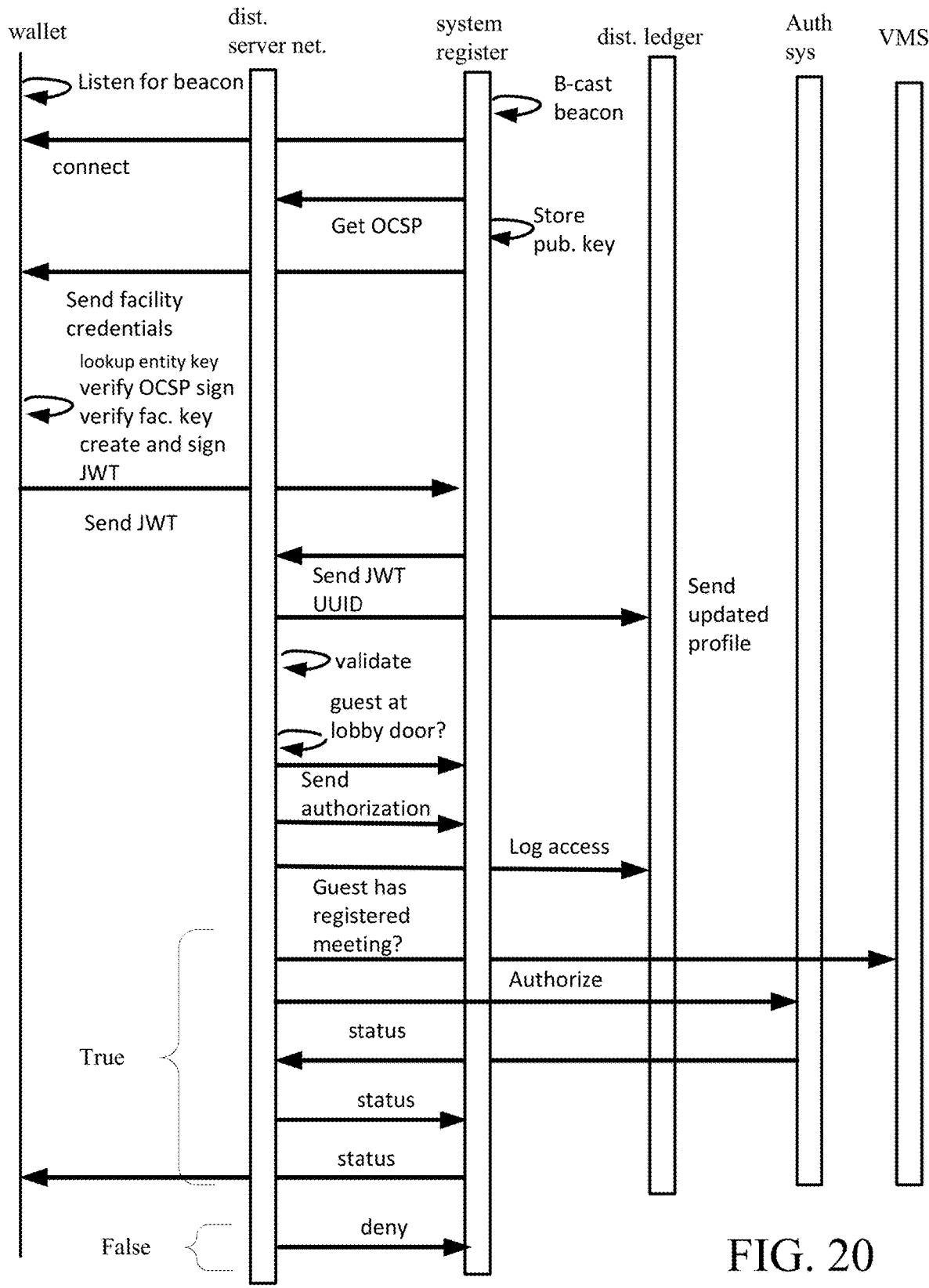
FIG. 20 is a time line flow for the access process of FIG. 19.

Referring now to FIG. 20, a time line of the credential process flow for access through the access control system from a mobile credential of a registered guest having a scheduled meeting as discussed in FIG. 19 to FIG. 19D, is shown. The process time line flow shows messaging/functions that occur among the wallet, the distributed network servers, a system register (security application) and the distributed ledger system, as well as the ANA system and the VMS system.

Registered Guest Sign-in

Figure 21:
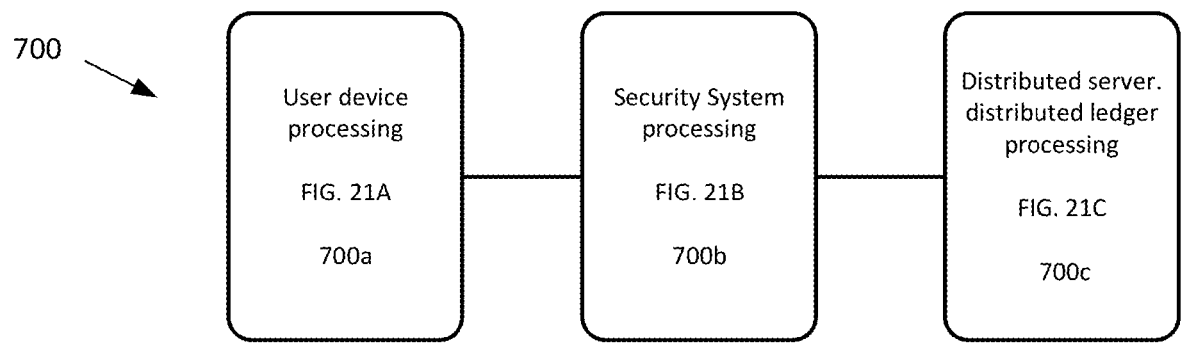

Referring now to FIG. 21, a credential process flow 700 for access control with the mobile, wearable credential in a near field communication enabled device (wearable credential device) for a registered guest is shown. Shown in FIG. 21 are guest device processing 700a (FIG. 21A), security system processing 700b (FIG. 21B) and distributed system/distributed ledger processing 700c (21C). This credential-based access process 700 (access process 700) is shown for the guest device 12a/wallet 13a, security system 184/security application 188, and the distributed servers 190 that interact with the distributed ledgers 14.

The access process 700 allows a guest, e.g., a visitor to verify a facility and vice-versa. The guest has a mobile, wearable credential in a near field communication enabled device (wearable credential device) as shown and a guest wallet in a guest device. The mobile device carries the guest wallet 13a and listens for a beacon, as above. The process 13a uses an access application, such as an App that runs on a door reader.

The process 700 uses a credential exchange mechanism that allows a guest's wallet 13a to verify the facility under control of an entity that issues its own credentials that can be traced by the facility, obviating need for a central, certificate issuing authority, by the facility having a unique certificate similar to those commonly found today in website certificates. However, in this instance, the company is the issuer of the certificate. This gives the ability to have the credential carrier roles and permissions, conveyed by the kiosk application exchanging the roles and permissions of a guest, without having to go back to a central service. This allows local control (exchange process of certificates). The mobile wallet 13a can access permissions from central facility (one time load) without the local control having to go back to central facility each time access is attempted.

Digital certificates are issued by a certificate authority or certification authority (CA), i.e., an entity that issues and certifies digital certificates, which certification is used to verify the ownership of a public key by the named entity associated with the certificate. The certification enables others that rely upon signatures or assertions made about the private key as corresponding to the certified public key. In this model of trust relationships, a CA could be a third party or in some implementations could be the entity itself rather than a trusted third party—trusted both by the owner of the certificate and by parties that would be relying on the certificate. Public-key infrastructure (PKI) schemes feature certifying authorities.

Figure 21A:
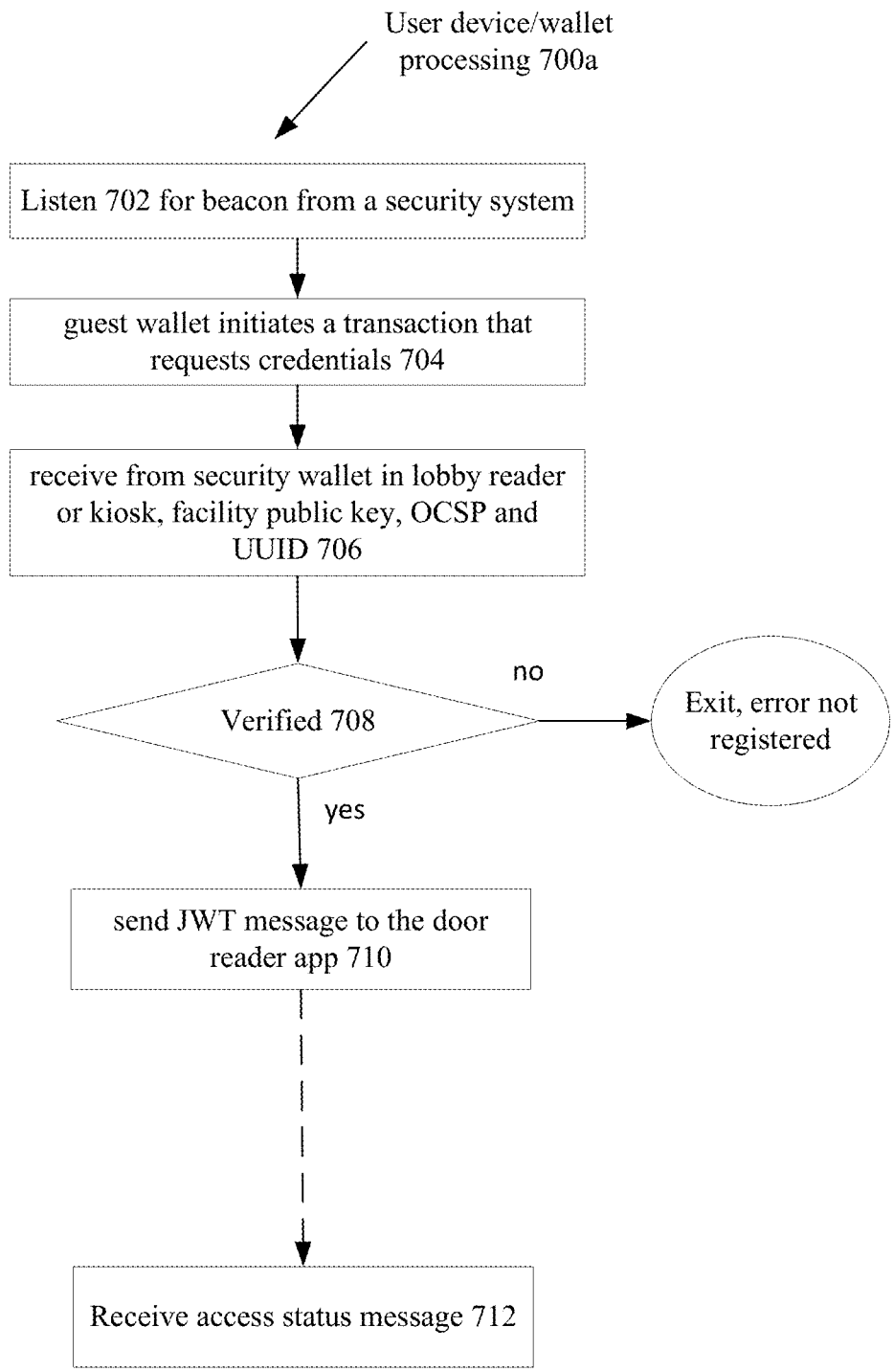
FIGS. 21A-21C are flow diagram showing details of the processing of FIG. 21.

Referring now to FIG. 21A, the guest device 12a portion 700a of the credential-based access process 700 is shown. The guest device 12a listens 702 for a beacon from a card reader. The card reader broadcasts a beacon (ID) that the smartphone receives and, which the mobile wallet detects. The guest device 12a connects to the card reader, and the wallet 13a via the device 12a requests that the card reader provide its credentials to the visitor's device 12a. The beacon includes a message to cause the visitor's device 12a to initiate 704 a transaction with the card reader to connect with the application on the card reader. The guest's wallet 13a requests 706 from a security wallet 701 in the card reader, e.g., security application 188, a facility certificate, OCSP and facility UUID (discussed below).

The guest's device 12a verifies 708 the credentials sent to the wallet 13a from the security wallet 701 of the security system 184, e.g., the facility certificate, the OCSP and the facility UUID. If the card reader is valid, then the card reader will provide its facility UUID, the facility certificate (public key for the facility) as well as the company UUID and company certificate (public key of the company). The wallet 13a verifies if, the wallet 13a, is paired with the company.

Other approaches include the beacon ID being that of the company UUID and if the wallet 13a is paired with that company, the wallet 13a (via the device 12a) then connects to the kiosk and requests details. The wallet 12a via the visitor's device 12a, either connects and determines if the beacon is from a valid system or the beacon ID itself is formatted such that beacon from a valid system informs the wallet 12a that the beacon is from the card reader and the wallet verifies the specifics by connecting to the card reader.

The visitor's wallet connects to the application once the beacon is detected. The application has the facility certificate, the facility UUID, and a revocation status, e.g., such as via the "Online Certificate Status Protocol" (OCSP) as discussed above. Other approaches could be used.

Since the mobile wallet knows the company's public key, the mobile wallet can trust that any packets signed by the company are valid and can be trusted. When the mobile wallet 13a accesses the reader, the reader provides its facility specific public key to the mobile device 12a (wallet 13a). The mobile wallet 13a does not know if this facility is authentic and part of the company that the wallet 13a holds a mobile credential for, and thus before the wallet 13a exchanges its credentials, the wallet 13a needs to verify for certain that the reader is authentic.

Authenticity of the reader is determined by the wallet 13a through verification 708 of the facility's certificate. The verification process has the wallet 13a determine whether the facility certificate was signed by the company. If the certificate was signed by the company, then the wallet 13a verifies that the facility certificate and the signature match because the wallet has the company's public key and the wallet can verify the signature. If the signature is valid, then the wallet 13a knows that the facility certificate is authentic.

Although the certificate is authentic the wallet needs to verify that the certificate has not been revoked. The wallet can do this verification a number of ways as discussed above, e.g. directly through an OCSP request or with an OCSP response (i.e. OCSP stapling), as discussed above, or CRL.

Upon, the guest's wallet 13a verifying the facility credentials, e.g., facility certificate, a revocation status and facility UUID, the guest's wallet sends 710 a JWT message to the reader. The JWT message follows the so called JSON Web Token (JWT) format discussed above. The generated tokens, as above, are signed by the token producer's private key, so that door kiosk app in possession of the producer's public key is able to verify that the token is legitimate. The claims are used to pass identity of authenticated guests between an identity provider and a service provider. The tokens can be authenticated and encrypted. Upon verification of the JWT message by the servers, the servers cause the reader to send an access status message that is received 712 by the wallet 13a, allowing or denying access.

Figure 21B:
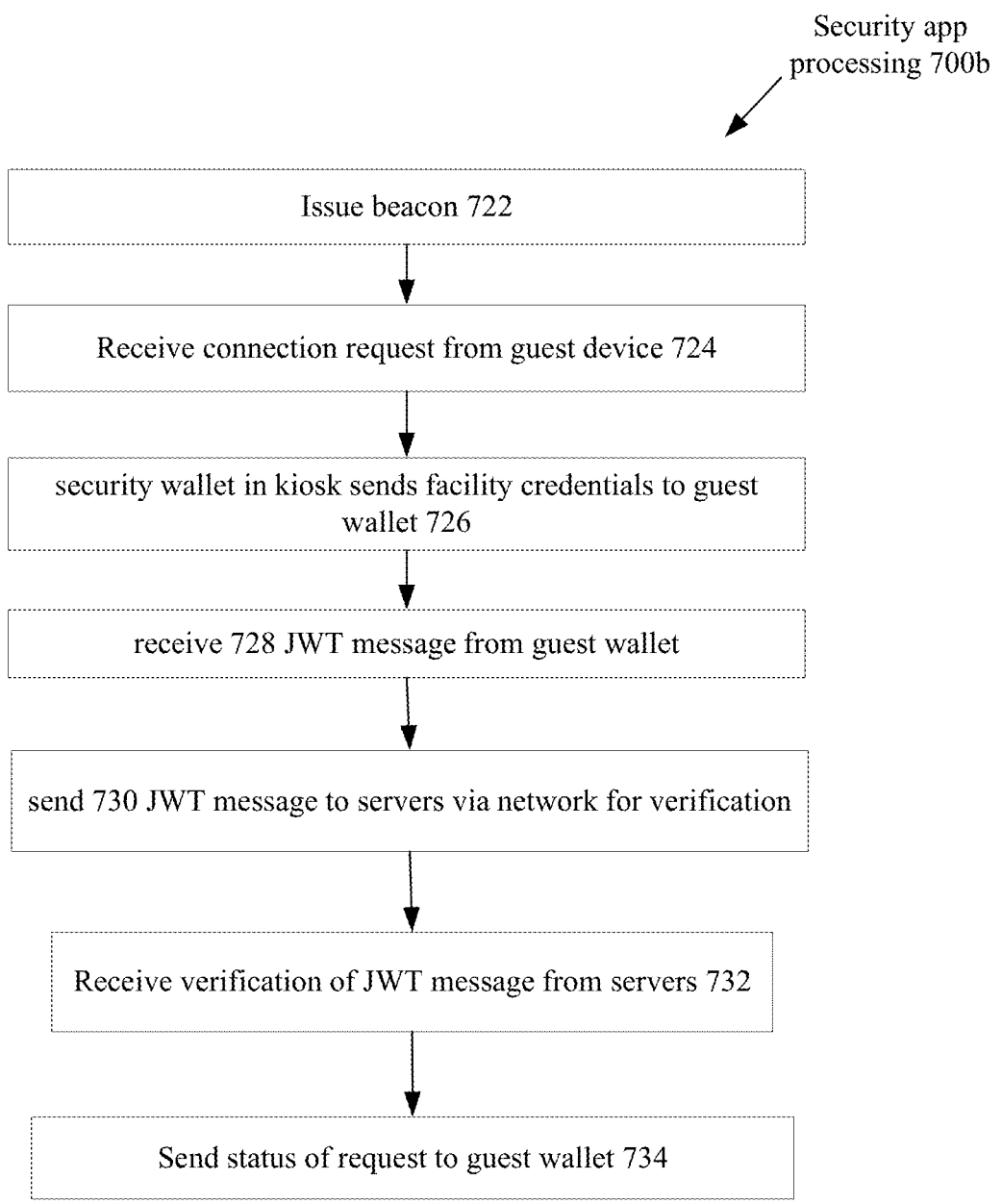

Referring now also to FIG. 21B, the security application 188 processing 700b causes the security system reader to continually or periodically issue 722, the beacon that is readable by the guest device 12a and which causes the guest device to request 724 a connection to the reader. As mentioned above, the guest device 12a upon connecting to the reader has the reader provide 726 its credentials to the visitor's device 12a (wallet 13a). If the verification by the wallet was successful, the wallet sends the JWT message, and upon receipt 728 of the JWT message by the reader, the JWT is sent 730 to the distributed network to a server that is used to verify the JWT token. Upon verification of the JWT message by the servers, the servers send the reader an access status message that is received 732 and is sent 734 to the wallet 13a allowing or denying access to the facility.

Figure 21C:
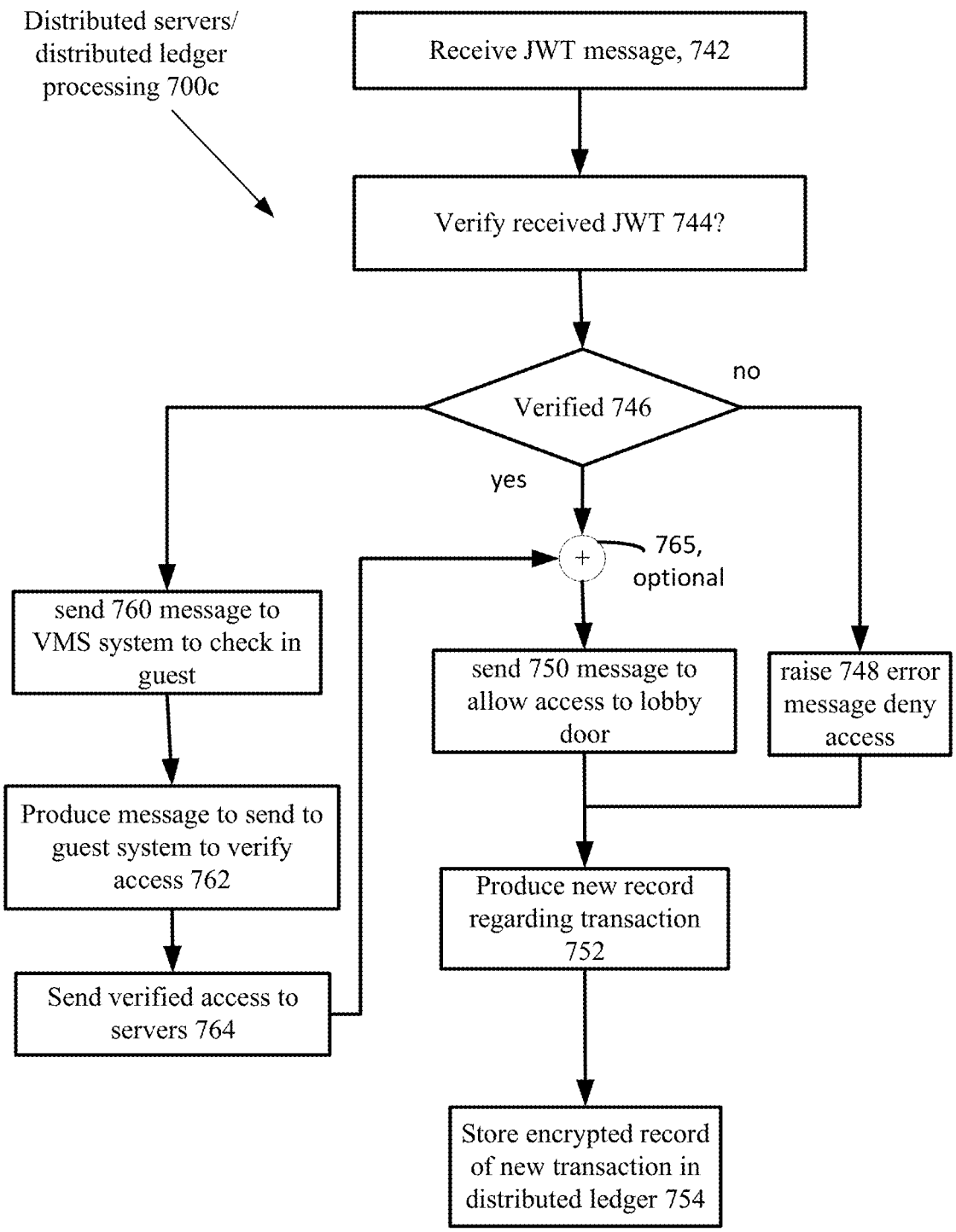

Referring now also to FIG. 21C, the distributed servers/ distributed ledger processing 700c is shown. The JWT is received 742 by the distributed servers and is verified 744. If the JWT is not verified, an error is raised 748 (see below). If the JWT is verified, 746 the guest is granted access 750, and an access control system grants the access and sends signal to unlock a door, etc. In addition, whether the JWT is verified or not verified, a corresponding entry record of either an access entry or an access denied entry is produced 752 as an access log that is stored 754 and maintained in the distributed ledger system.

The security application 188 sends a check-in guest message to the VMS system, to verify that the guest has a scheduled visit. The VMS system notifies C-Cure when the guest has a verified meeting by pushing a notification via the distributed network to the C-Cure. If the JWT is verified, user is granted access, and an access control system grants the access and sends signal to unlock a door, etc., as generally discussed above. In some implementations when granting access the system also checks current time/date and if guest has been activated and time/date is within a window for which access would be permitted, e.g., a meeting window.

All exchanges are logged in the distributed ledger for audit tracking, etc. Records are added to the distributed ledger as transactions and include a hashed record of the transaction, what was exchanged, the signatures of the parties, and may include additional detailed information depending on the type of distributed ledger used. The information stored for audit can include the date and time that the mobile wallet sent a JWT, the JWT parameters, and the access status or error conditions.

Figure 22:
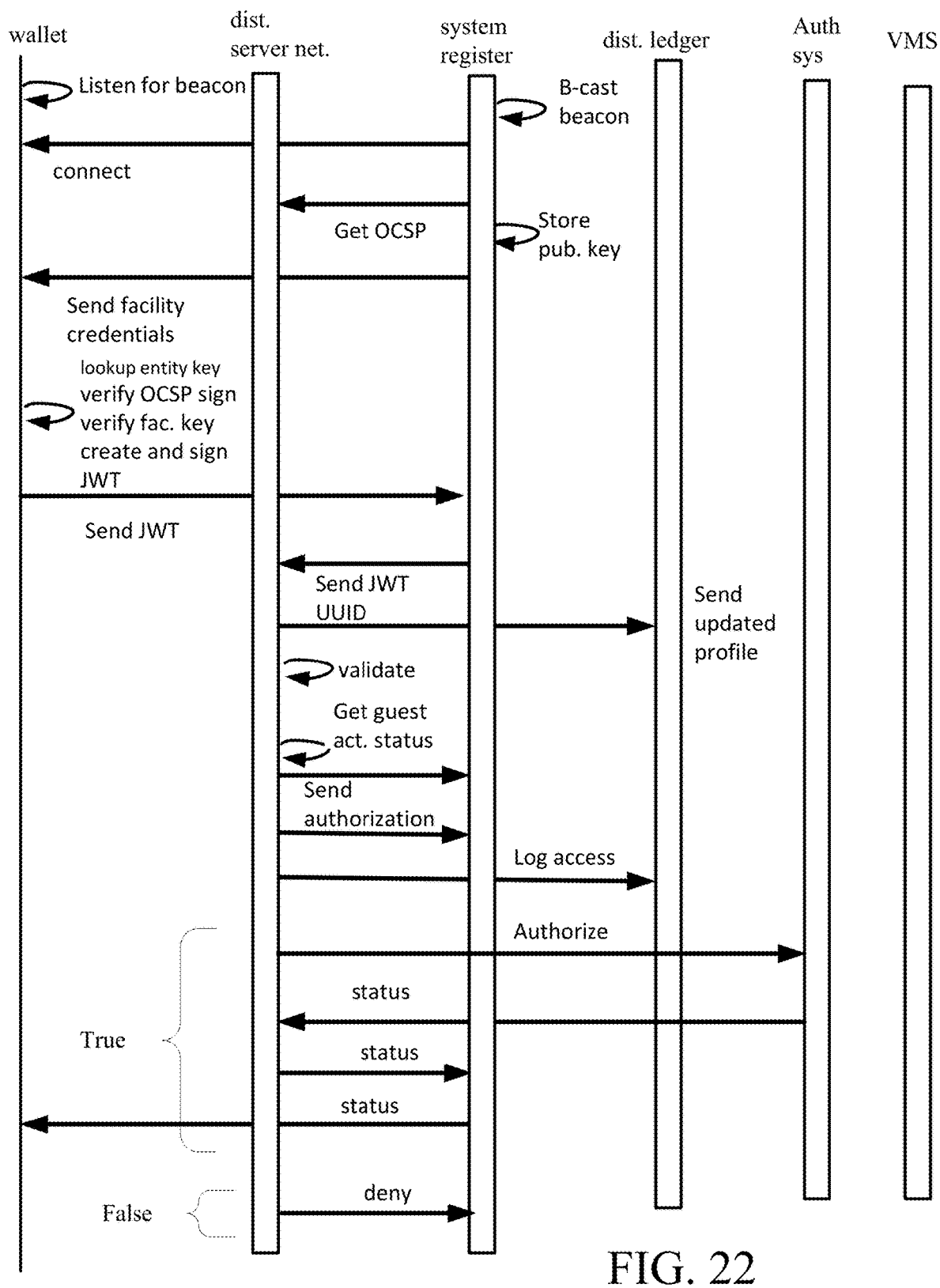
FIG. 22 is a time line flow for the access process of FIG. 21.

Referring now to FIG. 22, a time line of the credential process flow for access through the access control system from a mobile credential of a registered guest as discussed in FIG. 21 to FIG. 21C, is shown. The process time line flow shows messaging/functions that occur among the wallet, the distributed network servers, a system register (security application) and the distributed ledger system, as well as the ANA system and the VMS system.

Figure 23:
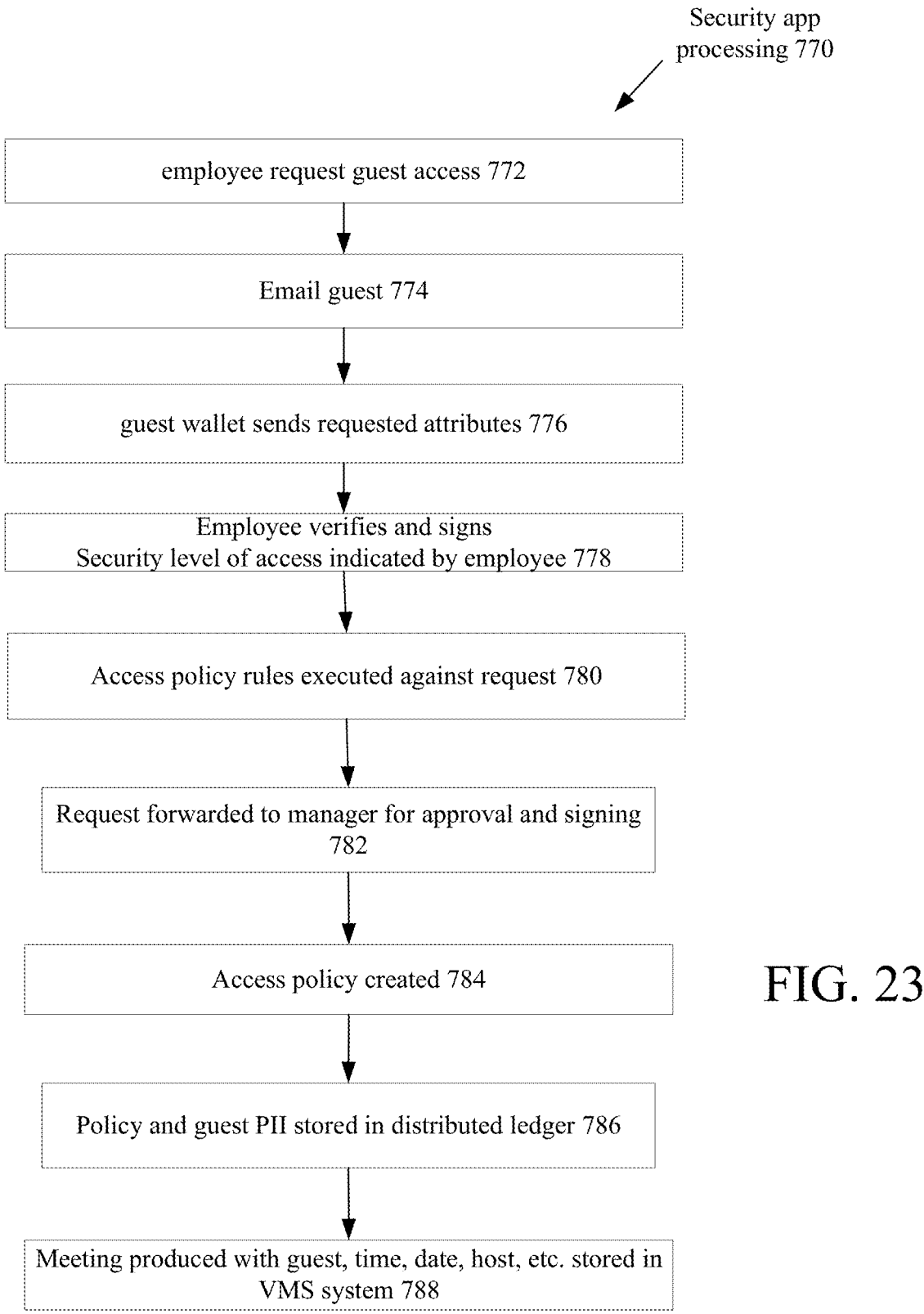
FIG. 23 is a flow diagram depicting guest registration.

Referring now to FIG. 23 a processing 770 shows messaging/functions that occur on the wallet 13a, over the distributed network 16, a system register and the distributed ledger system 14. The system has access to "personally identifiable information" commonly referred to as "PII" that is maintained in the distributed ledger system 14. The users (employee host and guest) each have a distributed ledger system managed identity. Users can have a "seal" as explained above or can be first time users that have seals produced.

An employee requests 772 guest access (specifying meeting date and time, etc.). The invite can be sent, 774 via an e-mail. The request is sent 776 to the guest wallet 13a and is a request for guest attributes, i.e., attributes of the user, etc. The employee-employee wallet verifies 778 this information and signs with its private key, with the employee indicating the security level of access for the visit.

The security level of the area is check 780 against an access policy, e.g., the facility can have various levels of access and business rules are executed to determine deviance from or adherence to the policy. The request is forward 782 to a manager for approval and signing with the managers' private key. The access policy is created 784 in a generally conventional manner. Policy and guest PII are stored 786 in the distributed ledger system 14. The meeting is produced with the guest, time, date, host, etc. and is stored 788 in the VMS system.

In the above implementation of secured access, a user, e.g., a manager approves the access by reviewing and signing request with its private key. Thus, secured access would involve two or more key set (two private-public key sets), whereas general access may need only a single key set (private-public key set). Manager created policy and guest PII are stored in distributed ledger system. From this processing meeting, meeting date/time, host etc. entry is produced and stored in the VMS system. The access policy used with the guest as well as the guest PII are stored in the distributed ledger.

Thus in the context of a guest, guest registration can give user access to a front door if the user is a visitor having a seal and is scheduled for a meeting in the facility. The wallet is used to automatically sign-In to visitor pad (badge printed, etc.), host notified and the wallet can be used to access a door during scheduled visit time.

Registration of the Wallet involves the distributed system that includes cloud based servers. This registration process is performed using secured transmission of data over Bluetooth between the wallet and the registration application on the kiosk. The profile information for the user is captured and verified.

The data once verified is committed to the cloud based servers and persisted into the distributed ledger system. Other techniques include use of a digital identity card, e.g., a Showcard ID (i.e. the wallet can include an ID exchange). If the user identity does not exist then it is created in the system.

Authentication calls are executed over the distributed network, via an Authenticate REST API for authentication using credentials authentication flow. With the Employee Wallet when a new meeting invite is produced, the employee selects a guest if the guest already exists in the system. If the guest does not exist, a profile for the guest is produced via the Guest Management system as well as the VMS system. If a Guest is deleted by the application then the Guest is deleted in the VMS system. As part of the new invite, the date and time of the meeting scheduled is entered and a meeting is created in the VMS. The Guest ID is either the guest's Public key or distributed ledger system ID.

The employee can delete an invite, and when deleted, the invite is deleted from the Guest Management System and the VMS system. When a guest device is sent the invite, the invite includes the facility Public Key. The guest wallet interfaces to the door reader with the flows described above. The Manager Application uses the distributed network, Authenticate REST API for authentication using credentials authentication flow for authentication.

When a user checks into the Lobby Reader or Kiosk a push notification will be sent to the Host's Wallet. Once the push notification is received the application can be loaded when the user views the notification, the Host acknowledges the guest has entered the building and activates guest access.

Registration of the Wallet involves the Cloud system. This registration process is performed using secured transmission of data over Bluetooth between the wallet and the server. The profile information for the user is captured and verified. The data once verified is committed to the cloud based servers and persisted into the distributed ledger system.

Other techniques will include use of a digital identity card, e.g., a Showcard ID (i.e. the wallet can include an ID exchange). If the user identity does not exist then it is created in the system.

Referring now to FIGS. 24A-24G, various user interfaces that are displayed on various ones of the user devices housing the users' wallets are shown.

Figure 24A:
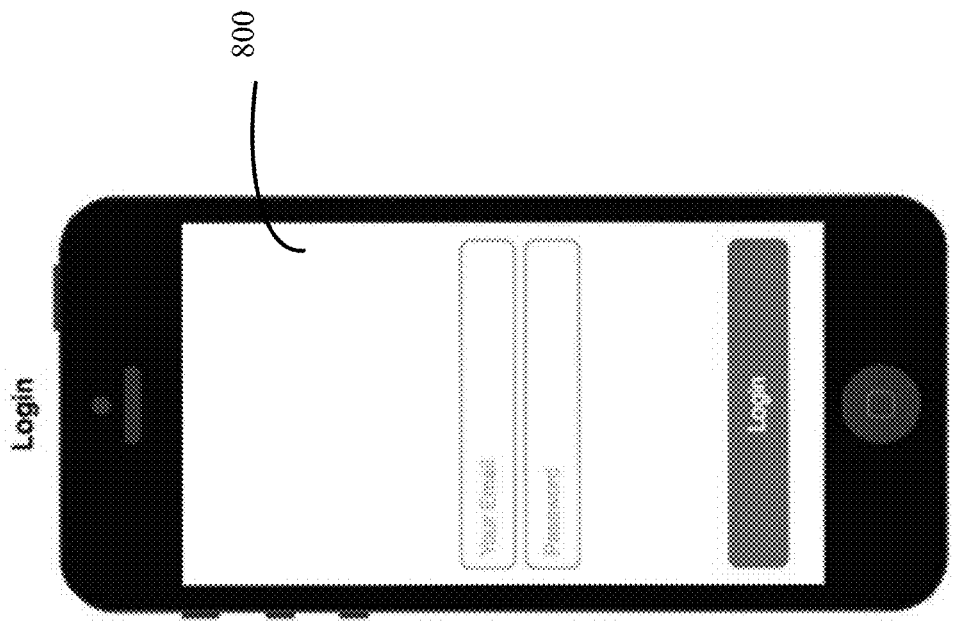
FIGS. 24A-24G are diagrams depicting various user interfaces for a user device.

FIG. 24A shows an initial interface 800 rendered on a display of the user device 12a, e.g., a smartphone, to initialize the wallet 13a. The initial interface 800 has fields for entering user information, e.g., first name, last name, e-mail, and password, and which displays a wallet ID and the user's public key. The interface 800 also includes a button to register the user/user's wallet 13a with the various systems described above and that invoke the processes of FIGS. 12-13C.

Figure 24B:
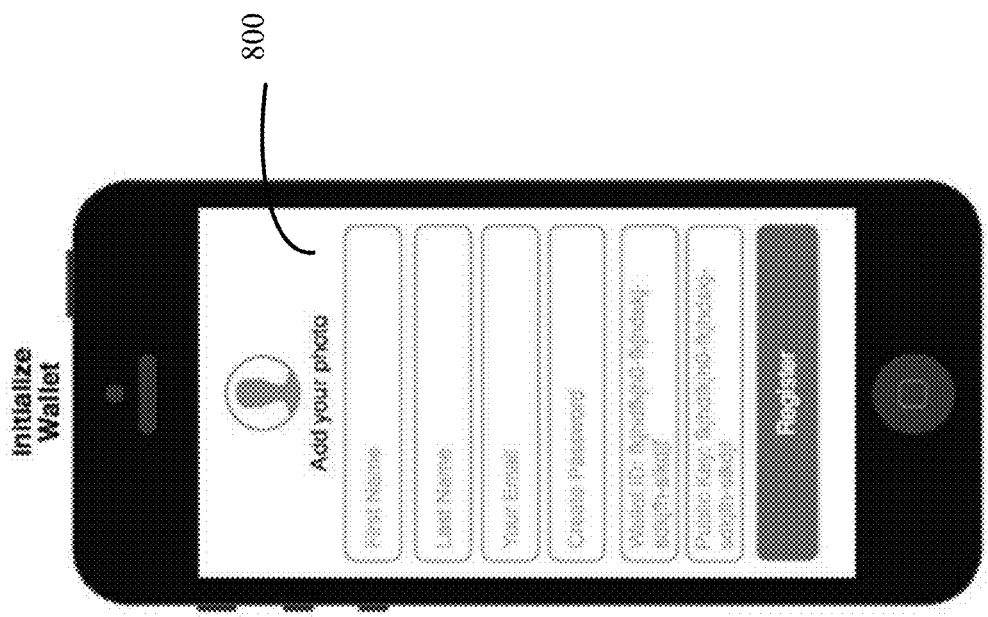

FIG. 24B shows the user interface 800 at a later stage, e.g., during a log-in presenting the e-mail and password fields that the user filled in, along with a log-in button.

Figure 24D:
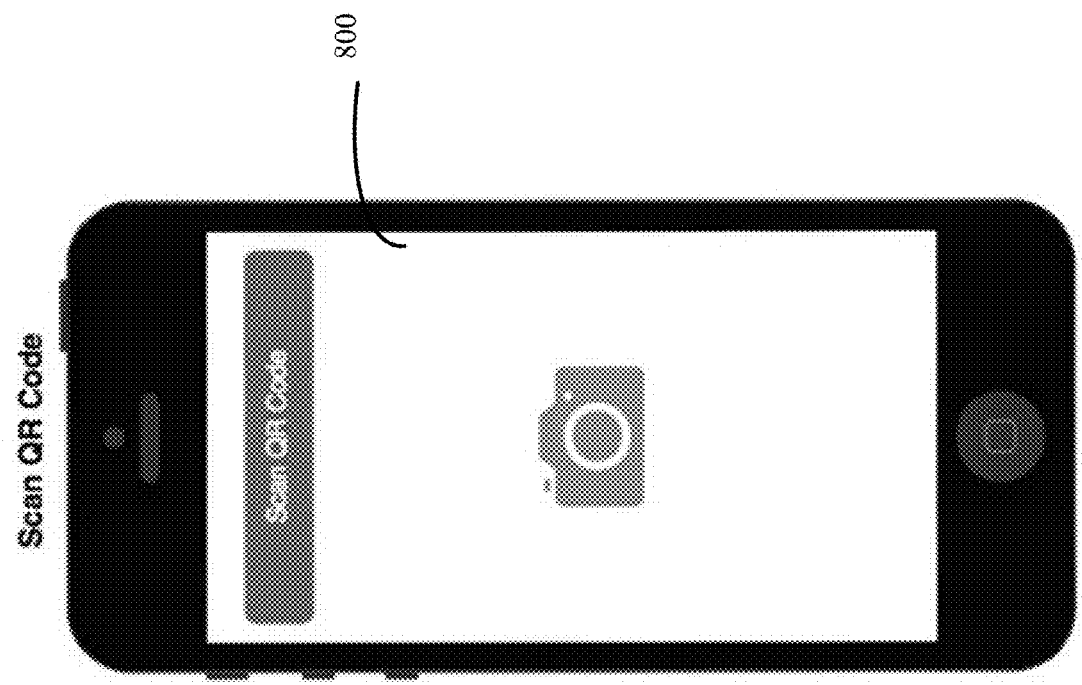
Figure 24C:
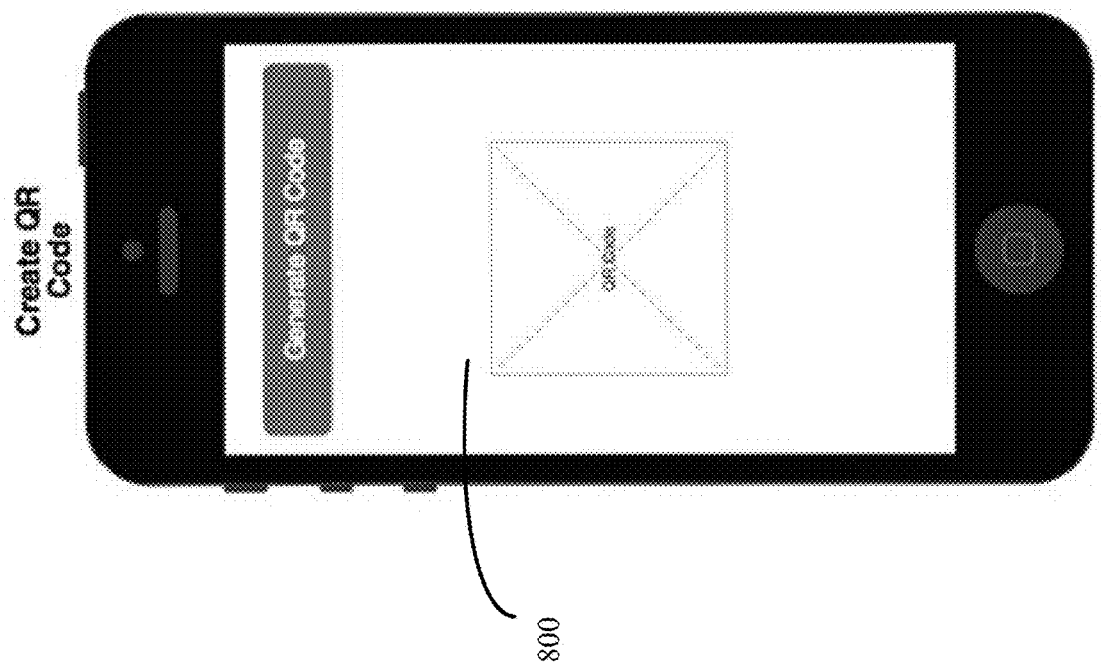

FIGS. 24C and 24D show the user interface 800 at a later stage for creating the QR codes with a generate button and scanning of the QR codes with a scan button, as mentioned in FIG. 12.

Figure 24F:
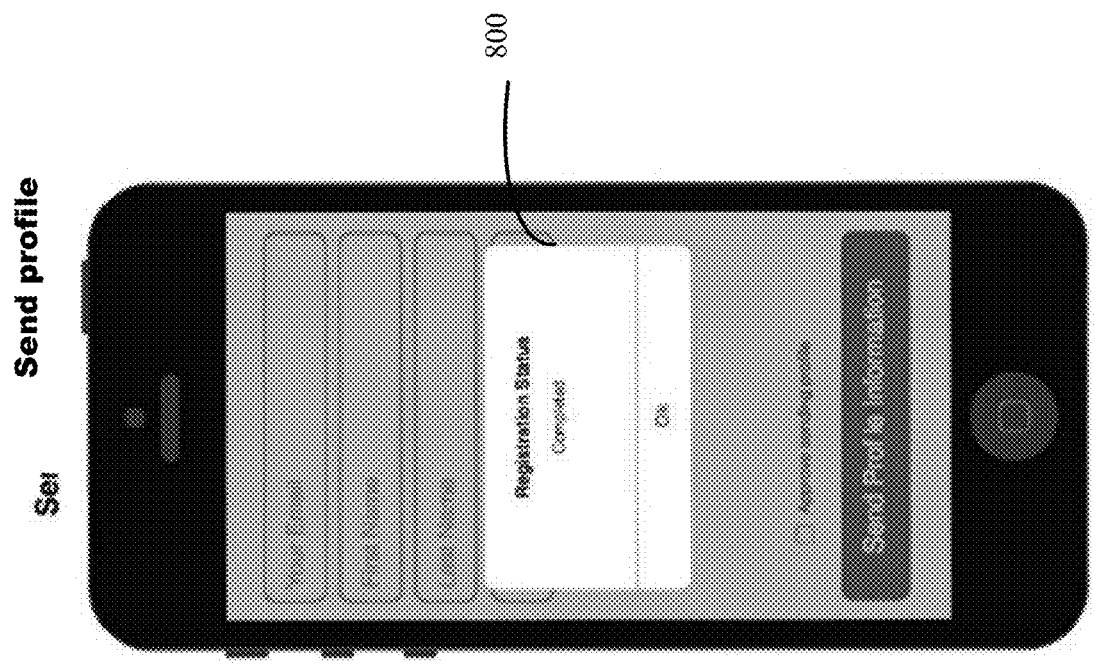
Figure 24E:
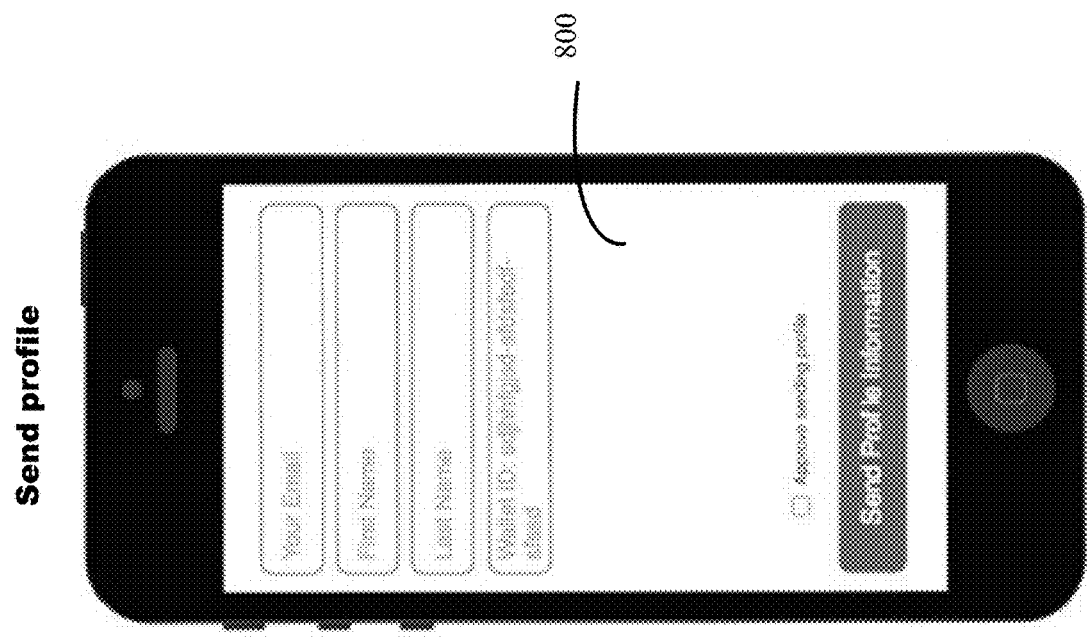
Figure 24G:
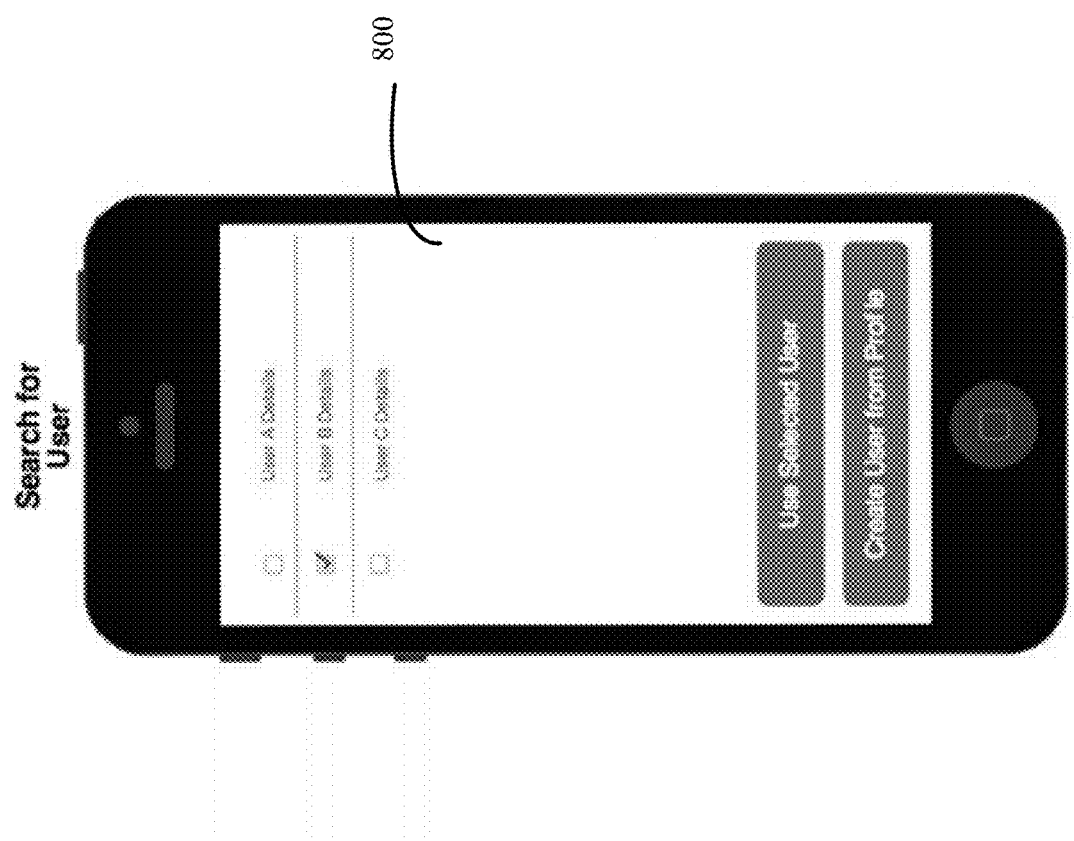

FIG. 24E shows the user interface 800 at a later stage, e.g., during sending of the profile to the security app., with a send profile button and a check box to approve sending profile information.

FIG. 24F depicts a confirmation of registration status message.

Upon the user login (FIG. 24B) the user interface displays a search screen results (FIG. 24G) of searching for the user. The user can have various profiles for different levels and types of access to different facilities, etc. The various profiles are displayed with an indicator that selects one to use and a control to send the selected profile, and can also display a control to produce a new user profile. The selected profile is subsequently send using the screen of FIG. 24E, above.

Figure 25:
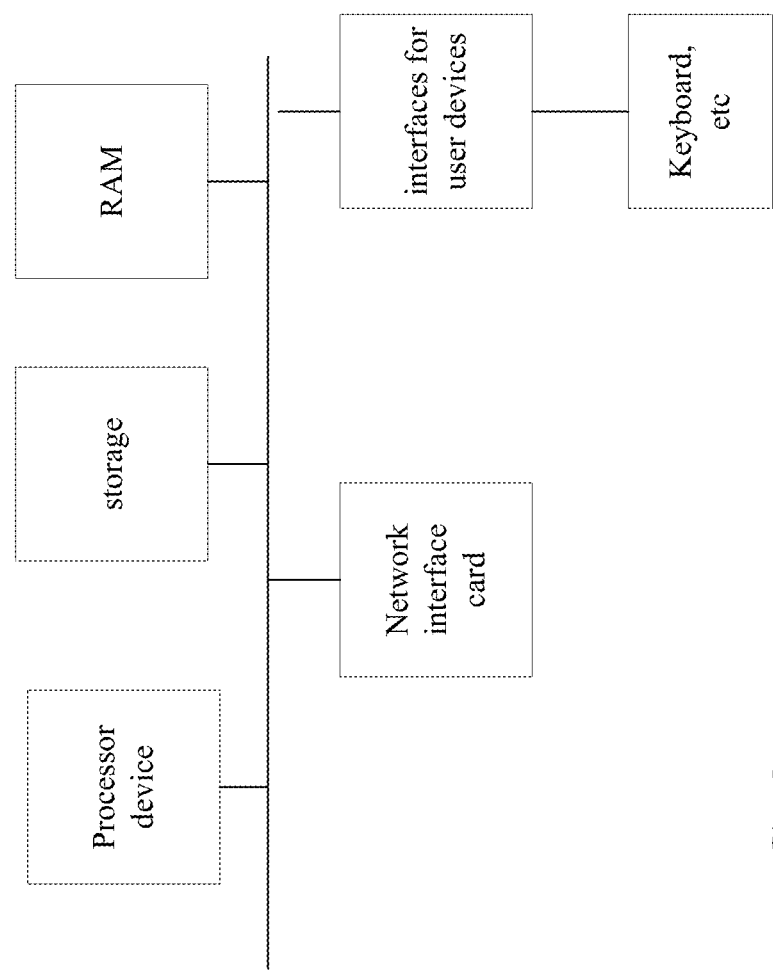
FIG. 25 is a block diagram of an exemplary device/system.

Referring now to FIG. 25, components of system/devices are shown. Memory stores program instructions and data used by the processor. The memory may be a suitable combination of random access memory and read-only memory, and may host suitable program instructions (e.g. firmware or operating software), and configuration and operating data and may be organized as a file system or otherwise. The program instructions stored in the memory may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Servers are associated with an IP address and port(s) by which it communicates with user devices. The server address may be static, and thus always identify a particular one of monitoring server to the intrusion detection panels. Alternatively, dynamic addresses could be used, and associated with static domain names, resolved through a domain name service. The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method executed by a server system, the method comprising:
   broadcasting, by the server system, a first beacon causing a first user device to connect with the server system;
   receiving, by the server system from the first user device, a request to allow guest access;
   broadcasting, by the server system, a second beacon causing a second user device to connect with the server system;
   sending, by the server system to the second user device, a request for user credentials;
   receiving, by the server system from the second user device and responsive to the request, the user credentials;
   receiving, by the server system from the first user device, a verification of the user credentials, the verification comprising a key associated with the first user device and a security access level for the second user device, wherein the first user devices signs the verification with the key after verifying the user credentials;
   producing, by the server system and responsive to receiving the verification, an access policy for the second user device, the access policy based on the security access level; and
   causing, by the server system, the access policy and the user credentials to be stored in a distributed ledger system, wherein:
      the distributed ledger system comprises a plurality of distributed databases and replication software configured to detect changes in contents of the plurality of distributed databases and replicate the changes such that the contents of the plurality of distributed databases are the same.

2. The method of claim 1 wherein the distributed ledger system is a sequential transaction database that comprises plural distributed database systems and network interface devices that store records of the user credentials as personally identifiable information.

3. The method of claim 1, comprising:
   forwarding by the server system the request to allow guest access to a third user device.

4. The method of claim 3, comprising:
   receiving by the server system an approval of the request to allow guest access from the third user device.

5. The method of claim 1, comprising:
   producing a message that codifies a meeting involving a user of the first user device and a user of the second user device.

6. The method of claim 5 wherein the message includes guest, time and date of meeting that is stored in a visitor management system.

7. The method of claim 1 wherein the server system sends the message requesting credentials to the second user device to cause the second user device to access a digital wallet that stores credential information with the credential information is transmitted directly from the digital wallet to the server system in a secure manner.

8. The method of claim 7 wherein the digital wallet has a management module that handles third party requests for information and/or attributes and a communication module that interfaces with the distributed ledger system.

9. The method of claim 7 wherein the digital wallet encrypts the requested credential information using a public key infrastructure (PKI) with a public key of the server system used along with a private key associated with the digital wallet to encrypt the data.

10. A security system, comprising:
a distributed ledger system; and
a server system, the server system configured to:
broadcast a first beacon causing a first user device to connect with the server system;
receive a request to allow guest access from the first user device;
broadcast a second beacon causing a second user device to connect with the server system;
send a request for user credentials to the second user device;
receive, from the second user device and responsive to the request, the user credentials;
receive a verification of the user credentials from the first user device, the verification comprising a key associated with the first user device and a security access level for the second user device, wherein the first user devices signs the verification with the key after verifying the user credentials;
produce, responsive to receiving the verification, an access policy for the second user device, the access policy based on the security access level; and
store the access policy and the user credentials in the distributed ledger system, wherein:
the distributed ledger system comprises a plurality of distributed databases and replication software configured to detect changes in contents of the plurality of distributed databases and replicate the changes such that the contents of the plurality of distributed databases are the same.

11. The system of claim 10, wherein the distributed ledger system is a sequential transaction database that comprises plural distributed database systems and network interface devices that store records of the user credentials as personally identifiable information.

12. The system of claim 10, wherein the server system is configured to:
forward the request to allow guest access to a third user device.

13. The system of claim 12, wherein the server system is configured to:
receive an approval of the request to allow guest access from the third user device.

14. The system of claim 10, wherein the server system is configured to:
produce a message that codifies a meeting involving a user of the first user device and a user of the second user device.

15. The system of claim 14, wherein the message comprises:
guest, time, and date of meeting that is stored in a visitor management system.

16. The system of claim 10, wherein the server system is configured to:
send the message requesting credentials to the second user device to cause the second user device to access a digital wallet that stores credential information with the credential information transmitted directly from the digital wallet to the server system in a secure manner.

17. The system of claim 16, wherein the digital wallet comprises:
a management module that handles third party requests for information and/or attributes and a communication module that interfaces with the distributed ledger system.

18. The system of claim 16, wherein the digital wallet is configured to:
encrypt the requested credential information using a public key infrastructure (PKI) with a public key of the server system is used along with a private key associated with the digital wallet to encrypt the data.

* * * * *